United States Patent [19]

Konno et al.

[11] Patent Number: 5,283,606
[45] Date of Patent: Feb. 1, 1994

[54] INFORMATION INPUT DEVICE FOR A CAMERA AND CAMERA EQUIPPED THEREWITH

[75] Inventors: Tatsuo Konno; Toshio Matsumoto; Yoshihiko Aihara; Kenji Ito, all of Kanagawa, Japan

[73] Assignee: Canon Kabushiki Kaisha, Tokyo, Japan

[21] Appl. No.: 982,227

[22] Filed: Nov. 25, 1992

Related U.S. Application Data

[63] Continuation of Ser. No. 634,330, Dec. 26, 1990, abandoned.

[30] Foreign Application Priority Data

| Dec. 28, 1989 | [JP] | Japan | 01-341257 |
| Dec. 28, 1989 | [JP] | Japan | 1-341258 |
| Dec. 28, 1989 | [JP] | Japan | 1-341259 |
| Dec. 29, 1989 | [JP] | Japan | 1-341254 |
| Jan. 29, 1990 | [JP] | Japan | 2-018617 |

[51] Int. Cl.⁵ .................................... G03B 17/00
[52] U.S. Cl. ................................... 354/289.1
[58] Field of Search ............... 354/289.1, 289.11, 442

[56] References Cited

U.S. PATENT DOCUMENTS

| 3,742,824 | 7/1973 | Ueda et al. | 354/289.1 |
| 4,175,842 | 11/1979 | Sakurada et al. | 354/442 |
| 4,408,499 | 10/1983 | Haneishi | 354/289.11 |
| 4,674,854 | 6/1987 | Kawamura et al. | 354/289.1 |

Primary Examiner—Michael L. Gellner
Assistant Examiner—J. K. Han
Attorney, Agent, or Firm—Robin, Blecker, Daley & Driscoll

[57] ABSTRACT

An information input device for a camera includes an information member having first camera information displayed on one face thereof and second camera information displayed on a second face thereof, a holding member capable of holding the information member with either of its faces in viewable disposition and a detector for detecting which of the faces is in the viewable disposition when the information member is held by the holding member.

44 Claims, 56 Drawing Sheets

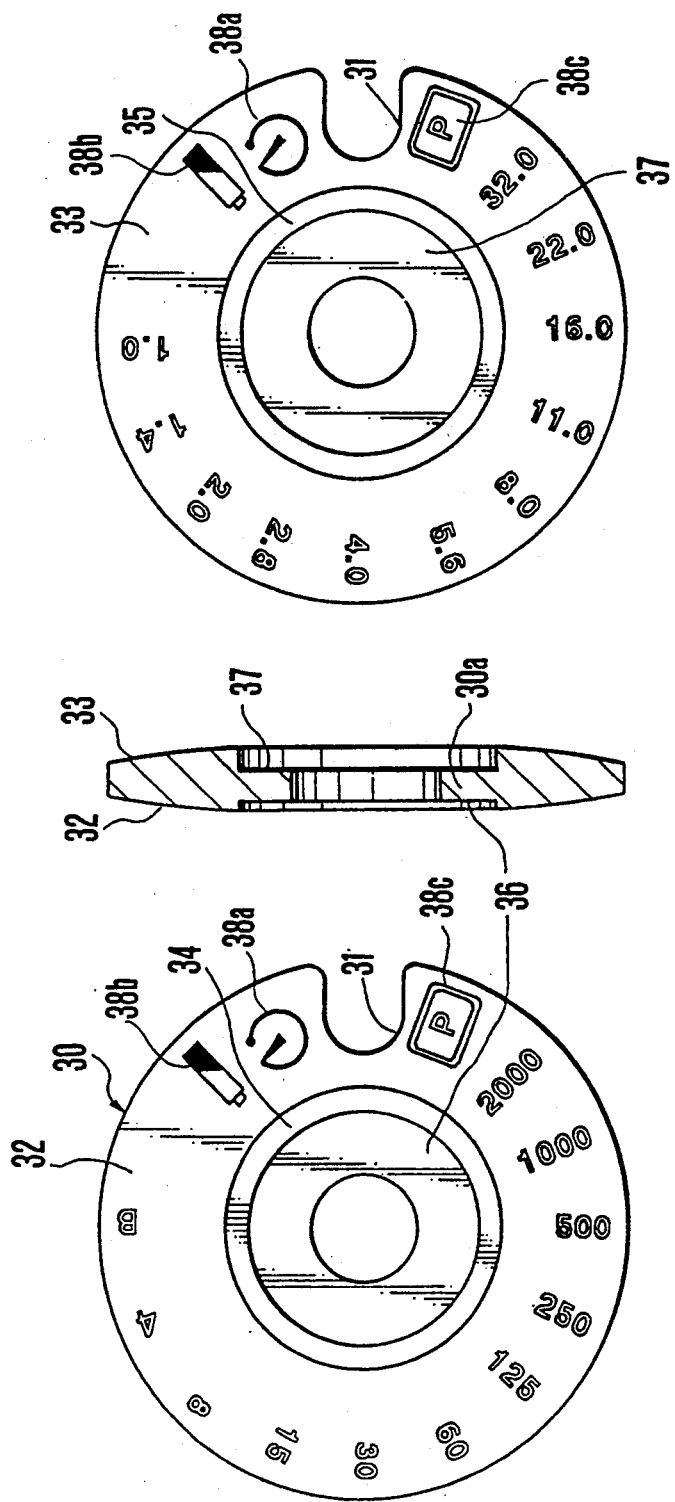

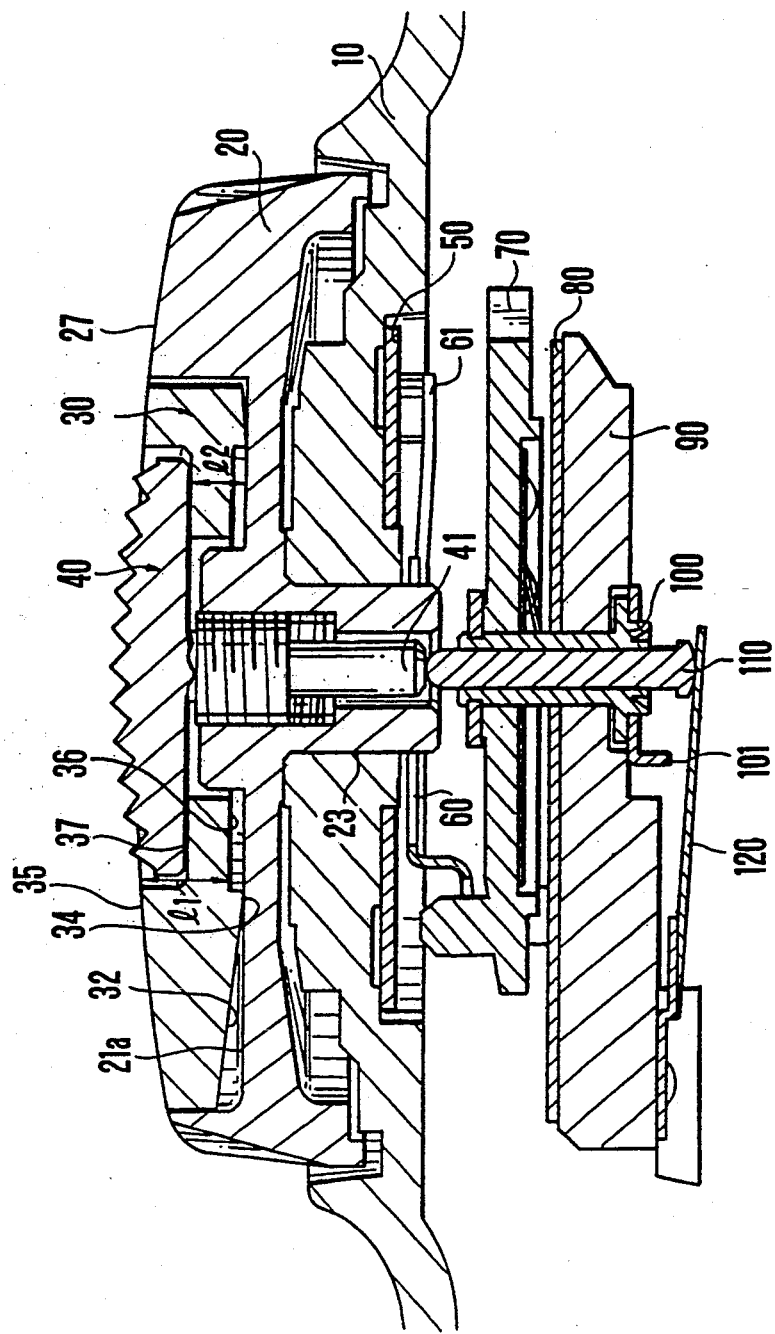

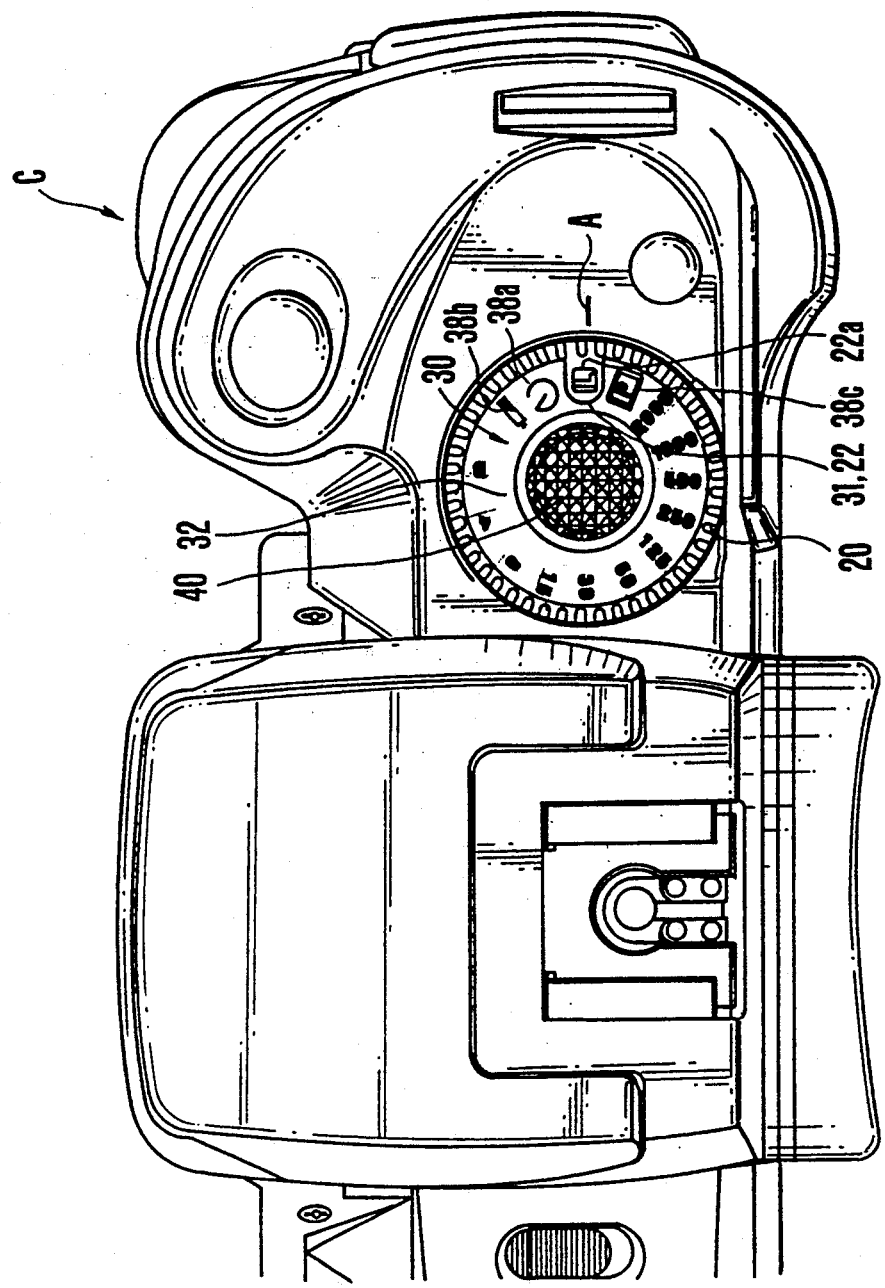

FIG.11

| P6 | P5 | P4 | P3 | SHUTTER-SPEED PRIORITY MODE | APERTURE-VALUE PRIORITY MODE |
|---|---|---|---|---|---|
| 0 | 0 | 0 | 0 | BC | BC |
| 0 | 0 | 0 | 1 | SELF | SELF |
| 0 | 0 | 0 | 0 | LOCK | LOCK |
| 0 | 0 | 1 | 1 | P | P |
| 0 | 1 | 0 | 0 | 1/2000 | F32 |
| 0 | 1 | 0 | 1 | 1/1000 | F22 |
| 0 | 1 | 1 | 0 | 1/500 | F16 |
| 0 | 1 | 1 | 1 | 1/250 | F11 |
| 1 | 0 | 0 | 0 | 1/125 | F8 |
| 1 | 0 | 0 | 1 | 1/60 | F5.6 |
| 1 | 0 | 1 | 0 | 1/30 | F4 |
| 1 | 0 | 1 | 1 | 1/15 | F2.8 |
| 1 | 1 | 0 | 0 | 1/8 | F2 |
| 1 | 1 | 0 | 1 | 1/4 | F1.4 |
| 1 | 1 | 1 | 0 | BULB | F1.0 |

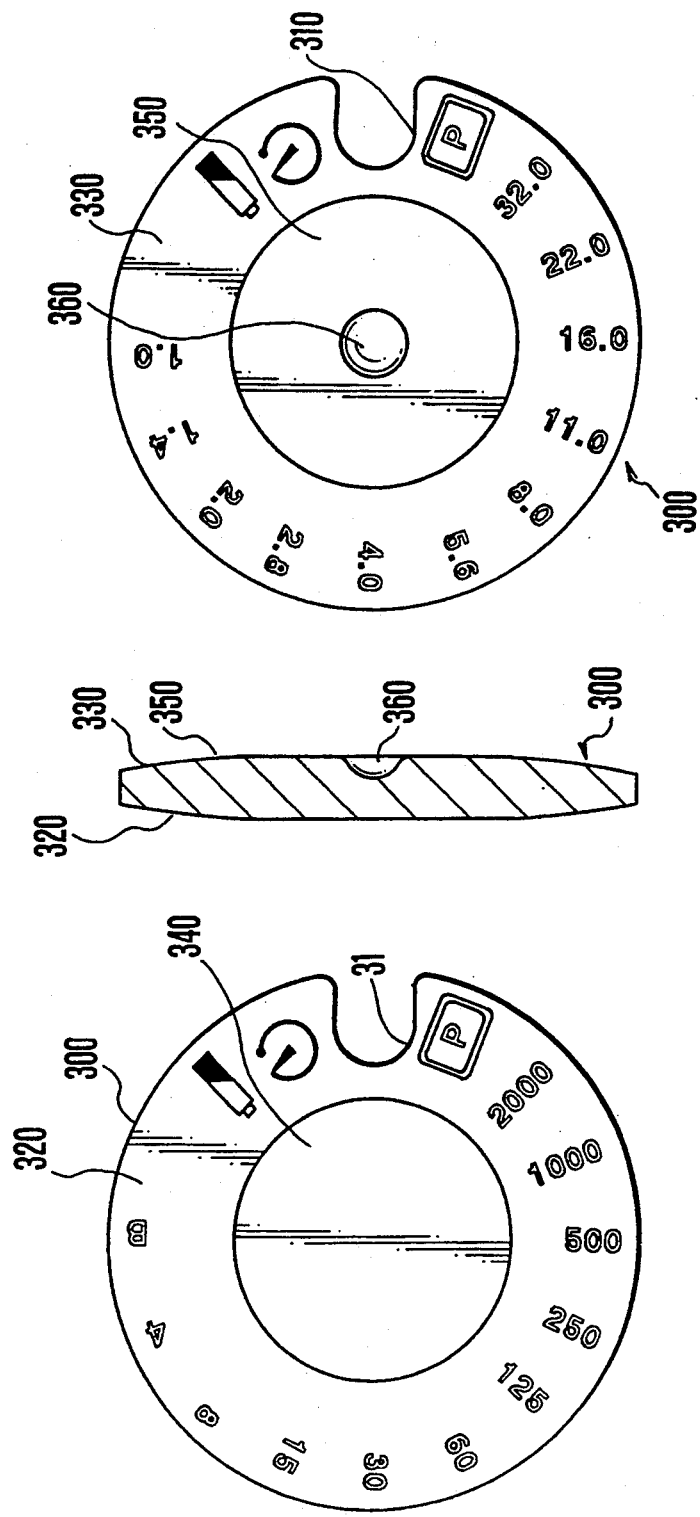

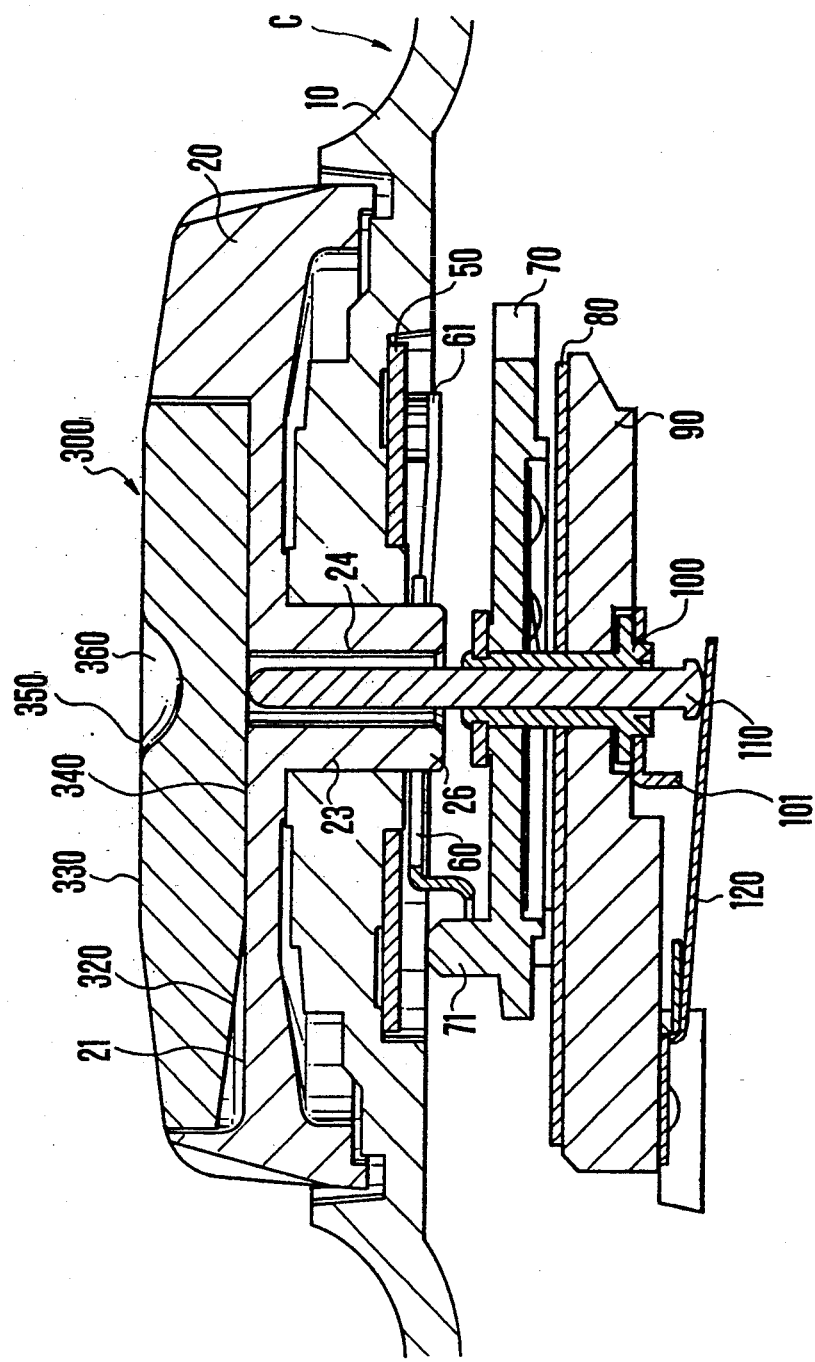

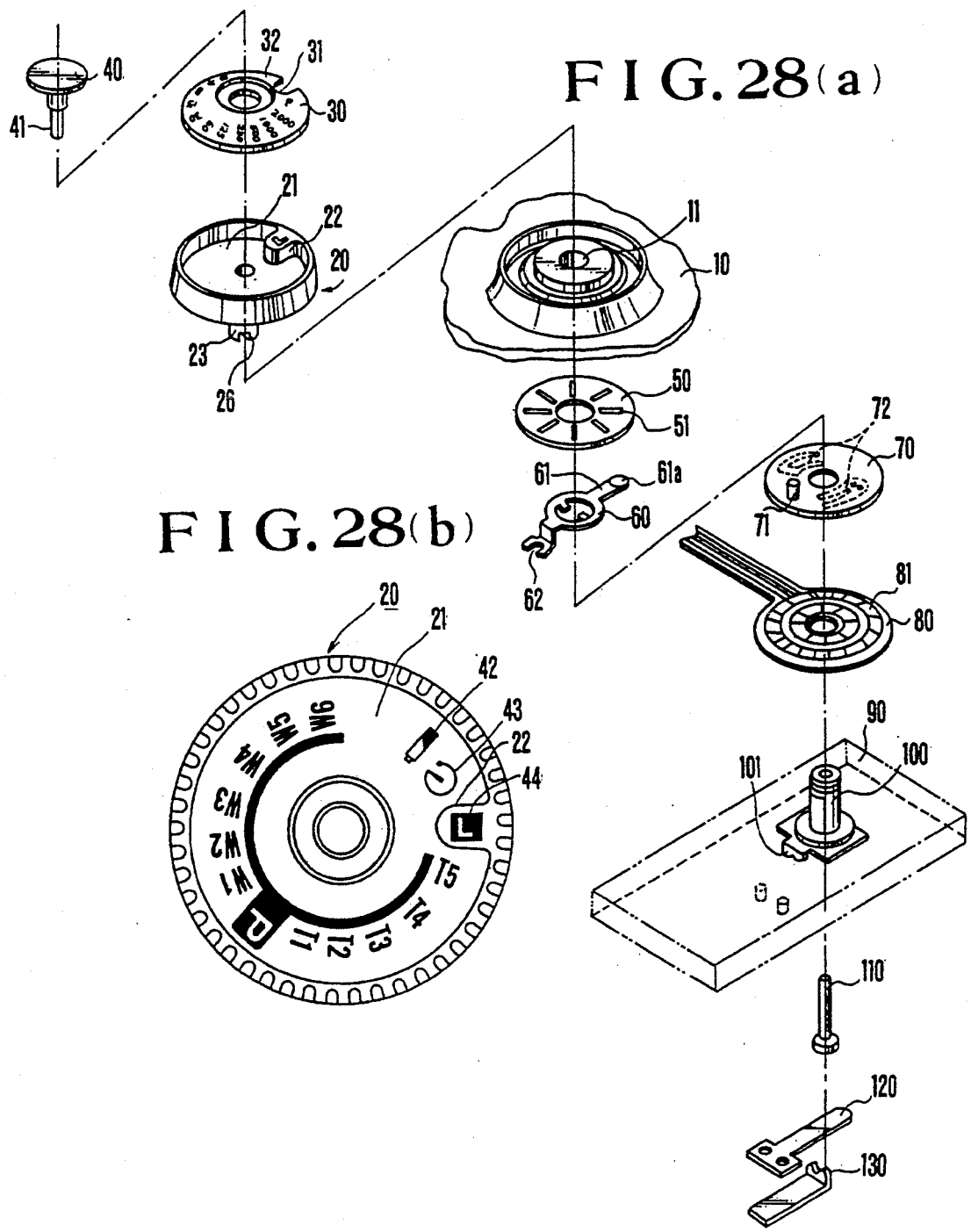

FIG. 34

| P6 | P5 | P4 | P3 | SHUTTER-SPEED PRIORITY MODE | APERTURE-VALUE PRIORITY MODE | VARIABLE PROGRAM MODE |
|---|---|---|---|---|---|---|
| 0 | 0 | 0 | 0 | BC | BC | BC |
| 0 | 0 | 0 | 1 | SELF | SELF | SELF |
| 0 | 0 | 1 | 0 | LOCK | LOCK | LOCK |
| 0 | 0 | 1 | 1 | P | P | T5 |
| 0 | 1 | 0 | 0 | 1/2000 | F32 | T4 |
| 0 | 1 | 0 | 1 | 1/1000 | F22 | T3 |
| 0 | 1 | 1 | 0 | 1/500 | F16 | T2 |
| 0 | 1 | 1 | 1 | 1/250 | F11 | T1 |
| 1 | 0 | 0 | 0 | 1/125 | F8 | P |
| 1 | 0 | 0 | 1 | 1/60 | F5.6 | W1 |
| 1 | 0 | 1 | 0 | 1/30 | F4 | W2 |
| 1 | 0 | 1 | 1 | 1/15 | F2.8 | W3 |
| 1 | 1 | 0 | 0 | 1/8 | F2 | W4 |
| 1 | 1 | 0 | 1 | 1/4 | F1.4 | W5 |
| 1 | 1 | 1 | 0 | BULB | F1.0 | W6 |

FIG.42

DIAL CODE TABLE

| M14 | M13 | M12 | M11 |
|---|---|---|---|
| 1 | 0 | 0 | 0 |
| 1 | 0 | 1 | 0 |
| 1 | 0 | 1 | 1 |
| 1 | * | 0 | 1 |
| 1 | 1 | 0 | 0 |
| 1 | 1 | 1 | 0 |
| * | 1 | 1 | 1 |
| 0 | 1 | 1 | 0 |
| 0 | 1 | 0 | 1 |
| 0 | 0 | 1 | 1 |
| 0 | 0 | 0 | 1 |
| 0 | 0 | 1 | 0 |
| 0 | 1 | 0 | 0 |

INFORMATION INPUT DEVICE FOR A CAMERA AND CAMERA EQUIPPED THEREWITH

This is a continuation application under 37 CFR 1.62 of prior application Ser. No. 634,330, filed Dec. 26, 1990, now abandoned.

BACKGROUND OF THE INVENTION

1. Field of the Invention

The present invention relates to a camera having an information setting device for setting photographic information.

2. Description of the Related Art

A conventional type of information input device for a camera is proposed in U.S. Pat. No. 4,175,842.

This proposed information input device is typically applied to an automatic exposure camera which can selectively operate in a shutter-speed (Tv) priority mode or an aperture-value (Av) priority mode, and is adapted to allow Tv information and Av information to be set by a single input means such as a rotary dial. The device is arranged to implement a selective indication of Tv information and Av information displayed, respectively, on the outer and inner peripheral portions of an indication disk, by covering either of the Tv information and the Av information by a planar means in interlocked relation to the operation of selecting a desired priority mode.

Information on the selected mode can be viewed through a sectorial window formed in a member which covers the indication disk.

However, the above-described conventional example has presented the following problems:

(1) Although the selectively displayed result is viewed through the sectorial window, neighboring pieces of information, whether the Tv or Av information, can only be viewed at best. Since it is impossible to view all indications at a glance, upper and lower limits cannot be quickly found.

(2) Since display selection is performed in a plane, the display space of the display window which is nearer to the inner peripheral side of the indication disk is narrower than the display space of the same which is nearer to the outer peripheral side. As a result, it may be difficult to identify each indication and if such difficulty is to be overcome, limited kinds of modes must be displayed on the inner peripheral side.

(3) Since a display selecting mechanism which is interlocked with the selecting operation of a mode selecting means is adopted, a complicated construction is needed.

It is also known that the number of functions of cameras has been increasing with the recent development of electronic circuit techniques. For example, a shutter-speed priority mode and an aperture-value priority mode are not only provided as available photographic modes, but programmed AE cameras having several kinds of program charts for various types of photographic effects or subjects are also provided.

Each of the photographic modes is represented on, e.g., a dial by using either an icon which symbolizes the intent or object of the photographic mode or an English character indication utilizing a capital letter.

However, since no careful consideration has conventionally been given to the layout of each photographic mode displayed on a dial or the like, it has been impossible for a user to sufficiently understand the nature of each photographic mode only through the icon or capital letter. It is particularly difficult for beginners or inexperienced persons to handle such a conventional display, with the result that they in practice use only a normal program mode which is the most general. In many cases, distinctive multiple functions have not been satisfactorily utilized.

In the case of an arrangement in which photographic modes having different natures or functions are adjacently displayed, since there is no relationship between the photographic modes, a photographer will be unable to use the functions of all photographic modes if he does not completely memorize them. Although icons or the like are useful to some extent, it is difficult for even an experienced photographer to make an instantaneous decision in all cases at any time, and he may miss a shutter opportunity.

SUMMARY OF THE INVENTION

It is, therefore, an object of the present invention to provide a camera which allows the kind of settable photographic information to be changed by holding a photographic information member with a different face in viewable disposition, thereby making it possible to set various kinds of photographic information and to easily identify the kind of settable photographic information.

It is another object of the present invention to provide a camera which includes an information setting member which is rotated to select setting information, and in which photographic information settable by the information setting member is divided into two groups displayed, respectively, on opposite sides of a boundary region, thereby achieving improved operability.

The above and other objects, features and advantages of the present invention will become apparent from the following detailed description of preferred embodiments of the present invention, taken in conjunction with the accompanying drawings.

BRIEF DESCRIPTION OF THE DRAWINGS

FIGS. 1 to 7 diagrammatically show a first embodiment of an information input device for a camera according to the present invention;

FIG. 1 is a diagrammatic cross-sectional view showing the state of setting of the information input device in a first exposure mode;

FIG. 2 is an schematic exploded perspective view of the information input device of FIG. 1;

FIG. 3(a) is a schematic plan view showing one face of the information input device of FIG. 1;

FIG. 3(b) is a schematic plan view showing the other face of the information input device of FIG. 1;

FIG. 3(c) is a schematic cross-sectional view showing the information input device of FIG. 1;

FIG. 4 is a diagrammatic cross-sectional view showing the state of setting of the information input device in a second exposure mode;

FIG. 5(a) is a schematic top plan view of the external appearance of a camera, showing the state of setting of the first exposure mode;

FIGS. 6 and 7 are schematic views which are used for explaining the operation of removing an indication disk;

FIG. 11 is a table showing the correspondence between input signals and set values;

FIGS. 12 to 18 diagrammatically show a second embodiment of the information input device for a camera according to the present invention;

FIG. 12 is a diagrammatic cross-sectional view showing the state of setting of the information input device in the first exposure mode;

FIG. 13 is a schematic exploded perspective view of the information input device of FIG. 12;

FIG. 14(a) is a schematic plan view showing one face of the information input device of FIG. 12;

FIG. 14(b) is a schematic plan view showing the other face of the information input device of FIG. 12;

FIG. 14(c) is a schematic cross-sectional view showing the information input device of FIG. 12;

FIG. 15 is a diagrammatic cross-sectional view showing the state of setting of the information input device in the second exposure mode;

FIGS. 17 and 18 are schematic views which are used for explaining the operation of removing an indication disk;

FIGS. 19 to 26 diagrammatically show a third embodiment of the information input device for a camera according to the present invention;

FIG. 19 is a diagrammatic cross-sectional view showing the state of setting of the information input device in the first exposure mode;

FIG. 20 is a schematic exploded perspective view of the information input device of FIG. 19;

FIG. 21(a) is a schematic plan view showing one face of the information input device of FIG. 19;

FIG. 21(b) is a schematic plan view showing the other face of the information input device of FIG. 19;

FIG. 21(c) is a schematic cross-sectional view showing the information input device of FIG. 19;

FIG. 22 is a diagrammatic cross-sectional view showing the state of setting of the information input device in the second exposure mode;

FIGS. 24 and 25 are schematic views which are used for explaining the operation of removing an indication disk;

FIG. 26 is a block diagram of a control system for a camera;

FIGS. 28(a) and 28(b) are a schematic exploded perspective view and a partial enlarged view respectively showing a fourth embodiment of the present invention;

FIG. 34 is a table showing the correspondence between the outputs and information of the three exposure modes;

FIG. 42 is a table showing dial codes;

DETAILED DESCRIPTION OF THE PREFERRED EMBODIMENTS

Preferred embodiments of the present invention will be described below with reference to the accompanying drawings.

Embodiment 1

FIGS. 1 to 7 diagrammatically show a first embodiment of an information input device for a camera according to the present invention.

Figure 1:
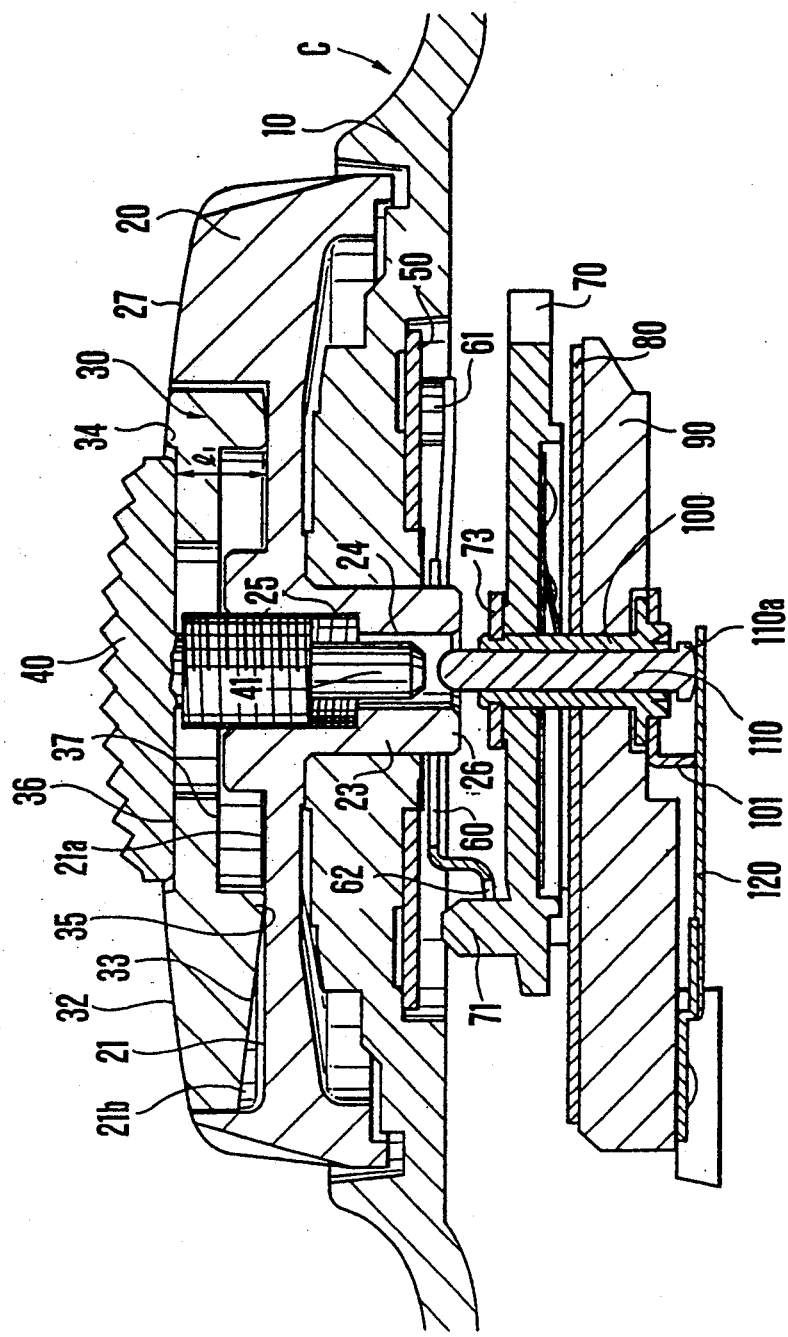
Figure 2:
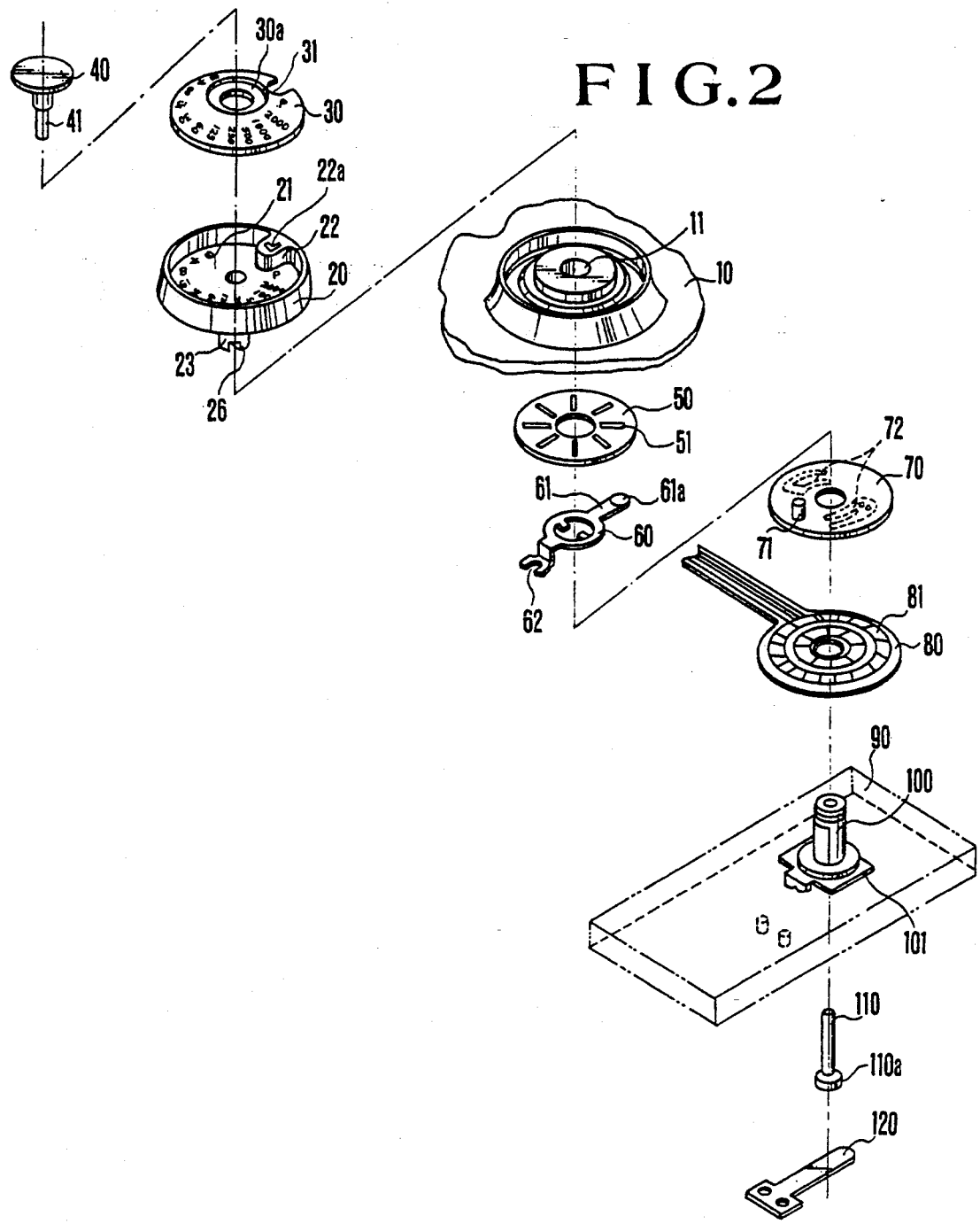

Referring to FIGS. 1 and 2, a dial body 20 has a circular shape in plan view, and a hollow rotating shaft 23 is formed on the reverse side of the dial body 20. The hollow rotating shaft 23 is inserted through and rotatably engaged with an engagement hole 11 formed in an exterior cover 10, and the dial body 20 is disposed on a top portion of a camera body C as shown in FIG. 5(a). A recess 21 is formed in the top side of the dial body 20 so that an indication plate 30, which will be described later, is substantially tightly fitted into the recess 21. The externally threaded portion of the securing screw 40 is screwed into an internally threaded portion 25 of a through-hole 24 formed in the rotating shaft 23 of the dial body 20, whereby the indication plate 30 is firmly secured to the dial body 20.

A click disk 50 is disposed approximately coaxially with the engagement hole 11 on the reverse side of the exterior cover 10. A click spring 60 has a click spring portion 61 at one end and an engagement part 62 at the other end, and is fixed to an end portion 26 of the rotating shaft 23 of the dial body 20. When the dial body 20 is rotated, a projection 61a, which is secured to an extending end of the click spring portion 61, is urged to fit into click grooves 51 which are radially formed in the click disk 50. This arrangement provides a click-stop motion with a click-like sound and prevents the dial body 20 from coming off. As described later, the engagement part 62 formed at the other end of the click spring 60 serves to drive a photographic information input parts (70 and 80) for generating electrical signals for inputting the rotation of the dial body 20, i.e., the setting of photographic information, into the microcomputer of the camera body C.

The indication plate 30 is formed into a disk-like configuration which is radially progressively reduced in thickness from the center to the outer circumference. As shown in FIGS. 3(a), 3(b) and 3(c), indications for use in a shutter-speed priority mode which is a first exposure mode are circumferentially displayed on one face (a first indication face) 32. Also, indications for use in an aperture-value priority mode which is a second exposure mode are circumferentially displayed on a second indication face 33 which is opposite to the first indication face 32. The dial body 20 has a top face 27 formed as a curved surface which has continuity with respect to the curved surface of the indication plate 30 which is fitted into the recess 21 of the dial body 20. In this manner, the dial body 20 and the indication plate 30 form an apparently integral, spherical configuration.

The indication plate 30 also has a doughnut like configuration with a central opening, and a flange portion 30a, which is maintained in contact with the head of the securing screw 40 for securing the indication plate 30, is formed around the central opening. A first screw supporting face 36 is formed on the same side as the first indication face 32 of the flange portion 30a, while a second screw supporting face 37 is formed on the same side as the second indication face 33. The first and second screw supporting faces 32 and 37 are formed like spot facings which are respectively defined by a first stepped face portion 34 and a second stepped face portion 35, each of which has a different depth. In the first embodiment, it is preferable to establish the relationship $l_1 > l_2$. In this relationship, $l_1$ represents the distance between the first screw supporting face 36 and the second stepped face portion 35 which is maintained in contact with a flat bottom 21a of the recess 21 of the dial body 20 in the state shown in FIG. 1 where the indication plate 30 is fitted into the dial body 20 with the first indication face 32 faced up, i.e. in viewable disposition, and $l_2$ represents the distance between the second screw supporting face 37 and the first stepped face portion 34 which is maintained in contact with the flat bottom 21a of the recess 21 of the dial body 20 in the state shown in FIG. 4 where the indication plate 30 is fitted into the dial body 20 with the second indication face 33 faced up.

Accordingly, if a first reached position is defined as a leading position reached by a leading end 41 when, in order to select a first exposure mode, the securing screw 40 is screwed down to a predetermined fastening position with the indication plate 30 attached to the dial body 20 with the first indication face 32 faced up, and if a second reached position is defined as a leading position reached by the leading end 41 when, in order to select a second exposure mode, the securing screw 40 is screwed down to a predetermined fastening position with the indication plate 30 attached to the dial body 20 with the second indication face 33 faced up, the first reached position and the second reached position differ from each other with respect to the rotating shaft 23 of the dial body 20 along the axis of the securing screw 40, that is to say, the first reached position is located above the second reached position. This positional difference is utilized to provide an electrical switching signal for allowing selection between the first exposure mode and the second exposure mode. An associated signal-switching mechanism will be described later.

If the indication plate 30 rotates with respect to the dial body 20 with the indication plate 30 attached to the dial body 20, correct setting will be impossible. Accordingly, in the first embodiment, a cutout 31 is formed in the indication plate 30 and a positioning projection 22 for engagement with the cutout 31 is formed on the inner peripheral portion of the recess 21 which receives the indication plate 30.

Figure 5B:
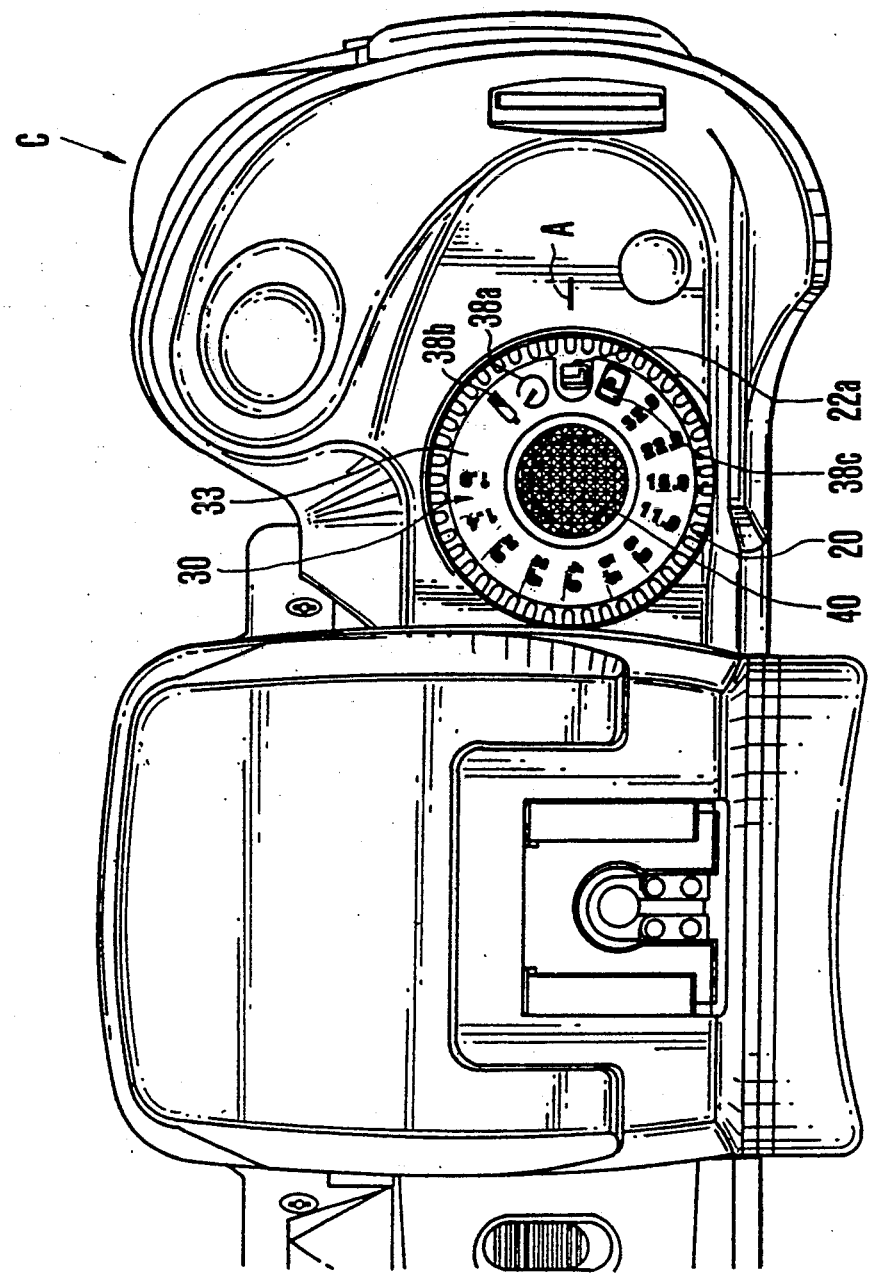
FIG. 5(b) is a schematic top plan view of the external appearance of the camera, showing the state of setting of the second exposure mode.

More specifically, if the first exposure mode corresponding to the shutter-speed priority mode is selected as shown in FIG. 5(a) or if the second exposure mode corresponding to the aperture-value priority mode is selected as shown in FIG. 5(b), all information, such as set values selectable in each mode, can be identified without any difficulty. If the dial body 20 provided on the top end portion of the camera body C is rotated to set an arbitrary value, which is displayed on the indication plate 30, at the position of a mark A provided on the camera body C, photographic conditions corresponding to this value are set. The first and second indication faces 32 and 33 of the indication plate 30 are provided with common information indications. The information indications include a self-timer indication 38a indicative of a self-timer mode and a battery check indication 38b indicative of the function of checking the battery of the camera, the indications 38a and 38b being orderly arranged in the counterclockwise direction with respect to the cutout 31. The information indications also include a programmed-mode indication 38c indicative of programmed photography, which is clockwise adjacent to the cutout 31, as well as a lock-position indication 22a displayed on the positioning projection 22 of the dial body 20 which engages with the cutout 31. The cutout 31 serves to define a lock position.

In addition to the common information indications, the first indication face 32 has a total of fifteen indications including "B", "4(¼)", "8(⅛)", "15(1/15)", "30(1/30)", "60(1/60)", "125(1/125)", "250(1/250)", "500(1/500)", "1000(1/1000)" and "2000(1/2000)". The click grooves 51 of the click disk 50 are formed at locations corresponding to the individual indications so that a click can be produced when each of the indications is brought into alignment with the position of the mark A.

The common information indications of the second indication face 33 are provided to be placed at positions identical to those of the common information indications of the first indication face 32. Instead of the shutter-speed indications, aperture-value indications (1.0, 1.4, 2.0, 2.8, 4.0, 5.6, 8.0, 11.0, 16.0, 22.0 and 32.0) are displayed at corresponding positions, and a click is produced when each of the indications is brought into alignment with the position of the mark A.

Figure 27A:
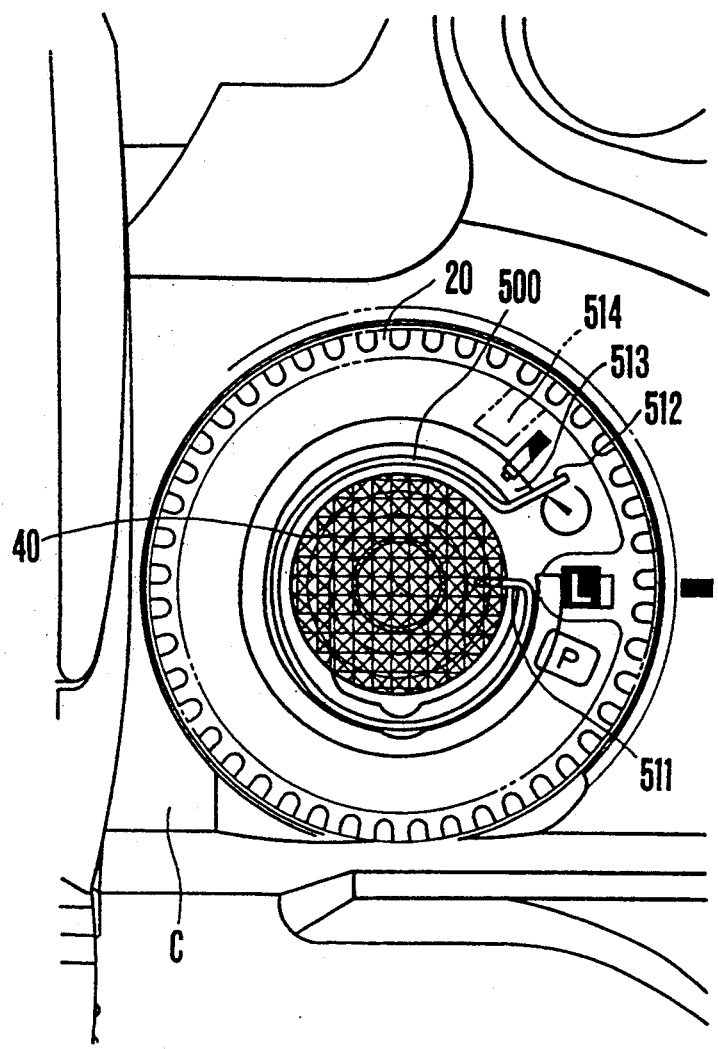
FIGS. 27(a) and 27(b) are schematic top plan views showing an automatic return spring mechanism.
Figure 27B:
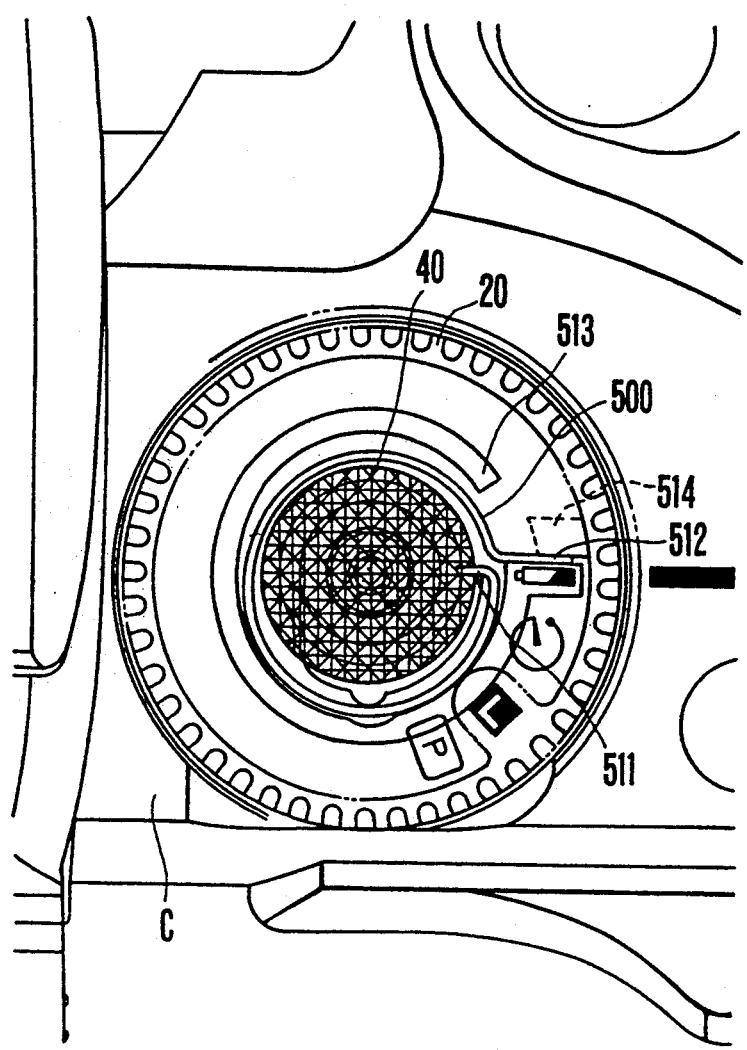

During a battery check using the dial body 20, if the dial body 20 is rotated clockwise from the position where the self-timer indication 38a is aligned with the mark A to the position where the battery check indication 38b is aligned with the same and then if all the fingers are removed from the dial body 20, the dial body 20 is returned to the position where the self-timer indication 38a is aligned with the mark A, by the automatic return spring mechanism shown in FIGS. 27(a) and 27(b), whereby the battery check is cancelled. When the battery check position is set, a warning of battery check is issued from a buzzer, as described later.

FIGS. 27(a) and 27(b) show the automatic return spring mechanism.

An automatic return spring 500 is composed of a circularly deformed leaf spring. One end 511 of the automatic return spring 500 is fixed to the camera body C as a fixed end, while the other end 512 having an L-like configuration as viewed in top plan is formed as a movable end. The movable end 512 is, as shown in FIG. 27(a), held in pressure contact with a spring stopper 513 provided on the camera body C so that an elastic force can consistently work counterclockwise.

A dial stopper 514 is provided on the dial body 20. When the dial body 20 is rotated clockwise and passes its self-timer position, the dial stopper 514 engages with the movable end 512 of the automatic return spring 500. When the dial body 20 is further rotated, the automatic return spring 500 starts to be deformed and a returning force is accumulated. When the dial body 20 is rotated to its battery check position and the fingers are removed from the dial body 20, the dial body 20 is rotated counterclockwise by the returning force of the automatic return spring 500 and the battery check is cancelled. Subsequently, the dial body 20 returns to the self-timer position.

In the first embodiment, removal of the securing screw 40 is needed when the exposure modes are to be switched. For this reason, to prevent the screw 40 from being excessively tightened when the securing screw 40 is again screwed into the dial body 20, the above-described type of spring is utilized for automatically returning the battery check indication to the position of the self-timer indication.

More specifically, the securing screw 40 is formed as a right-handed screw which is tightened in the clockwise direction. As the securing screw 40 is tightened after the indication plate 30 has been set in a predetermined position of the dial body 20, the dial body 20 rotates clockwise by a tightening force. Since the spring force of the above-described automatic return spring is selected as an urging force which is strong to some extent, the securing screw 40 is tightened against the urging force of the automatic return spring. Accordingly, when the battery check position is reached, the securing screw 40 is sufficiently tightened and, at the same time, a battery check can be performed.

Figure 6:
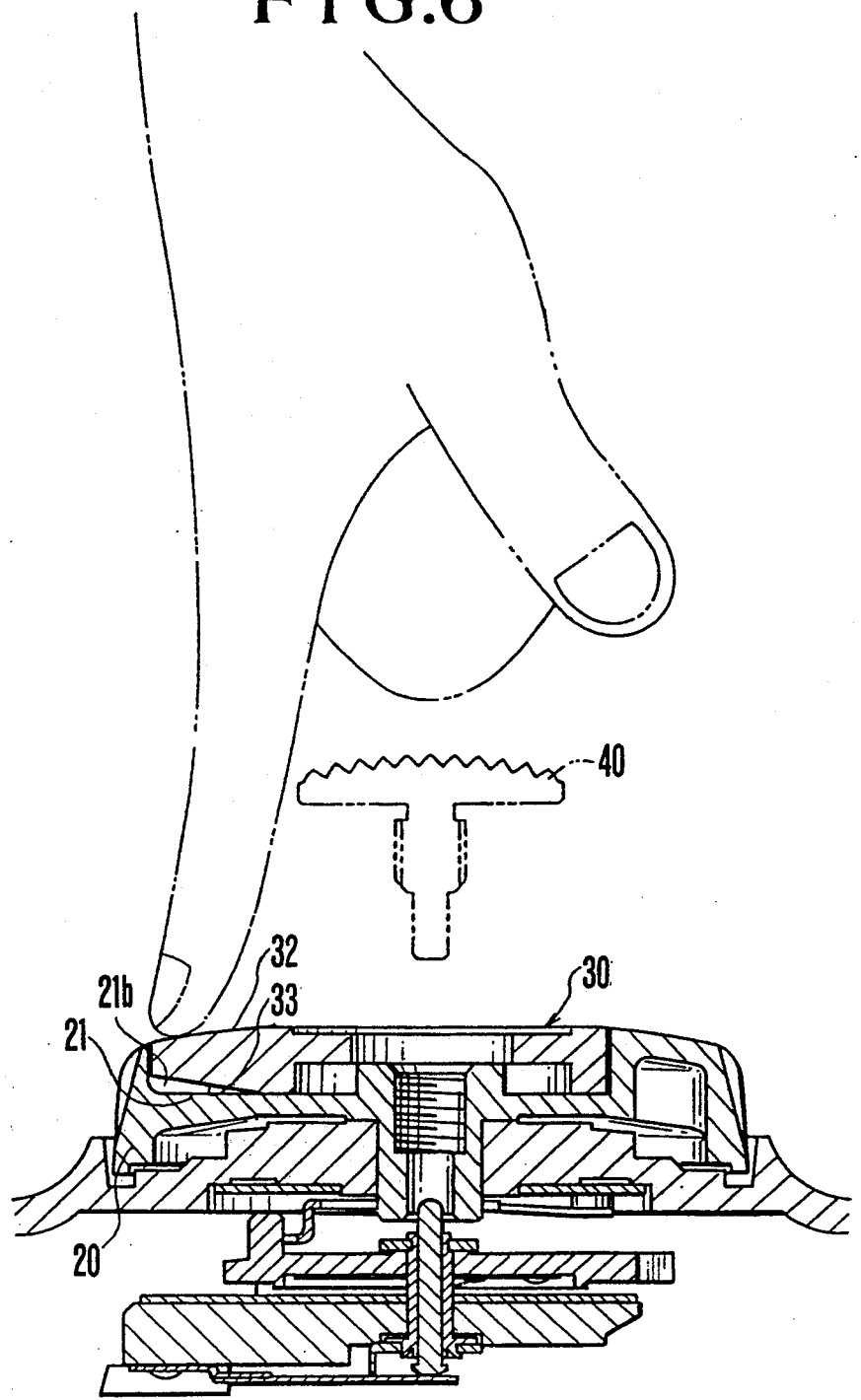
Figure 7:
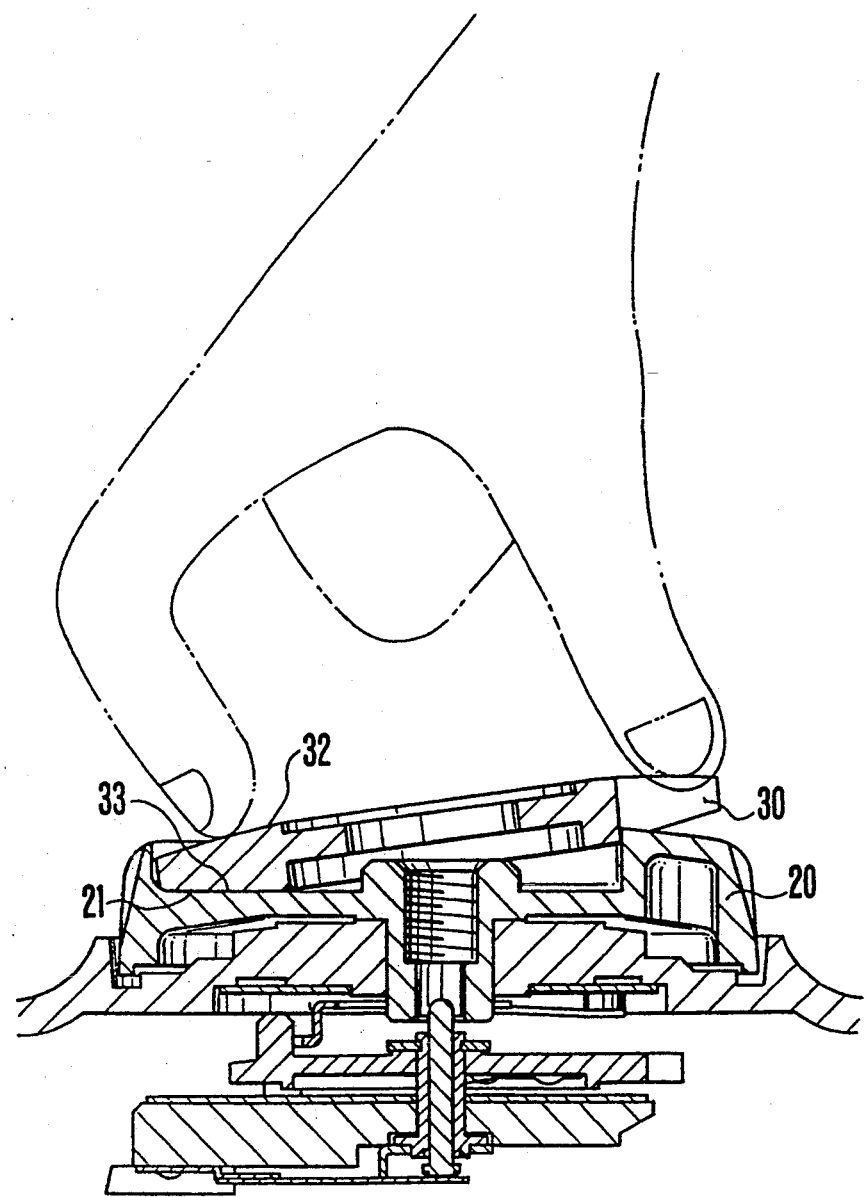

In the first embodiment, since the bottom 21a of the recess 21 is formed as a flat face and the indication plate 30 has a spherical configuration, a space 21b is formed between the portion of the bottom 21a which is closer to the outer periphery and the indication face of the indication plate 30 which faces down, with the indication plate 30 fitted into the recess 21 of the dial body 20. Accordingly, as shown in FIG. 6, when the indication plate 30 is pressed downwardly with a finger at a location opposite to the positioning projection 22 after the securing screw 40 has been removed, the side of the indication plate 30 which has been pressed is moved down into the space 21b while the side of the indication plate 30 which is closer to the positioning projection 22 is moved upwardly. By lifting the latter side, the indication plate 30 can be readily removed. In addition, although the indication plate 30 is fitted into the recess 21 to such an extent that the indication plate 30 is apparently integrated with the dial body 20, the operation of reversing the indication plate 30 to switch the exposure modes is facilitated.

Even if the indication plate 30 is formed into a flat configuration and the bottom 21a of the recess 21 is formed into a convex spherical configuration, removal of the indication plate 30 can be similarly readily performed.

The signal-switching mechanism for providing an electrical switching signal for allowing selection between the first exposure mode and the second exposure mode and a photographic-information input unit for generating an electrical photographic-information signal according to the rotation of the dial body 20 will be described below with reference to FIGS. 1 and 2.

A dial base plate 90 is fixed to the camera body C, and a hollow shaft 100 is inserted through and fixed in position to the dial base plate 90 coaxially with the above-described securing screw 40. A phase detecting board 80 is fixed to the top face of the dial base plate 90 concentrically with the axis of the hollow shaft 100. The surface of the phase detecting board 80 is provided with a pattern portion 81 for generating an electrical photographic-information signal coupled to a controlling microcomputer in the camera body C. A seat piece 70 is rotatably secured to the hallow shaft 100 and is opposed to the pattern portion 81. Brushes 72, which constitute electrically conducting pieces for contact with the pattern portion 81, are fixed to the bottom face of the seat piece 70. The brushes 72 are pressed toward the phase detecting board 80 by a thrust member 73 having a spring-like property which is provided on the hallow shaft 100. An engagement pin 71 projects from the top face of the seat piece 70, and engages with the engagement portion 62, which is formed at the other end of the above-described click spring 60, to rotate the seat piece 70 integrally with the rotation of the dial body 20.

A ground piece 101 is fixed to the bottom end portion of the hollow shaft 100 on the reverse side of the dial base plate 90. A selecting switch movable piece 120 having a spring-like property is also provided on the reverse side of the dial base plate 90. The selecting switch movable piece 120 can be brought into contact with the ground piece 101, and the extending end of the selecting switch movable piece 120 reaches the position of the opening of the hallow shaft 100. The selecting switch movable piece 120 and the ground piece 101 constitute a normally closed type of mode selecting switch operated to produce a switching signal for allowing selection between the first exposure mode and the second exposure mode. This mode selecting switch is switched on and off by utilizing a selecting pin 110 which is axially movably inserted through the hollow portion of the hollow shaft 100 from below. The selecting pin 110 is arranged in such a manner that its bottom end head 110a is consistently maintained in contact with the extending end of the selecting switch movable piece 120, and the selecting pin 110 is pressed by the spring force of the selecting switch movable piece 120 up to a position where the selecting switch movable piece 120 is in contact with the ground piece 101. The inserted end of the selecting pin 110 is located at a position (hereinafter called an "up position") where it is inserted into the through-hole 24 of the dial body 20 to a slight extent. When the selecting pin 110 is pressed downwardly against the spring force of the selecting switch movable piece 120, the mode selecting switch is switched off.

In the first embodiment, the operation of the selecting pin 110 is accomplished by means of the securing screw 40 for fixing the indication plate 30. In the case of the first exposure mode in which the first indication face 32 of the indication plate 30 is faced up, the first reached position at which the bottom end of the securing screw 40 is located is selected to be above the up position of the selecting pin 110. In the case of the second exposure mode in which the second indication face 33 of the indication plate 30 is faced up, the second reached position at which the bottom end of the securing screw 40 is located is selected to be below the up position of the selecting pin 110.

Accordingly, in the case of the first exposure mode, since the selecting pin 110 is not pressed downwardly by the securing screw 40, the mode selecting switch is closed and an ON signal indicative of the first exposure mode is inputted to the above-described microcomputer. In the case of the second exposure mode, since the selecting pin 110 is pressed downwardly by the securing screw 40, the mode selecting switch is open and an OFF signal indicative of the second exposure mode is inputted to the above-described microcomputer.

When the first exposure mode corresponding to the shutter-speed priority mode is set, the selecting pin 110 is not pressed down by the securing screw 40 and the mode selecting switch is closed. Accordingly, even if the securing screw 40 is not screwed into the dial body 20, an ON signal is outputted which indicates the first exposure mode in which the mode selecting switch is closed. For this reason, in the first embodiment, the bottom face of the recess 21 of the dial body 20 is provided with indications which are the same as those displayed on the first indication face 32 of the indication plate 30 which indicate information on the first exposure mode.

More specifically, if the first exposure mode corresponding to the shutter-speed priority mode is to be frequently used, it is not necessary to attach the indication plate 30 to the dial body 20 and it is possible to set a desired shutter speed while viewing the setting values displayed on the bottom of the recess 21 of the dial body 20.

Although the first embodiment has been explained with reference to the example in which information on shutter speeds and information on aperture values are prepared as information to be set and a mode corresponding to either information is selected by switching, the range of application of the present invention is not limited to the above-described shutter-speed priority mode or aperture-value priority mode. The present invention is applicable to various kinds of control modes for controlling a camera, for example, a program setting mode having different program charts for different kinds of subjects.

Figure 8:
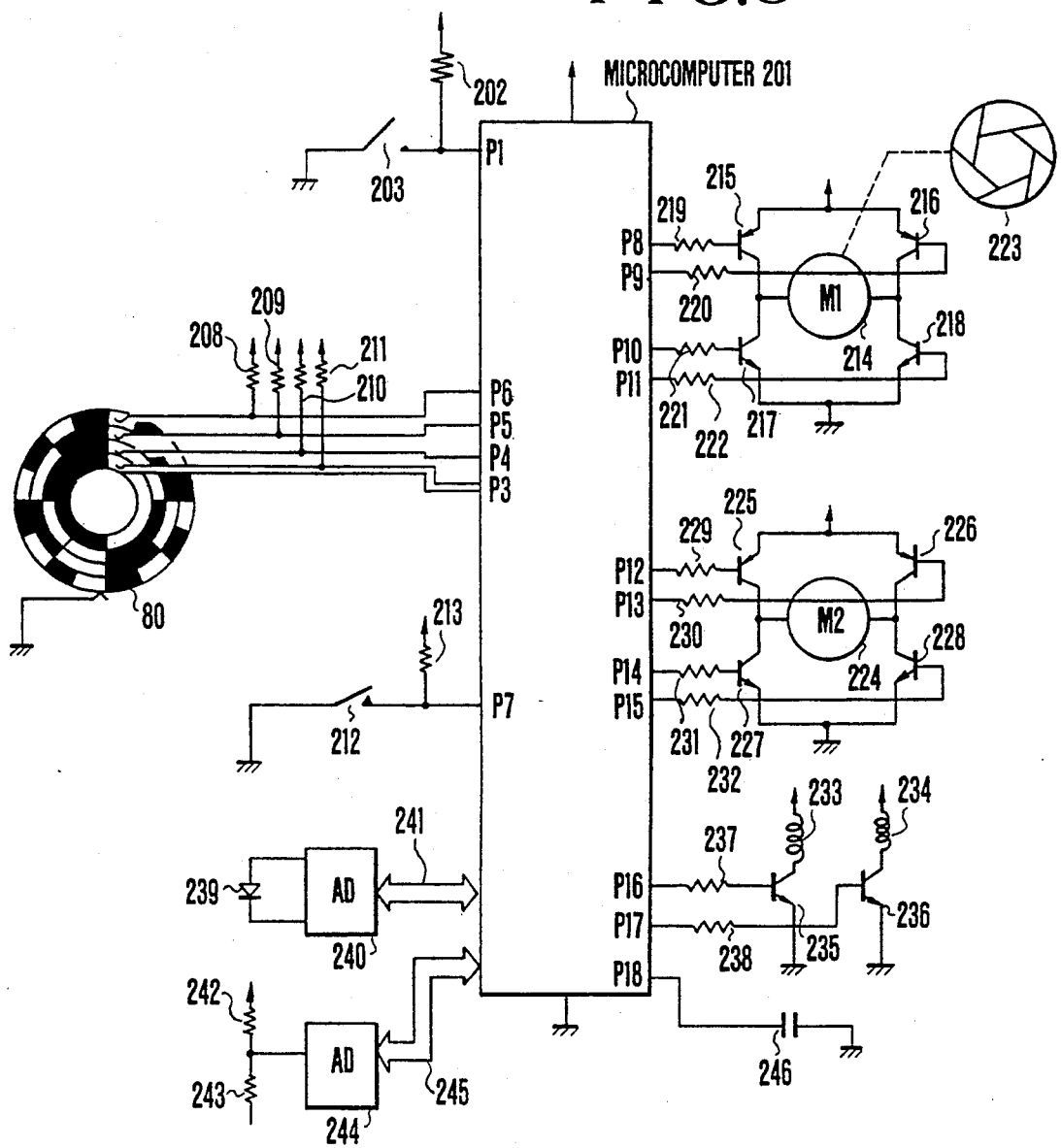
FIG. 8 is a block diagram of a control system for a camera.

FIG. 8 is a circuit diagram showing an example of a control system for a camera which receives a signal from the information input device according to the first embodiment and drives and controls various kinds of elements in the camera.

In FIG. 8, a microcomputer is designated by reference numeral 201, a pullup resistor by reference numeral 202 and a mode selecting switch by reference numeral 203. The mode selecting switch 203 is an operating switch which is switched on when the dial is set for the shutter-speed priority mode and which is switched off when the dial is set for the aperture-value priority mode.

A signal from the switch 203 is coupled to an input port P1 of the microcomputer 201. When the switch 203 is on, a low-level signal is inputted to the microcomputer 201, while when the switch 203 is off, a high-level signal is inputted to the same. The microcomputer 201 reads the signal provided at the input port P1, so that it can determine whether the dial is set for the shutter-speed priority mode or the aperture-value priority mode.

The phase detecting board 80 detects the rotation of the dial of the camera through the pieces 72 which rotate in association therewith. A 4-bit position signal corresponding to the position of the dial is inputted to input ports P3, P4, P5 and P6 of the microcomputer 201. Pullup resistors 208, 209, 210 and 211 are provided for detecting purposes. When the connected brushes are in contact with a conducting portion of the phase detecting board 80, a low-level signal is inputted to each of the input ports P3, P4, P5 and P6. When the connected brushes are in contact with a non-conducting portion, a high-level signal is inputted. FIG. 11 shows the states of signals which are inputted to the respective input ports P3, P4, P5 and P6 when the shutter-speed priority mode and the aperture-value priority mode are each selected. In FIG. 11, "0" indicates a low-level input signal and "1" indicates a high-level input signal.

Referring to FIG. 11, if low-level signal inputs are provided at all the input ports P3, P4, P5 and P6, the voltage of a power source (not shown) is checked whichever of the shutter-speed priority mode and the aperture-value priority mode is active, and an alarm sound corresponding to the voltage is issued. A sound generator 246 issues such alarm sound, and is connected to an output port P18 of the microcomputer 201 and driven by the microcomputer 201.

Referring again to FIG. 11, if the state of inputs at the input ports P3, P4, P5 and P6 is "0, 0, 0, 1", a self-timer operation mode is selected whichever of the shutter-speed priority mode and the aperture-value priority mode is active.

If the state of inputs at the input ports P3, P4, P5 and P6 is "0, 0, 1, 0", the state of inhibiting a release operation is selected whichever of the shutter-speed priority mode and the aperture-value priority mode is active. In this state, even if a release button is depressed, no release operation is performed.

Figure 10:
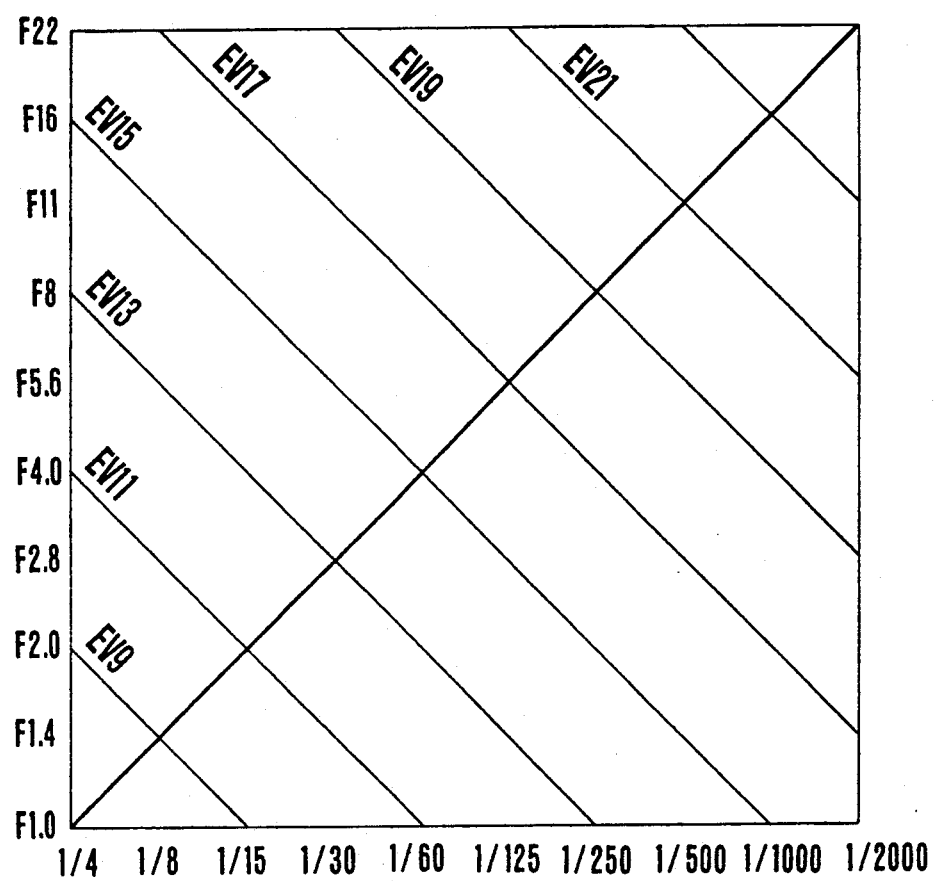
FIG. 10 is an exposure control chart.

If the state of inputs at the input ports P3, P4, P5 and P6 is "0, 0, 1, 1", neither a shutter-speed priority operation nor an aperture-value priority operation is performed whichever of the shutter-speed priority mode and the aperture-value priority mode is selected. The system in turn switches to a programmed automatic exposure mode in which the shutter speed and the aperture value simultaneously vary with variations of luminance to provide correct exposure. FIG. 10 shows an example of the relationship between shutter speeds and aperture values in the programmed automatic exposure mode.

If the programmed automatic exposure mode is not selected, that is, if either the shutter-speed priority mode or the aperture-value priority mode is selected, a priority set value corresponding to a selected mode is obtained in accordance with the table of FIG. 11.

For example, if the state of inputs at the input ports P3, P4, P5 and P6 is "0, 1, 0, 0" when the shutter-speed priority mode is active, a shutter speed of 1/2000 seconds is set as a priority shutter speed. If the state of inputs at the input ports P3, P4, P5 and P6 is "1, 0, 1, 1" when the aperture-value priority mode is active, F 2.8 is set as a priority aperture value.

Referring back to FIG. 8, a switch 212 is interlocked with the release button of the camera, and is switched on when the release button is depressed. A signal from the switch 212 is inputted to an input port 7 of the microcomputer 201, so that the microcomputer 201 can read the state of the release button.

A photometric silicon photodiode is denoted by reference numeral 239, and an A/D converter 240 effects A/D conversion of the photometric value outputted from the silicon photodiode 239. The A/D converter 240 transmits photometric information to the microcomputer 201 over a bus line 241.

Resistors 242 and 243 divide the voltage of a power source battery, and an A/D converter 244 effects A/D conversion of the divided voltage. The A/D converter 244 transmits voltage information to the microcomputer 201 over a bus line 245.

A motor (M1) 214 is driven to open and close a diaphragm 223 of the photo-taking lens of the camera.

PNP transistors are denoted by reference numerals 215 and 216, and NPN transistors are denoted by reference numerals 217 and 218.

The collectors of the respective PNP transistors 215 and 216 are connected across the motor M1 and the collectors of the respective NPN transistors 217 and 218 are also connected across the motor M1. The emitter of either of the PNP transistors 215 and 216 is connected to the positive side of the power source (not shown), while the emitter of either of the NPN transistors 217 and 218 is connected to the minus side of the power source. The bases of the PNP transistors 215 and 216 are respectively connected to output ports P8 and P9 of the microcomputer 201 through resistors 219 and 220.

The bases of the NPN transistors 217 and 218 are respectively connected to output ports P10 and P11 of the microcomputer 201 through resistors 221 and 222.

In the above-described arrangement, forward and reverse drive of the motor M1 is appropriately controlled by the microcomputer 201.

A motor (M2) 224 performs transport of a photographic film (not shown) during a forward run and, during a reverse run, causes a main mirror to move up and down and energizes a shutter spring.

PNP transistors are denoted by reference numerals 225 and 226, and NPN transistors are denoted by reference numerals 227 and 228.

The collectors of the respective PNP transistors 225 and 226 are connected across the motor M2 and the collectors of the respective NPN transistors and 228 are also connected across the motor M2. The emitter of either of the PNP transistors 225 and 226 is connected to the positive side of the power source (not shown), while the emitter of either of the NPN transistors 227 and 228 is connected to the minus side of the power source.

The bases of the PNP transistors 225 and 226 are respectively connected to output ports P12 and P13 of the microcomputer 201 through base resistors 229 and 230.

The bases of the NPN transistors 227 and 228 are respectively connected to output ports P14 and P15 of the microcomputer 201 through resistors 231 and 232.

In the above-described arrangement, forward and reverse drive of the motor M2 is appropriately controlled by the microcomputer 201.

A magnet 233 releases the engagement of a shutter leading curtain (not shown) to allow it to run. A magnet 234 releases the engagement of a shutter trailing curtain (not shown) to allow it to run.

The magnet 233 is connected to the collector of the NPN transistor 235, while the magnet 234 is connected to the collector of the NPN transistor 236.

The bases of the NPN transistors 235 and 236 are respectively connected to output ports P16 and P17 of the microcomputer 201 through base resistors 237 and 238.

In the above-described arrangement, control of the shutter leading and trailing curtains is appropriately performed by the microcomputer 201.

Figure 9:
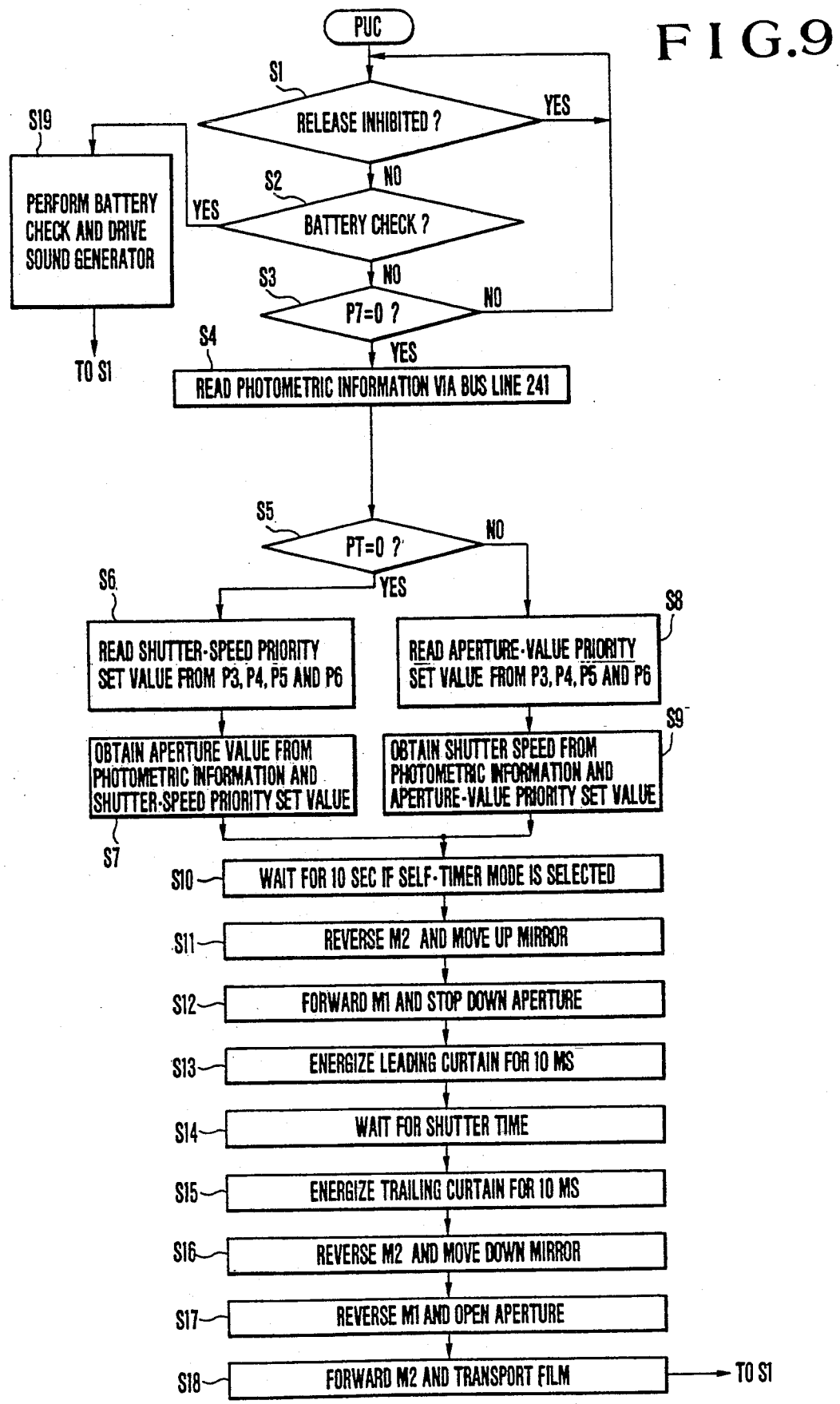
FIG. 9 is a flow chart showing the operation of the control system.

The operation of the electric circuit having the above-described arrangement will be described below with reference to FIG. 9, which shows an operational flow chart of the microcomputer 201.

When electricity is supplied to the camera, the microcomputer 201 initiates an operation starting with Step S1.

[Step S1] The microcomputer 201 reads input signals provided at the input ports P3, P4, P5 and P6 and determines whether a release operation is inhibited, that is, whether the state of "0, 0, 1, 0" occurs. If the release operation is inhibited, the process does not proceed to the following step and returns to Step S1. If the release operation is not inhibited, the process proceeds to Step S2.

[Step S2] The microcomputer 201 likewise reads input signals provided at the input ports P3, P4, P5 and P6 and determines whether a check of source voltage is to be made, that is, whether the state of "0, 0, 0, 0" occurs. If a check of source voltage is to be made, the process proceeds to Step S19. Otherwise, the process proceeds to Step S3.

[Step S19] The microcomputer 201 performs communication with the A/D converter 244 over the bus line 245 to check the source voltage. On the basis of the check result, the microcomputer 201 drives the output port P18. If the source voltage is sufficiently high, the sound generator is driven at short intervals of 8 Hz. If the source voltage is low, the sound generator is driven at long intervals of 2 Hz.

[Step S3] The microcomputer 201 reads from the input port P7 the state of the switch 212 interlocked with the release button. If the input signal at the port P7 is at a low level, this indicates that the release button is in a depressed state. Therefore, the process proceeds to step S4 to initiate a release operation. If the input signal at the port P7 is at a high level, the process returns to Step S1 and repeats Steps S1 to S3 until the release button is depressed.

[Step S4] The microcomputer 201 performs communication with the A/D converter 240 over the bus line 241 to receive photometric information.

[Step S5] The microcomputer 201 reads from the port P1 the state of the switch 203 which determines whether the dial is set for the shutter-speed priority mode or the aperture-value priority mode. If the input signal at the port P1 is at a low level, this indicates that the dial is set for the shutter-speed priority mode. Therefore, the process proceeds to Step S6 to execute arithmetic processing for the shutter-speed priority mode. If the input signal at the port P1 is at a high level, this indicates that the dial is set for the aperture-value priority mode. Therefore, the process proceeds to Step S8.

[Step S6] The microcomputer 201 finds a shutter-speed priority value on the basis of the input signals at the input ports P3, P4, P5 and P6 in accordance with the table of FIG. 11.

[Step S7] The microcomputer 201 finds an aperture value for correct exposure through arithmetic operations on the basis of the input photometric information and shutter-speed priority value. If the programmed automatic exposure mode is active, a particular shutter speed and aperture value are determined in accordance with the program chart shown in FIG. 10. Thereafter, the process proceeds to Step S10.

[Step S8] Even if the dial is set for the aperture-value priority mode, the microcomputer 201 finds a set aperture value on the basis of the input signals at the input ports P3, P4, P5 and P6 in accordance with the table of FIG. 11.

[Step S9] The microcomputer 201 finds a shutter speed for correct exposure through arithmetic operations on the basis of the input photometric information and shutter-speed priority value. If the programmed automatic exposure mode is active, a particular shutter speed and aperture value are determined in accordance with the program chart shown in FIG. 10. Thereafter, the process proceeds to Step S10.

[Step S10] If the self-timer mode is active, the process waits until a period of 10 seconds elapses. If the self-timer mode is not selected, the process immediately proceeds to Step S11.

[Step S11] The microcomputer 201 outputs a low-level signal through the output port P12 to switch on the PNP transistor 225. The microcomputer 201 also outputs a high-level signal through the output port P13 to switch off the PNP transistor 226. The microcomputer 201 also outputs a low-level signal through the output port P14 to switch off the NPN transistor 227. The microcomputer 201 also outputs a high-level signal through the output port P15 to switch on the NPN transistor 228. As a consequence, a current flows through the motor M2 from left to right, thereby causing the motor M2 to run in the reverse direction. In turn, the main mirror of the camera is moved up and a photographic operation is ready.

[Step S12] The microcomputer 201 outputs a high-level signal through the output port P8 to switch off the PNP transistor 215. The microcomputer 201 also outputs a low-level signal through the output port P9 to switch on the PNP transistor 216. The microcomputer 201 also outputs a high-level signal through the output port P10 to switch on the NPN transistor 217. The microcomputer 201 also outputs a low-level signal through the output port P11 to switch on the NPN transistor 218.

As a consequence, a current flows through the motor M1 from right to left, thereby causing the motor M1 to run in the forward direction. In turn, the diaphragm of the camera is driven in the direction in which it is stopped down. When the diaphragm is stopped down to a predetermined position, the microcomputer 201 sets a high-level signal at each of the output ports P8, P9, P10 and P11, thereby stopping the motor M1.

[Step S13] The microcomputer 201 outputs a high-level signal from the output port P16 for 10 milliseconds. As a consequence, the engagement of the shutter leading curtain is released and the shutter leading curtain starts running.

[Step S14] The process waits for the end of the period during which the shutter is open. This period corresponds to a priority set value when the shutter-speed priority mode is active. If the aperture-value priority mode is active, the period corresponds to a shutter speed which is obtained as the result of arithmetic processing for obtaining correct exposure with respect to a set aperture value. In the case of bulb photography, the process stays in Step S14 until the release button of the camera is relieved. After the release button has been relieved, the process proceeds to Step S15. The operation of the release button can be identified from the input signal provided at the input port P1 as described above.

[Step S15] The microcomputer 201 outputs a high-level signal from the output port P17 for 10 milliseconds. As a consequence, the engagement of the shutter trailing curtain is released and the shutter trailing curtain starts running.

[Step S16] The microcomputer 201 outputs a low-level signal through the output port P12 to switch on the PNP transistor 225. The microcomputer 201 also outputs a high-level signal through the output port P13 to switch off the PNP transistor 226. The microcomputer 201 also outputs a low-level signal through the output port P14 to switch off the NPN transistor 227. The microcomputer 201 also outputs a high-level signal through the output port P15 to switch on the NPN transistor 228.

As a consequence, a current flows through the motor M2 from left to right, thereby causing the motor M2 to run in the reverse direction.

Thus, the main mirror of the camera moves down from its upper position, while energizing shutter springs for both of the leading and trailing curtains at the same time.

[Step S17] The microcomputer 201 outputs a low-level signal through the output port P8 to switch on the PNP transistor 215. The microcomputer 201 also outputs a high-level signal through the output port P9 to switch off the PNP transistor 216. The microcomputer 201 also outputs a low-level signal through the output port P10 to switch off the NPN transistor 217. The microcomputer 201 also outputs a high-level signal through the output port P11 to switch on the NPN transistor 218.

As a consequence, a current flows through the motor M1 from left to right, thereby causing the motor M1 to run in the reverse direction. In turn, the diaphragm of the camera is fully opened.

[Step S18] The microcomputer 201 outputs a high-level signal through the output port P12 to switch off the PNP transistor 225. The microcomputer 201 also outputs a low-level signal through the output port P13 to switch on the PNP transistor 226. The microcomputer 201 also outputs a high-level signal through the output port P14 to switch on the NPN transistor 227. The microcomputer 201 also outputs a low-level signal through the output port P15 to switch off the NPN transistor 228.

As a consequence, a current flows through the motor M2 from right to left, thereby causing the motor M2 to run in the forward direction. Thus, one exposed frame of the photographic film is transported to complete a series of release operations. Thereafter, the process returns to Step S1 and the above-described operation is repeated.

Embodiment 2

FIGS. 12 to 18 diagrammatically show a second embodiment of an information input device for a camera according to the present invention.

The second embodiment differs from the first embodiment merely in that an indication plate 300 having indications similar to those of the indication plate 30 is removably secured in the recess 21 of the dial body 20 without the use of the securing screw 40 and in that the ON-OFF operation of the mode selecting switch is modified because of the nonuse of the securing screw 40. The arrangement of the other elements of the second embodiment is substantially the same as that of the corresponding elements of the first embodiment. Accordingly, modified elements only are explained and an explanation of the other elements is omitted.

As shown in FIGS. 14(a), 14(b) and 14(c), the indication plate 300 has a disk-like configuration whose middle portion is flat on either side and whose thickness is progressively reduced toward the outer periphery. Unlike the first embodiment, the indication plate 300 is not formed into a doughnut-like configuration. A first indication face 320 on which indications for the first exposure mode are circumferentially formed has a middle face portion (hereinafter called a "first supporting face") 340 which is formed as a flat face. A second indication face 330 on which indications for the second exposure mode are circumferentially formed has a middle face portion (hereinafter called a "second supporting face") 350 which is similarly formed as a flat face. Either of the first supporting face 340 and the second supporting face 350 can be brought into contact with the bottom 21a of the recess 21.

The first supporting face 340 and the second supporting face 350 have magnetism, and a magnet M is embedded in the bottom 21a of the recess 21 which comes into contact with either of the supporting faces 340 and 350, whereby the indication plate 300 is attracted to the recess 21 by magnetic force.

Because of the nonuse of the securing screw 40, the mode-selecting switch mechanism is arranged in such a manner that the selecting pin 110 is inserted through the through-hole 24 of the dial body 20, and its inserted end extends into a position slightly above the bottom 21a of the recess 21 so that it can be brought into direct contact with the indication plate 300.

In the first embodiment, when the first exposure mode is selected, that is, when the first indication face 320 is faced up, the mode selecting switch is held in a closed state and inputs an ON signal to the microcomputer 201. In the second embodiment, to input a similar signal, a depression 360 which does not come into contact with the end of the selecting pin 110 is formed in the middle portion of the second supporting face 350 of the indication plate 300.

Figure 12:
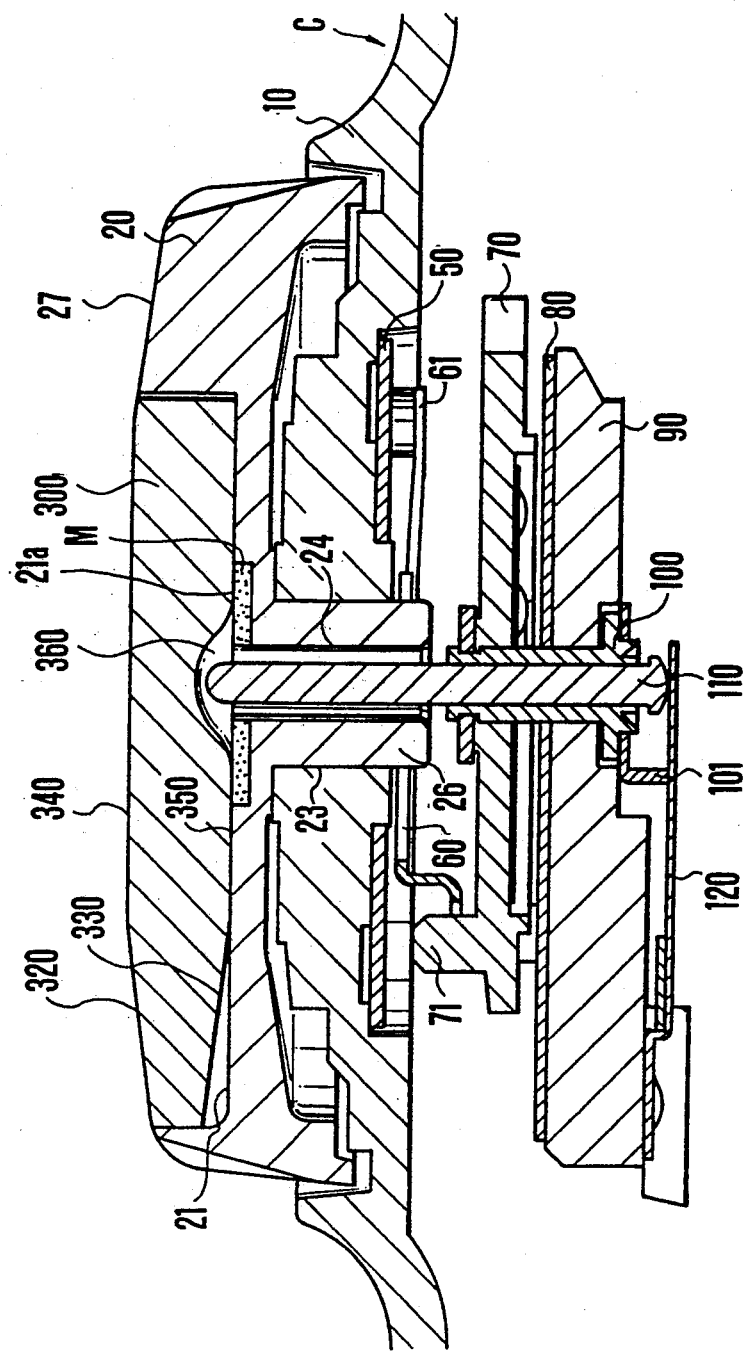
Figure 13:
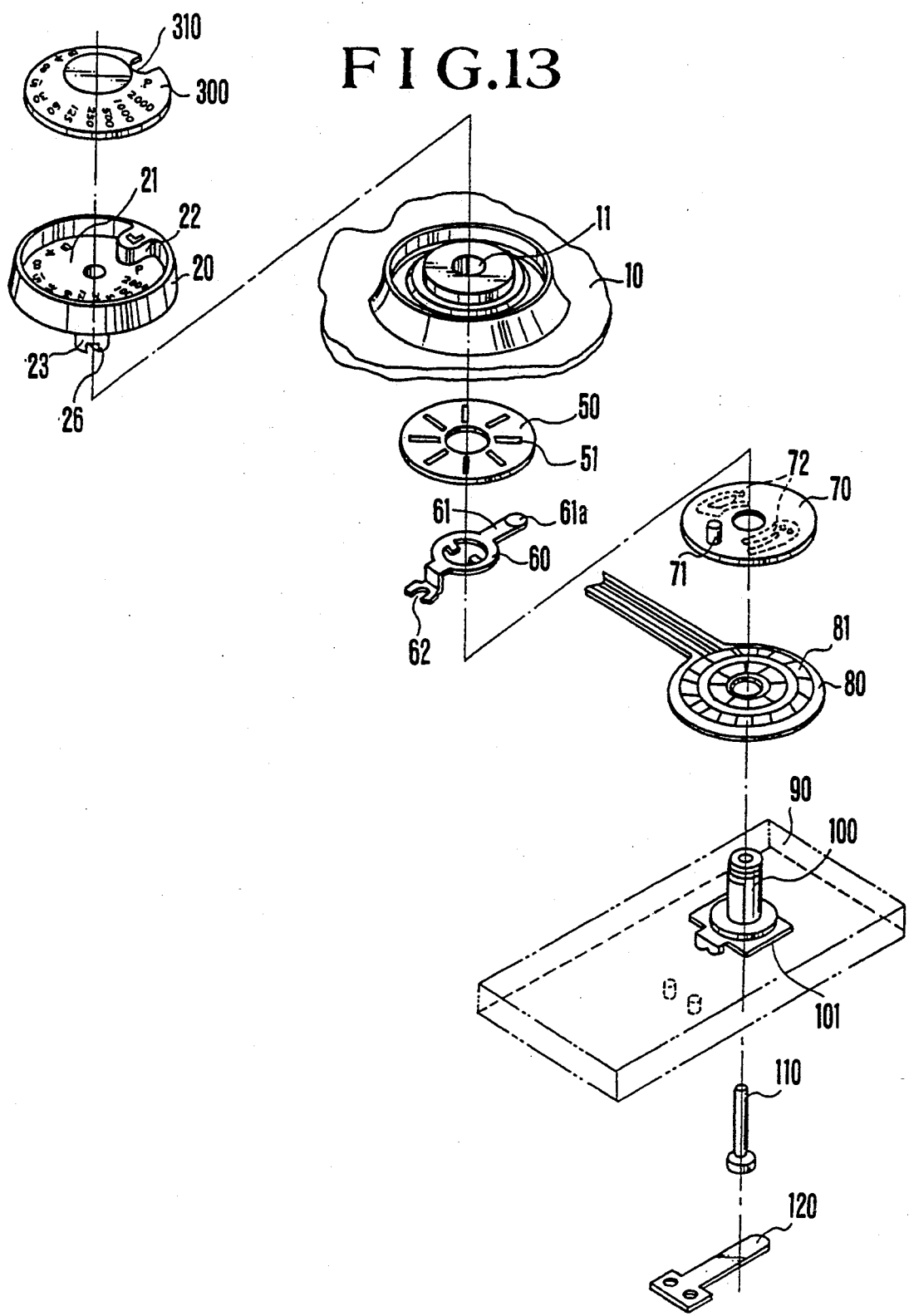
Figure 16A:
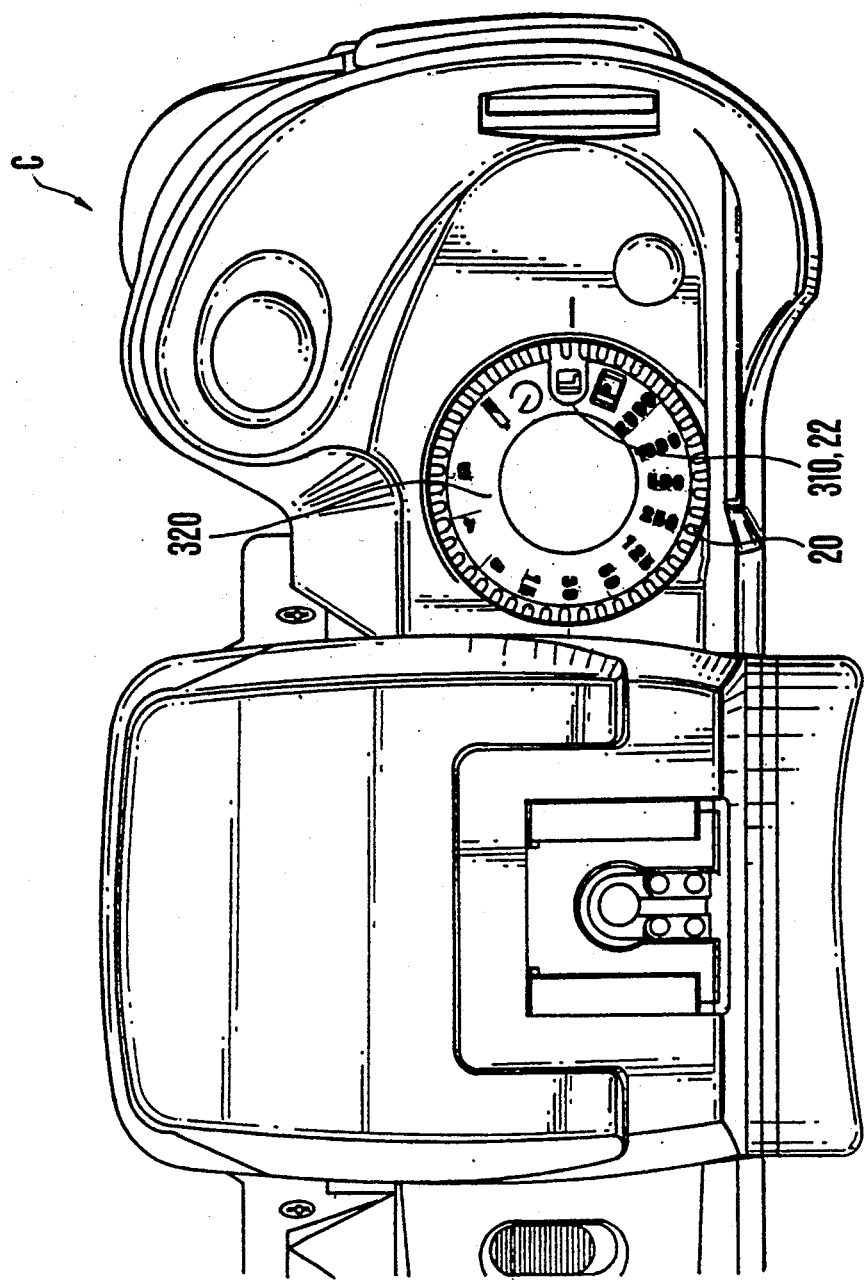
FIG. 16(a) is a schematic top plan view of the external appearance of a camera, showing the state of setting of the first exposure mode.

Accordingly, when the first exposure mode is selected as shown in FIG. 16(a), the second indication face 330 of the indication plate 300 is faced down as shown in FIG. 12. The provision of the depression 360 prevents the selecting pin 110 from being forced down, whereby an ON signal indicative of the first exposure mode is inputted to the microcomputer 201.

Figure 16B:
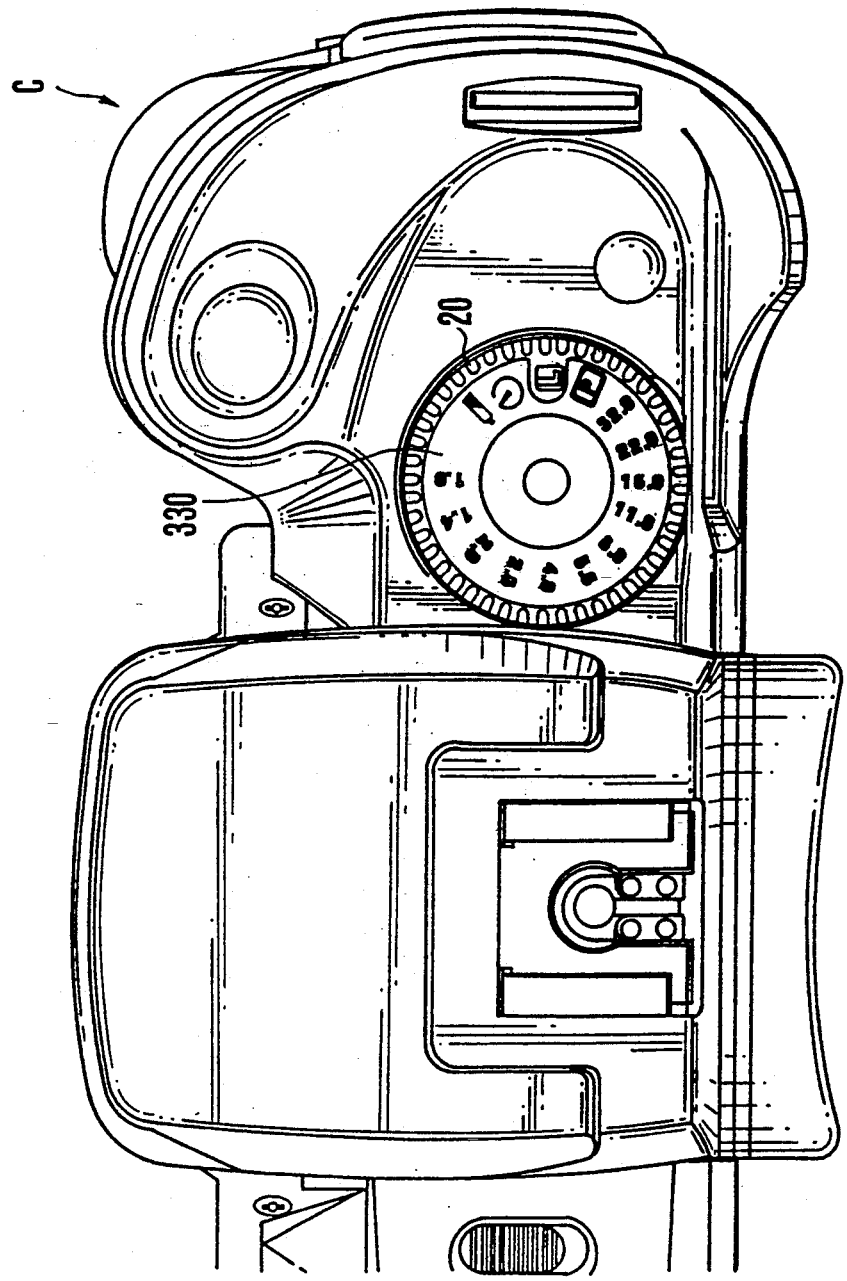
FIG. 16(b) is a schematic top plan view of the external appearance of the camera, showing the state of setting of the second exposure mode.
Figure 17:
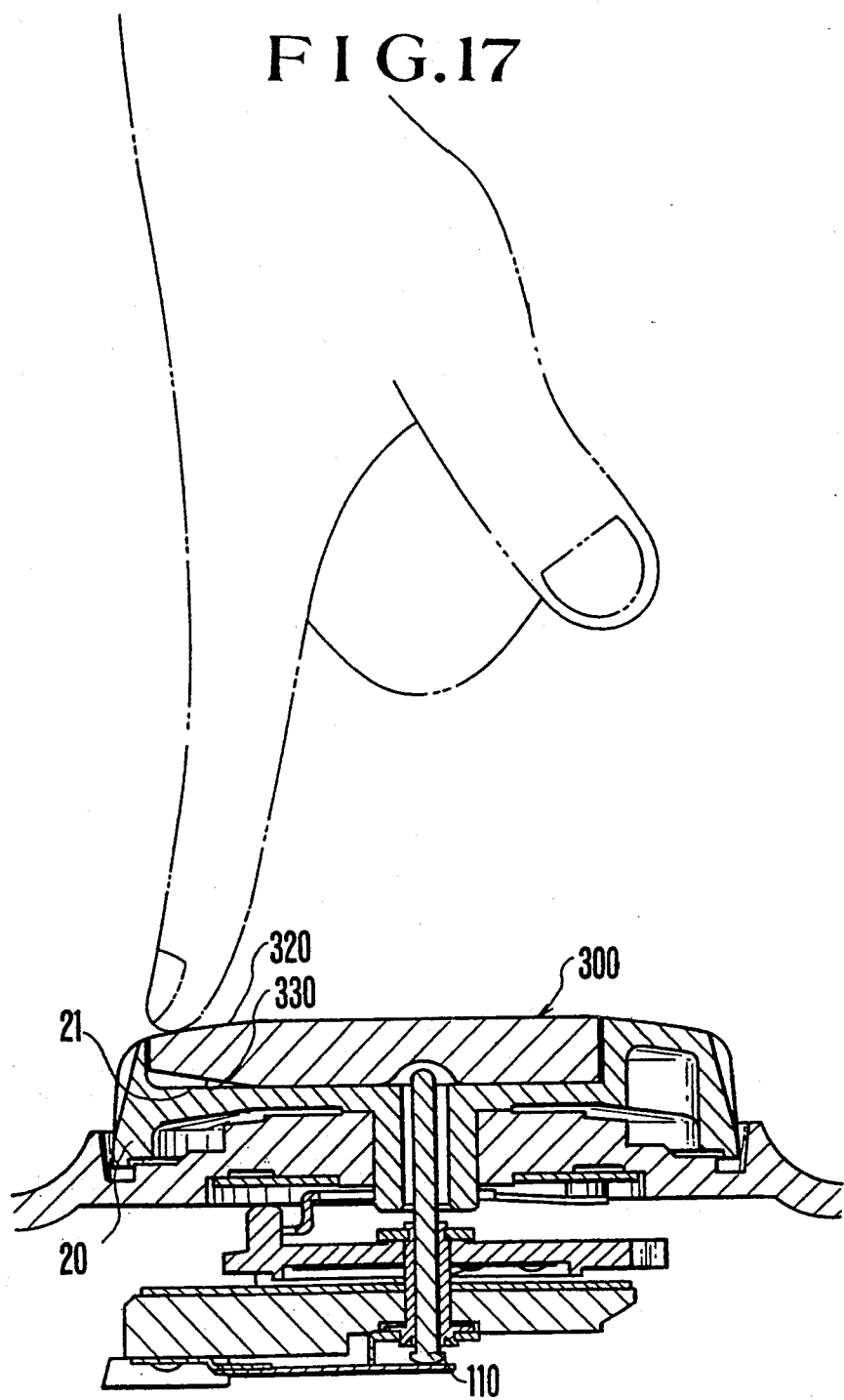
Figure 18:
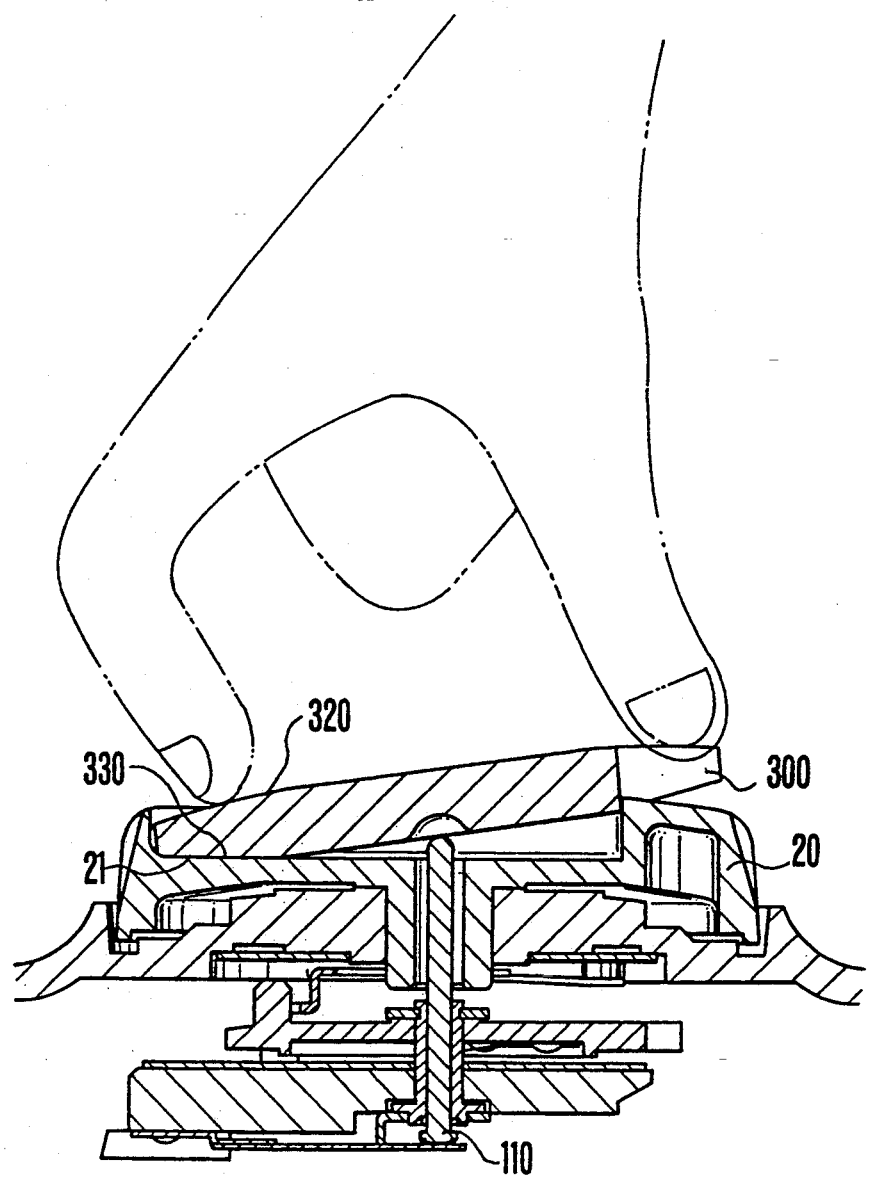

When the second exposure mode is to be selected, the indication plate 300 is pressed downwardly and removed with fingers as shown in FIGS. 17 and 18, as in the case of the first embodiment. The indication plate 300 is then reversed and again attached with a cutout 310 fitted onto the positioning projection 22, as shown in FIG. 16(b). In this case, since the indication plate 300 is set with the first indication plate 320 faced down as shown in FIG. 15, the first supporting face 340 interferes with the end of the selecting pin 110 to force the selecting pin 110 downwardly, thereby opening the mode selecting switch. As a consequence, an OFF signal indicative of the second exposure mode is inputted to the microcomputer 201.

Embodiment 3

FIGS. 19 to 25 diagrammatically show a third embodiment of an information input device for a camera according to the present invention.

In either of the first and second embodiments described above, mode selection between the first exposure mode and the second exposure mode is effected by using the mechanical switch mechanism which operates in accordance with the reverse operation of the indication plate 30 or 300. In contrast, in the third embodiment, such mode selection is effected in a non-contact manner by using an optical switch mechanism. The main feature of the third embodiment resides in a modification in which an optical switch mechanism is incorporated in place of the mechanical mode selecting switch mechanism used in the second embodiment, and the arrangement of the other elements of the third embodiment is substantially the same as that of the corresponding elements of the second embodiment. Accordingly, modified elements only are explained and an explanation of the other elements is omitted.

Figure 19:
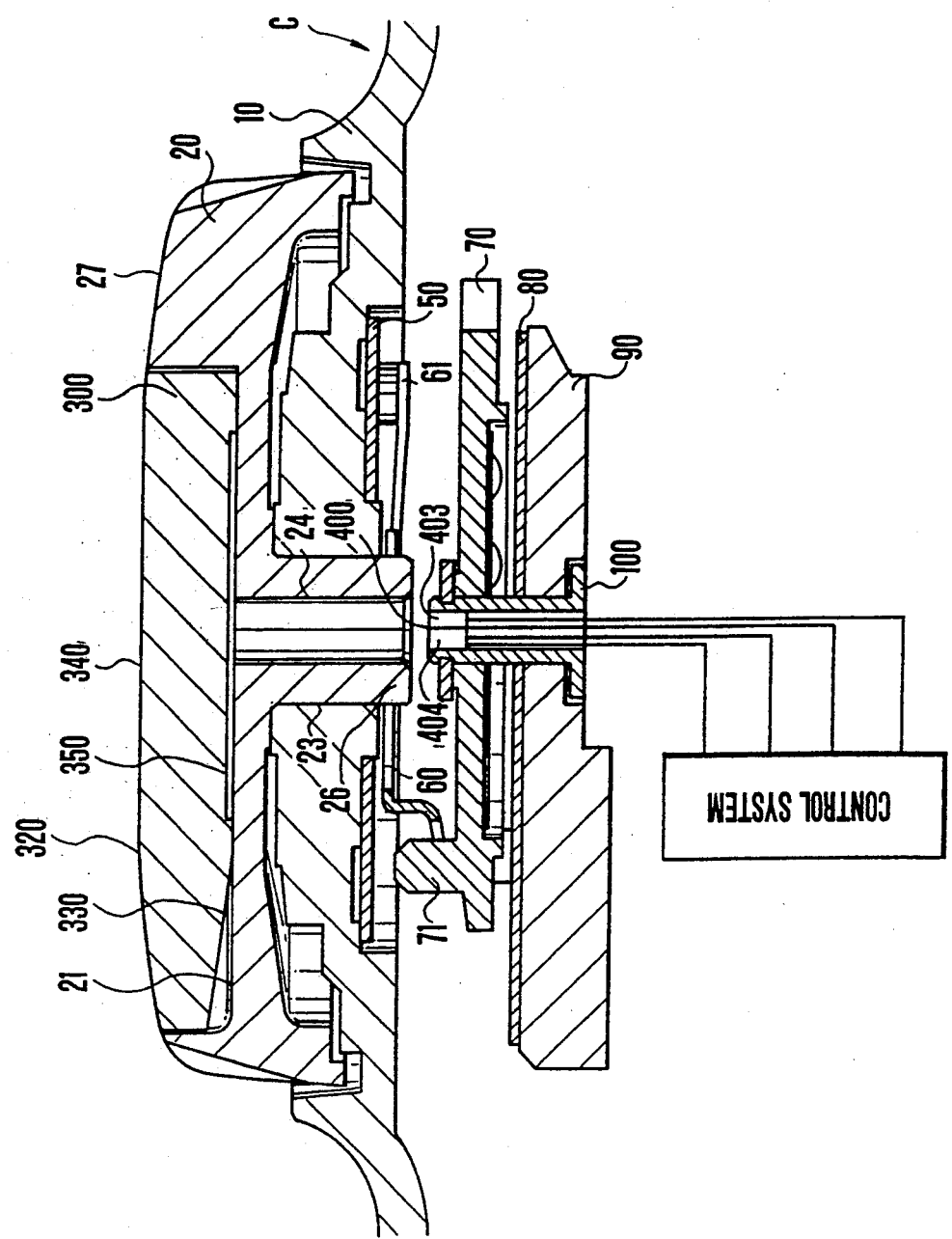
Figure 20:
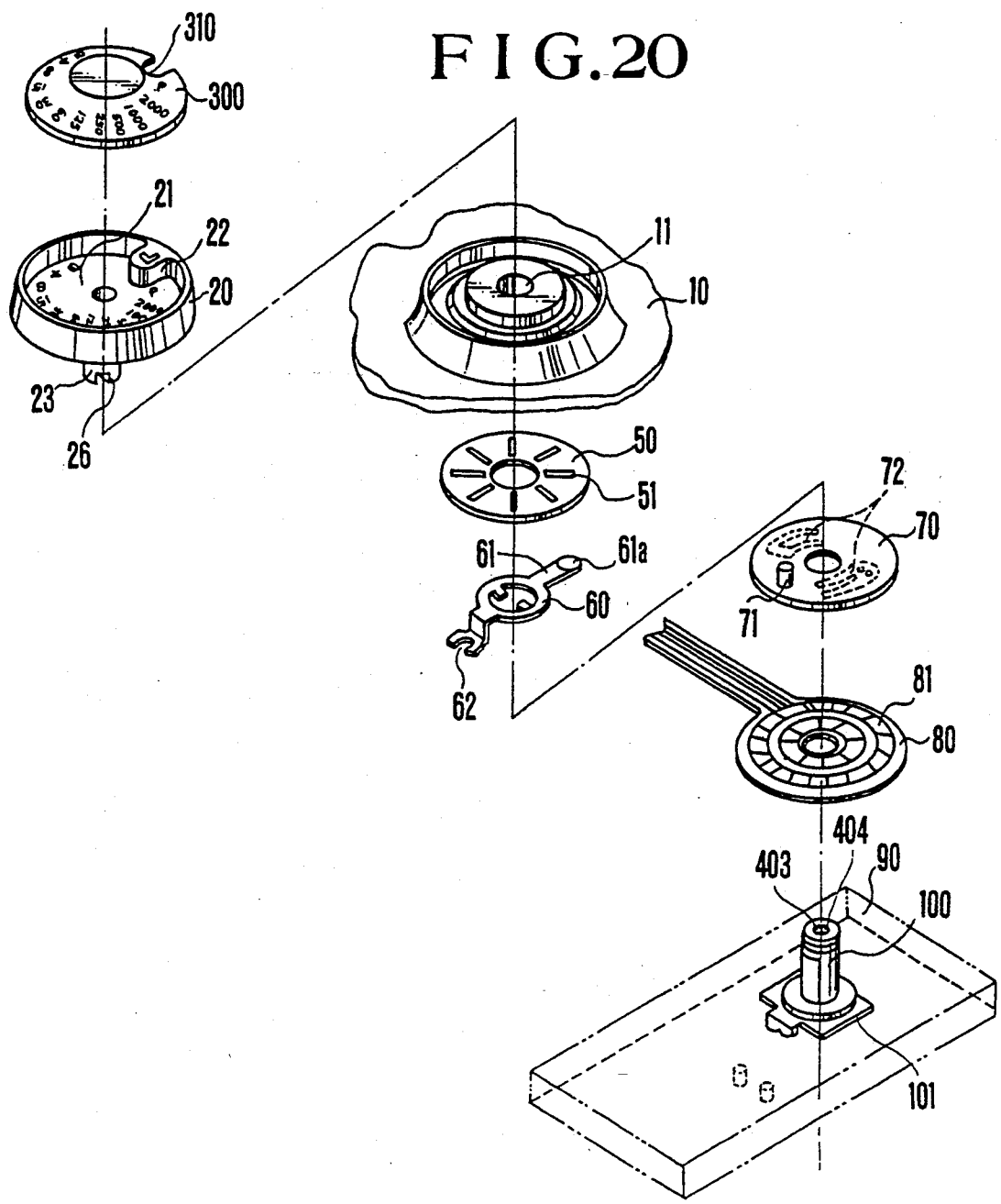
Figure 21:
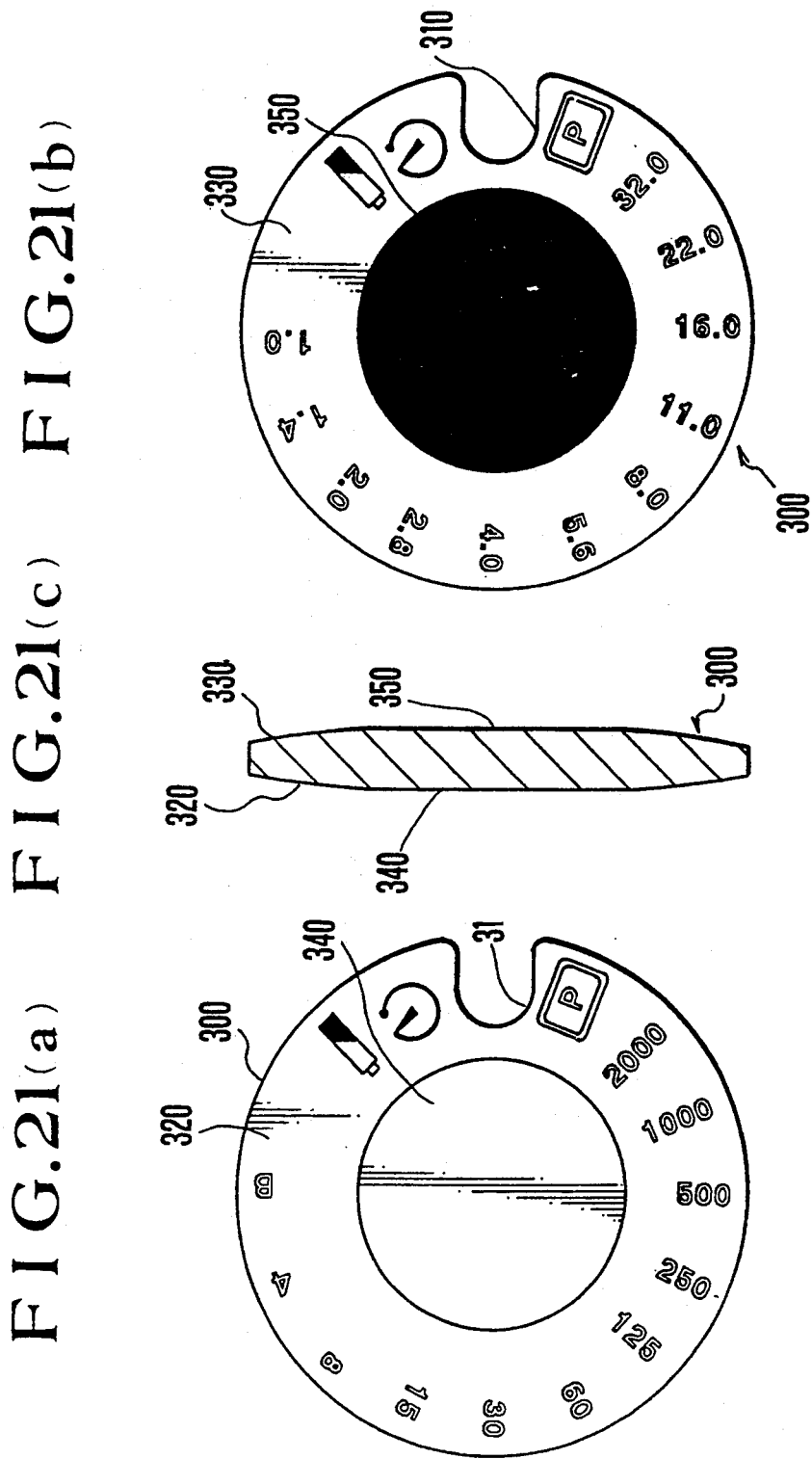

Referring to FIG. 19, a light emitting and receiving element 400 consists of a light emitting diode 404 and a phototransistor 403 serving as a light receiving element, and is inserted into the top end portion of the hallow shaft 100. The light emitting diode 404, which is driven by the control system shown in FIG. 26, emits LED light toward the indication plate 300 through the through-hole 24 of the dial body 20, and the phototransistor 403 receives reflected light. The signal outputted from the phototransistor 403 is transmitted to the microcomputer 201 of the control system. In this arrangement, either of the first supporting face 340 and the second supporting face 350 of the indication plate 300 is opposed to the light emitting and receiving element 400 through the through-hole 24 of the dial body 20. However, if the first supporting face 340 has the same reflectance as the second supporting face 350, an identical signal will be outputted from the phototransistor 403 whichever of the first exposure mode and the second exposure mode is selected. As a result, identification for mode selection is disabled.

To cope with the above-described problem, in the third embodiment, the optical reflectance of the first supporting face 340 of the indication plate 300 is made different from that of the second supporting face 350. As shown in FIGS. 21(a), 21(b) and 21(c), the first supporting face 340 of the first indication face 320 is formed as a face of high reflectance, while the second supporting face 350 of the second indication face 330 is formed as a face of low reflectance which is coated with a black low-reflectance paint or the like.

Figure 23A:
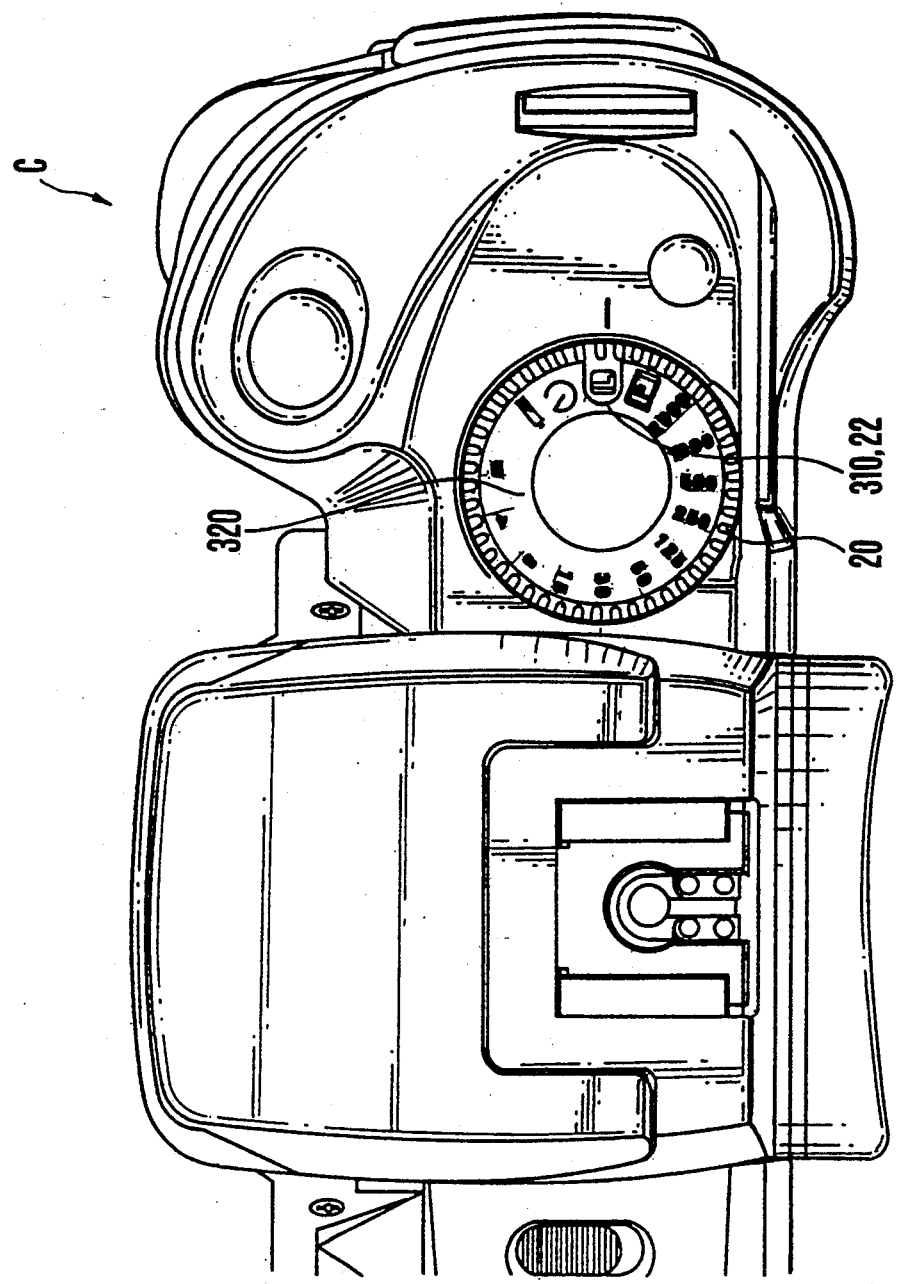
FIG. 23(a) is a schematic top plan view of the external appearance of a camera, showing the state of setting of the first exposure mode.

Accordingly, if the first exposure mode of FIG. 23(a) is selected in which the first indication face 320 of the indication plate 300 is faced up, the second supporting face 350 of low reflectance is opposed to the light emitting and receiving element 400 as shown in FIG. 19. Since light emitted from the light emitting diode 404 is slightly or hardly reflected from the second supporting face 350, the phototransistor 403 hardly detects the LED light and inputs to the microcomputer 201 a nondetection signal indicative of the first exposure mode. If the indication plate 300 is removed from the dial body 20, the phototransistor 403, of course, does not receive LED light. Accordingly, as in the case of the above-described first and second embodiments, the first exposure mode becomes active when the indication plate 300 is removed.

Figure 22:
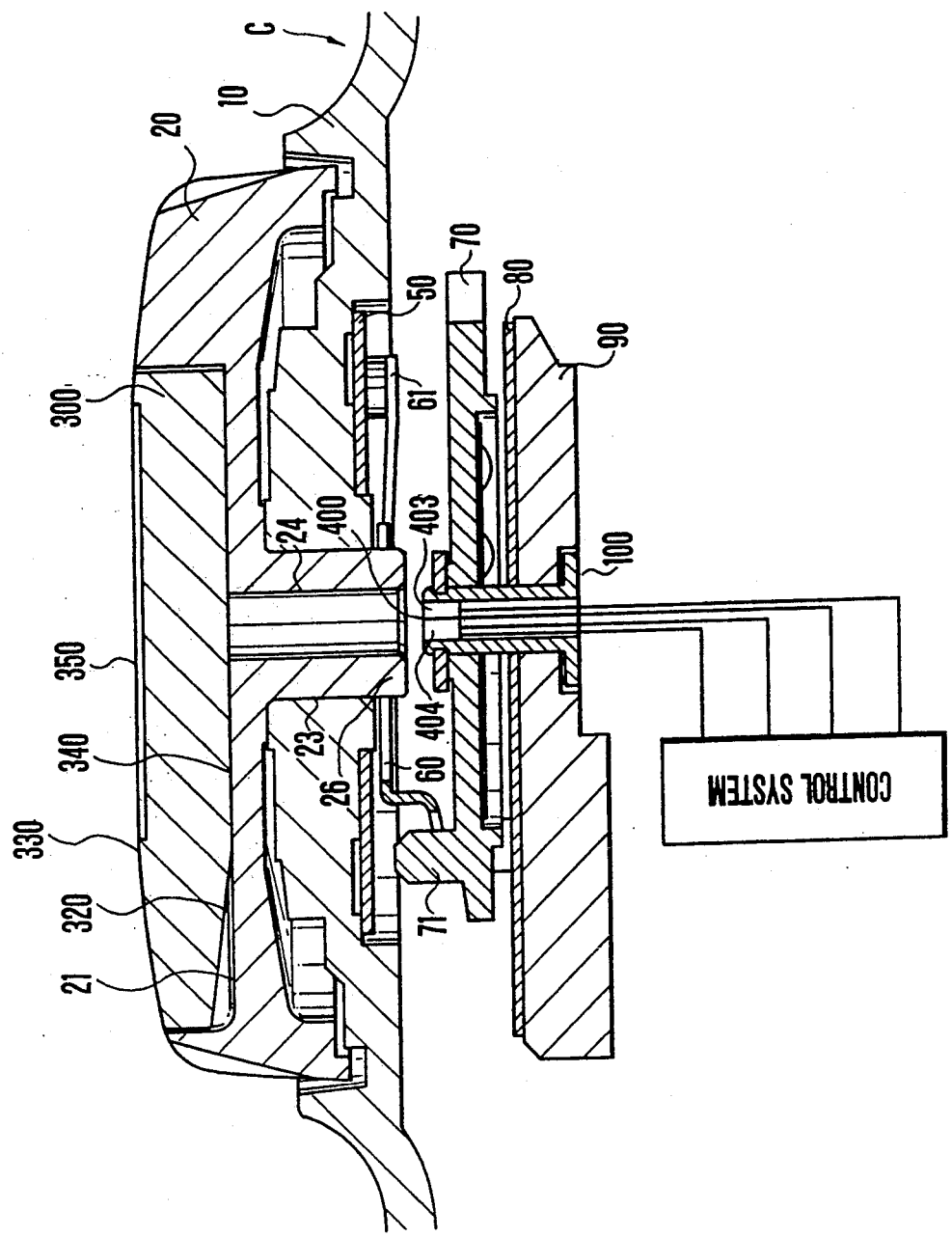
Figure 23B:
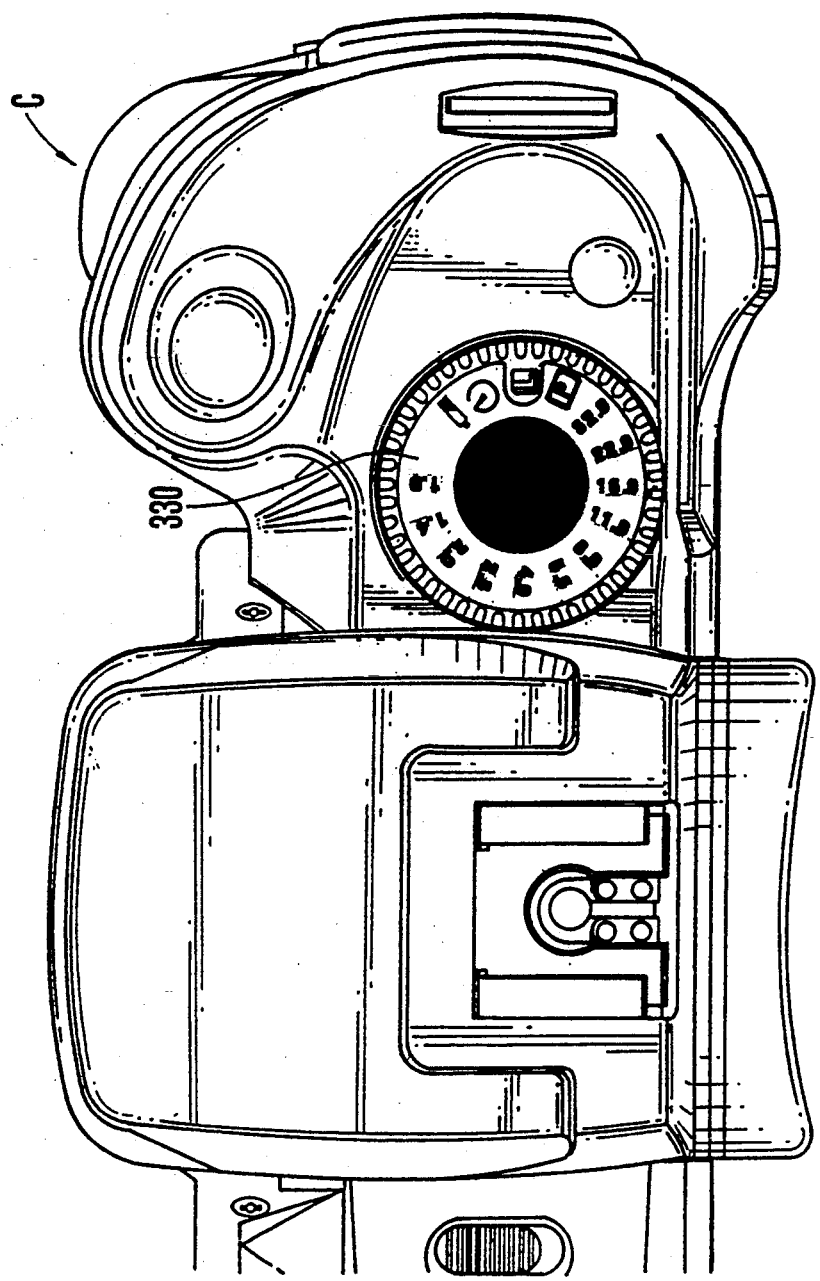
FIG. 23(b) is a schematic top plan view of the external appearance of the camera, showing the state of setting of the second exposure mode.
Figure 24:
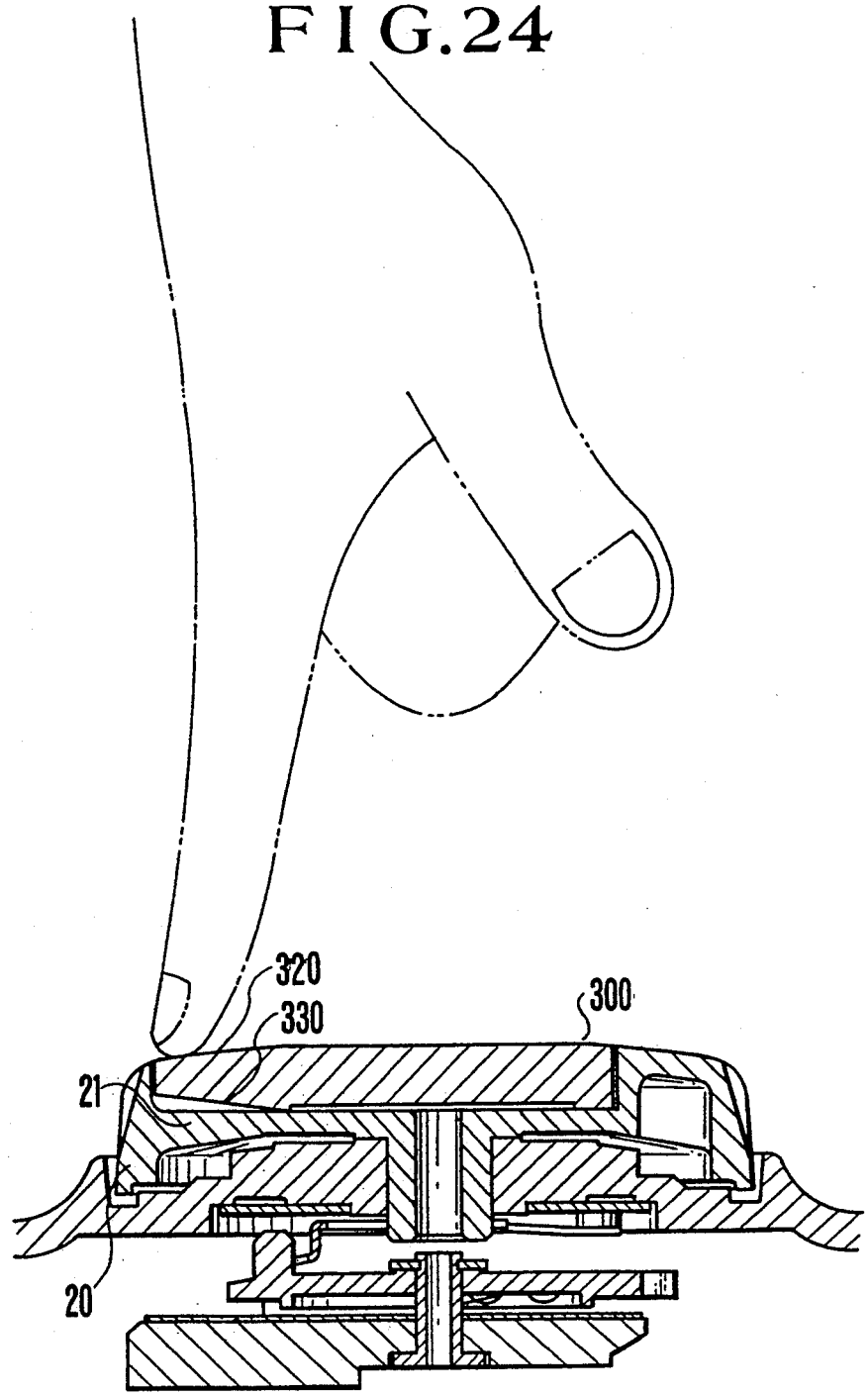
Figure 25:
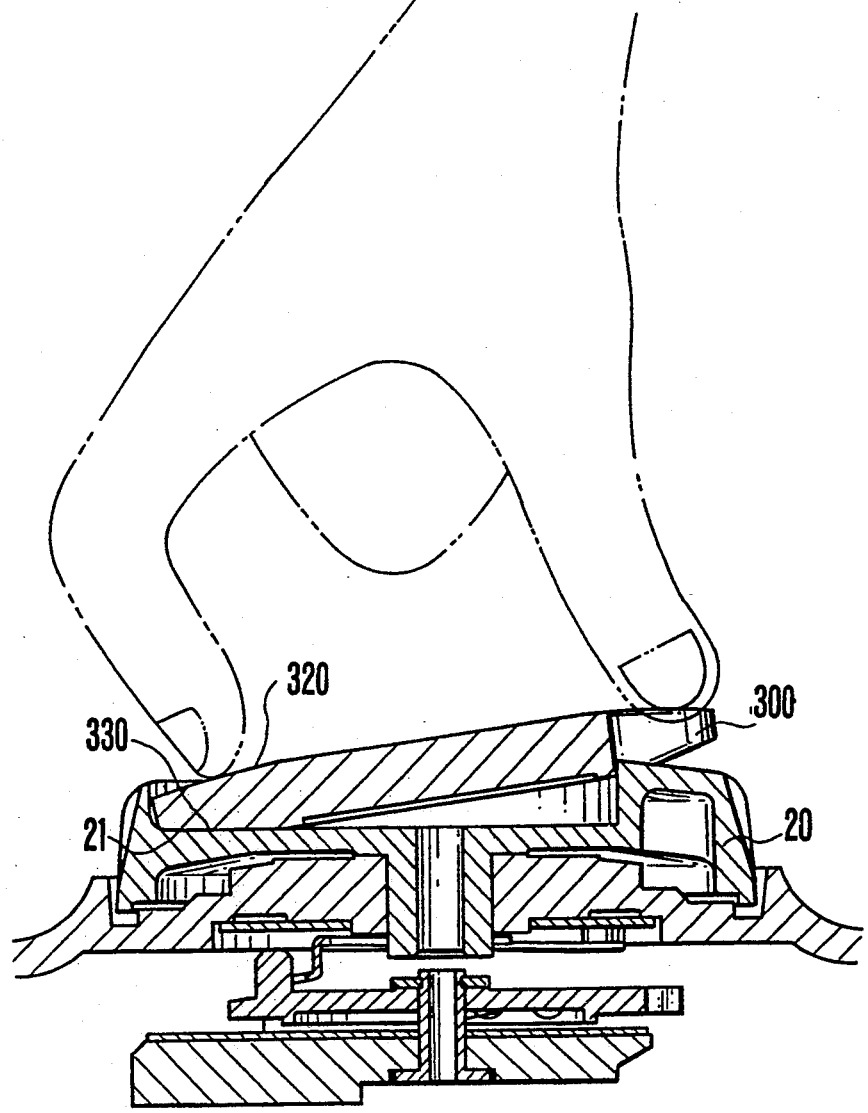

When the second exposure mode is to be selected, the indication plate 300 is pressed downwardly and removed with fingers as shown in FIGS. 24 and 25. The indication plate 300 is then reversed and again attached to the dial body 20. In this manner, the indication plate 300 is attracted to the dial body 20 by magnetic force with the second indication plate 330 faced up as shown in FIG. 23(b). In this case, since the first supporting face 320 of the indication plate 300 is faced down as shown in FIG. 22, the first supporting face 340 of high reflectance is opposed to the light emitting and receiving element 400. Accordingly, LED light emitted from the light emitting diode 404 is reflected from the first supporting face 340 and, therefore, the phototransistor 403 detects the LED light and inputs a signal indicative of the second exposure mode to the microcomputer 201.

Figure 26:
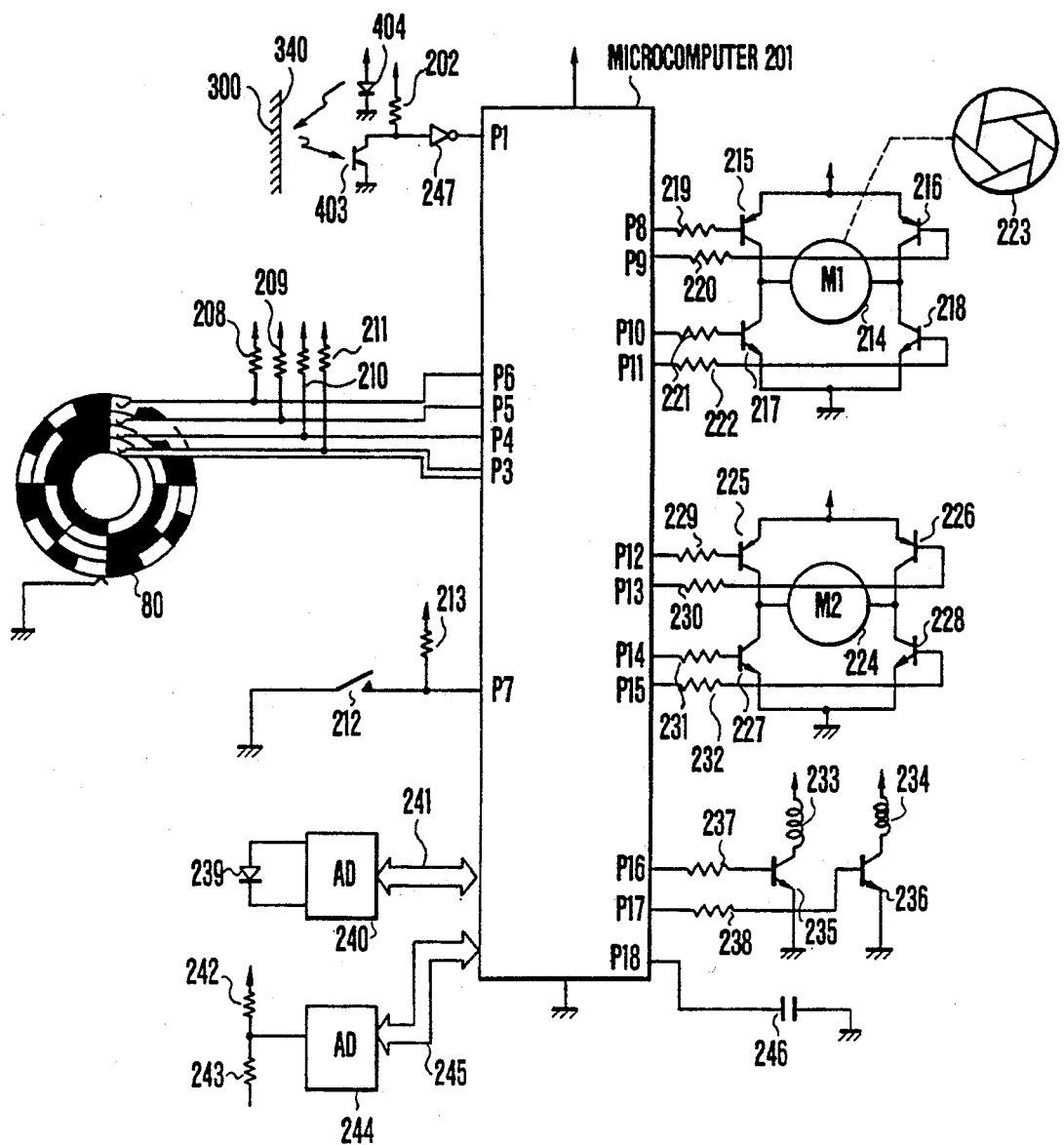

FIG. 26 shows a control system for the camera including the above-described elements such as the light emitting and receiving element 400. The control system of FIG. 26 has an arrangement similar to that of the control system of the first embodiment explained in connection with FIG. 8, except that the mode selecting switch of FIG. 8 is replaced by the light emitting and receiving element 400 and an inverter 247 for inverting a signal is added.

The phototransistor 403 is switched on when it receives LED light, and a high-level signal inverted by the inverter 247 is applied to the input port P1 of the microcomputer 201 to which the signal of the phototransistor 403 is inputted. If the phototransistor 403 does not receive LED light, it is switched off and a high-level signal pulled up by the pullup resistor 202 is likewise inverted by the inverter 247 to apply a low-level signal to the input port P1 of the microcomputer 201. As in the case of the first embodiment, if the input at the input port P1 is at a low level, the shutter-speed priority mode is selected, while if the input at the input port P1 is at a high level, the aperture-value priority mode is selected.

Accordingly, if the indication plate 300 is attached to the dial body 20 with the first indication face 320 faced up in order to select the first exposure mode corresponding to the shutter-speed priority mode, the second supporting face 350 which is the low-reflectance face of the indication plate 300 is faced down, so that the phototransistor 403 does not receive LED light. As a consequence, the phototransistor 403 is switched off and a high-level signal pulled up by the pullup resistor 202 is inverted by the inverter 247 to apply a low-level signal to the input port P1 of the microcomputer 201.

If the indication plate 300 is attached to the dial body 20 with the second indication face 330 faced up in order to select the second exposure mode corresponding to the aperture-value priority mode, the first supporting face 340 which is the high-reflectance face of the indication plate 300 is faced down, so that the phototransistor 403 receives LED light. As a consequence, the phototransistor 403 is switched on and a low-level signal is inverted by the inverter 247 to apply a high-level signal to the input port P1 of the microcomputer 201.

The operation of the control system shown in FIG. 26 performs an operation similar to that shown in an operational flow chart of FIG. 9 which has been explained in connection with the first embodiment. The flow chart of FIG. 26 differs from that of FIG. 9 only in that the signal of the mode selecting switch 203 is read at the input port P1 in Step S5 of the first embodiment, while the signal of the phototransistor 403 is only read in Step S5 of the third embodiment.

In the third embodiment, the optical reflectance of the first supporting face 340 of the indication plate 300 is made different from that of the second supporting face 350 and two-level intensity information is inputted to the microcomputer 201. However, if the light emitting and receiving element 400 is arranged to be able to detect contrast, not only two exposure modes but a plurality of exposure modes (three or more modes) can be detected on the basis of the difference between a plurality of reflectances (three or more levels of intensity).

As is apparent from the foregoing, according to each of the above-described three embodiments, it is possible to automatically select a mode indicated on a holding member merely by securing a photographic information member of, for example, disk-like configuration to the holding member. Since all information on the selected mode is displayed, a photographer can identify all the information at a glance. The photographer can likewise identify all information on another mode at a glance by reversing the photographic information member.

In addition, since information on one mode can be displayed on either face of the photographic information member as in the case of a single-mode dial, it is possible to conserve a sufficient space for indication, so that a sophisticated design can be realized.

Embodiment 4

The arrangement of the fourth embodiment is characterized by the ability to select a third exposure mode in addition to the first and second exposure modes explained in connection with the above-described embodiments.

In an information setting device according to the fourth embodiment, as shown in FIG. 28(b), a battery check indication 42, a self-timer indication 43, high-speed program indications T1 to T5, low-speed program indications W1 to W6, a normal program indication P and the like are formed on the bottom face of the recess 21 of the dial body 20. In addition, a lock indication 44 is formed on the positioning projection 22 of the dial body 20.

Figure 29:
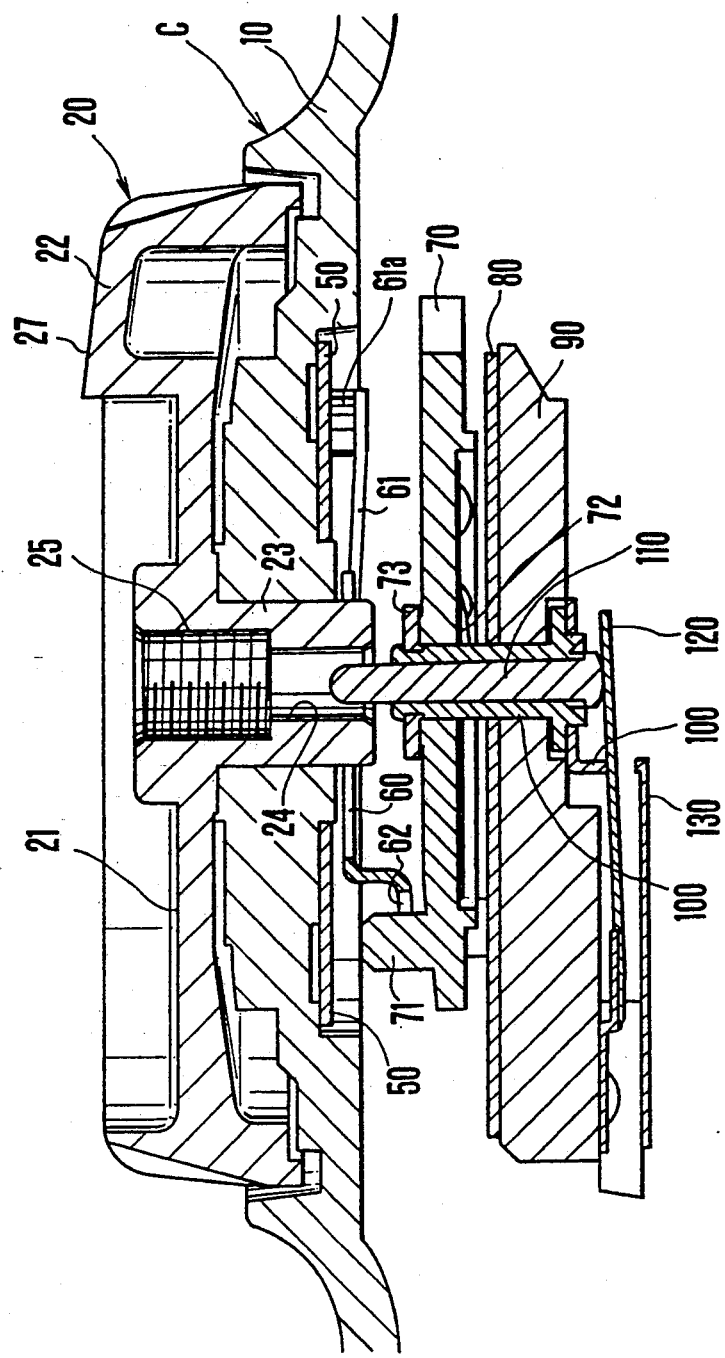
FIG. 29 is a schematic cross-sectional view showing a state wherein no indication disk is secured and a third exposure mode is set.
Figure 30:
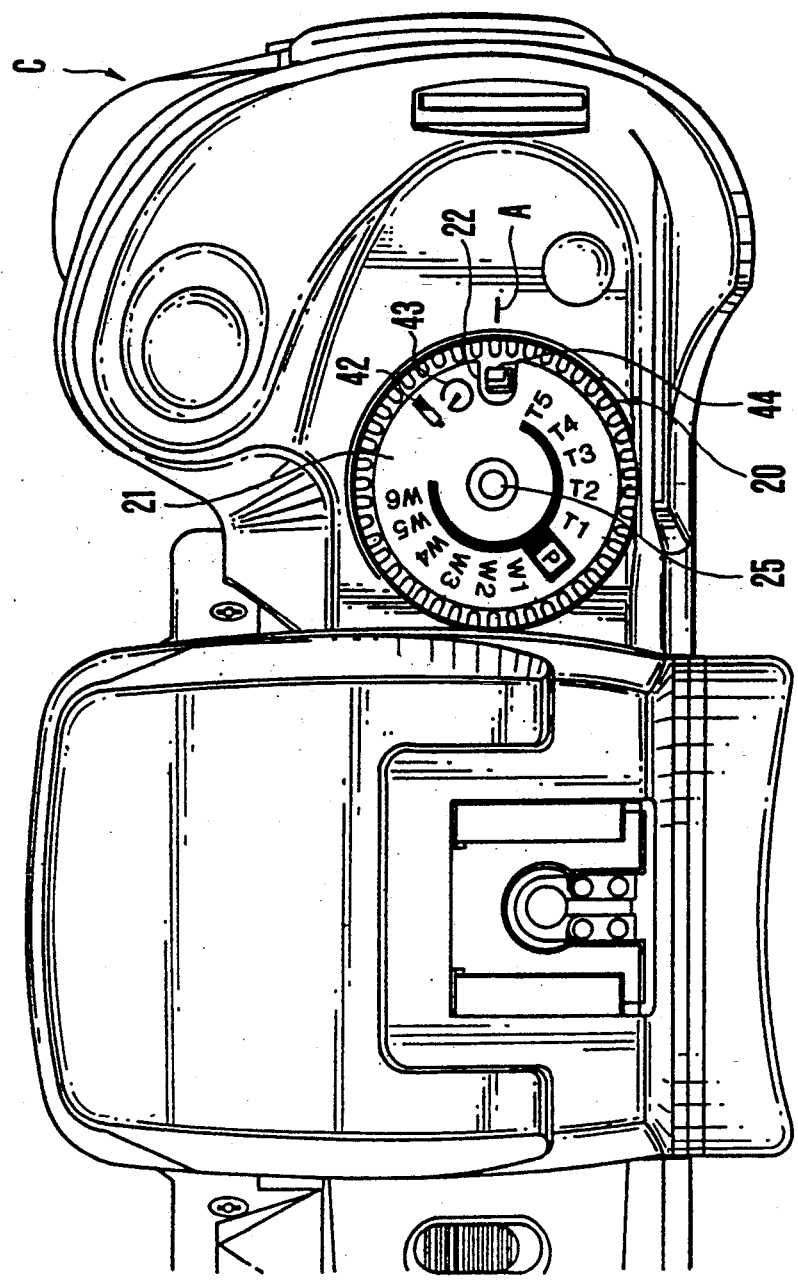
FIG. 30 is a schematic top plan view of a camera which is set in the third exposure mode.

These fifteen indications represent a variable program mode which is the third exposure mode selectable in the information input device according to the fourth embodiment. If the camera is used with the indication plate 30 removed from the dial body 20 (refer to FIG. 30), the third exposure mode is selected. A camera user can effect exposure in the variable program mode by aligning any one of the fifteen indications with the mark A of the camera body C by rotating the dial body 20. FIG. 29 shows a case where a camera is used with the indication plate 30 removed from the dial body 20, that is, the state of the information setting device when the camera user selects the third exposure mode (variable program).

Figure 31:
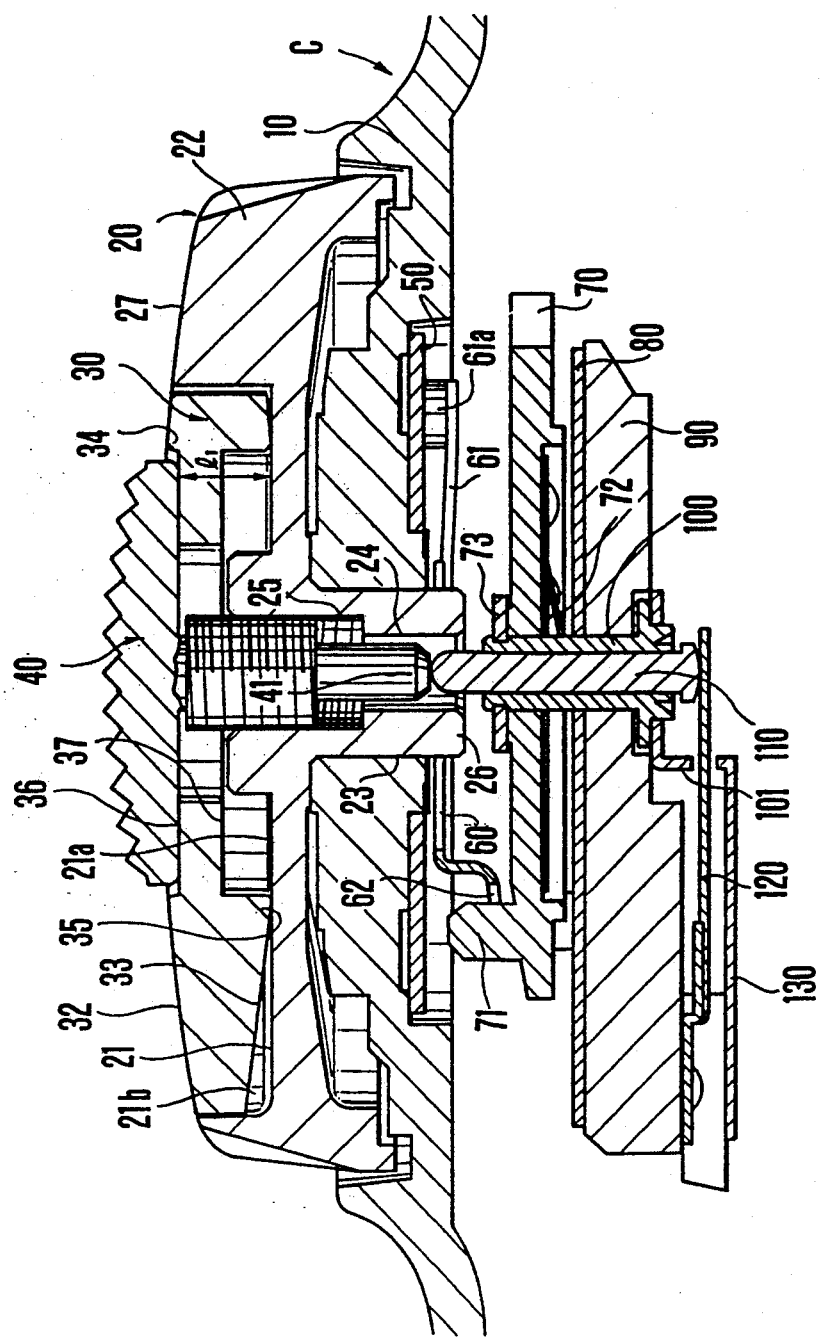
FIG. 31 is a schematic cross-sectional view showing the state wherein the first exposure mode is set.
Figure 32:
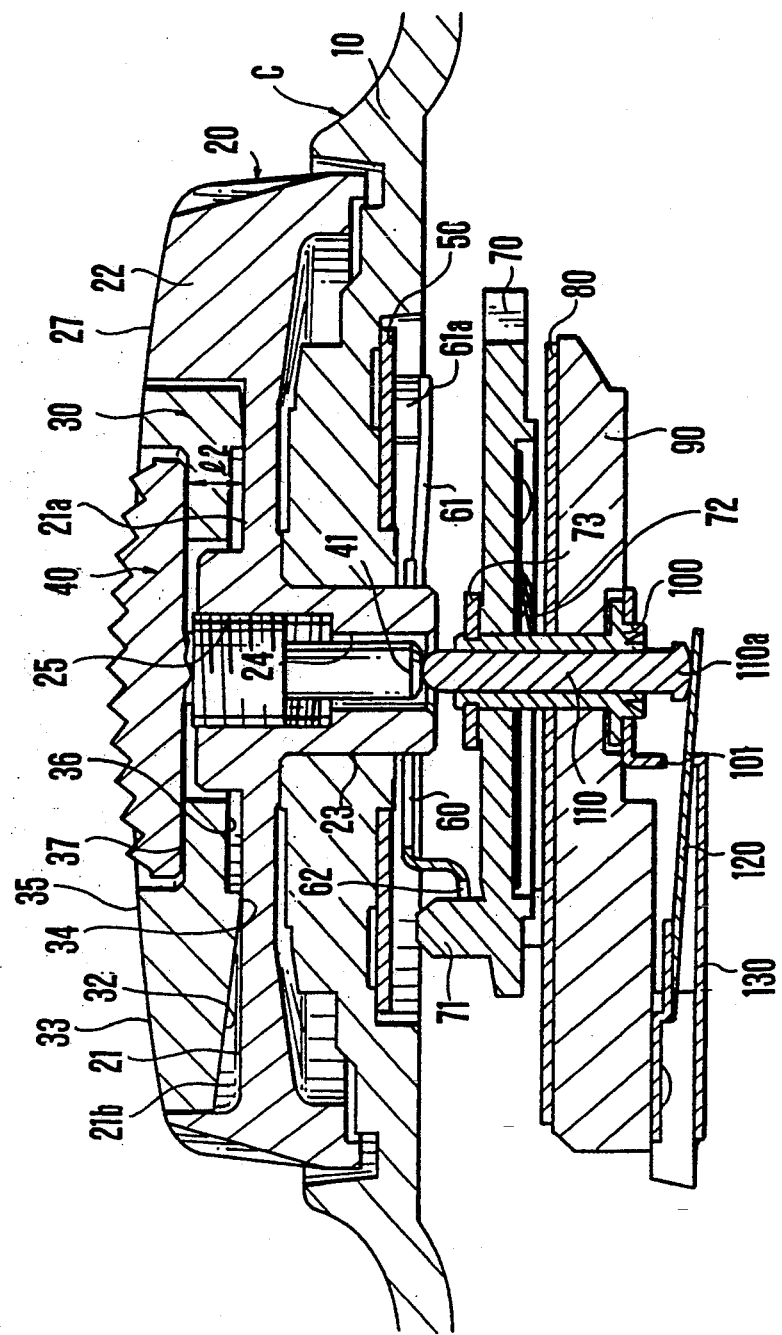
FIG. 32 is a schematic cross-sectional view showing the state wherein the second exposure mode is set.

As shown in FIGS. 28(a), 28(b) and 29, the fourth embodiment differs from the first embodiment in that a first fixed contact piece 101 and a second fixed contact piece 130 are disposed above and below the movable (ground) piece 120. This arrangement makes it possible to prepare the first to third exposure modes by producing three kinds of signal outputs on the basis of three states; the state of the indication plate 30 being attached with the first indication face 32 faced up (refer to FIG. 31), the state of the indication plate 30 being attached with the second indication face 33 faced up (refer to FIG. 32) and the state of the indication plate 30 being not attached (refer to FIG. 29).

In the fourth embodiment, the first exposure mode is assigned to the shutter-speed priority mode, the second exposure mode to the aperture-value priority mode, and the third exposure mode to the variable program mode. However, it is apparent that the content of each of the exposure modes is not limited to the above-described one, and it is a matter of course that the content of each of the first to third exposure modes may be arbitrarily determined. For example, the third exposure mode may be a programmed setting mode having different program charts for different subjects.

A camera controlling circuit connected to the information setting device according to the fourth embodiment, inputs from the information setting device, and the operation of the camera controlling circuit will be described below with reference to FIGS. 33 to 37. An explanation is omitted of portions which are substantially identical to those of the first embodiment.

Figure 33:
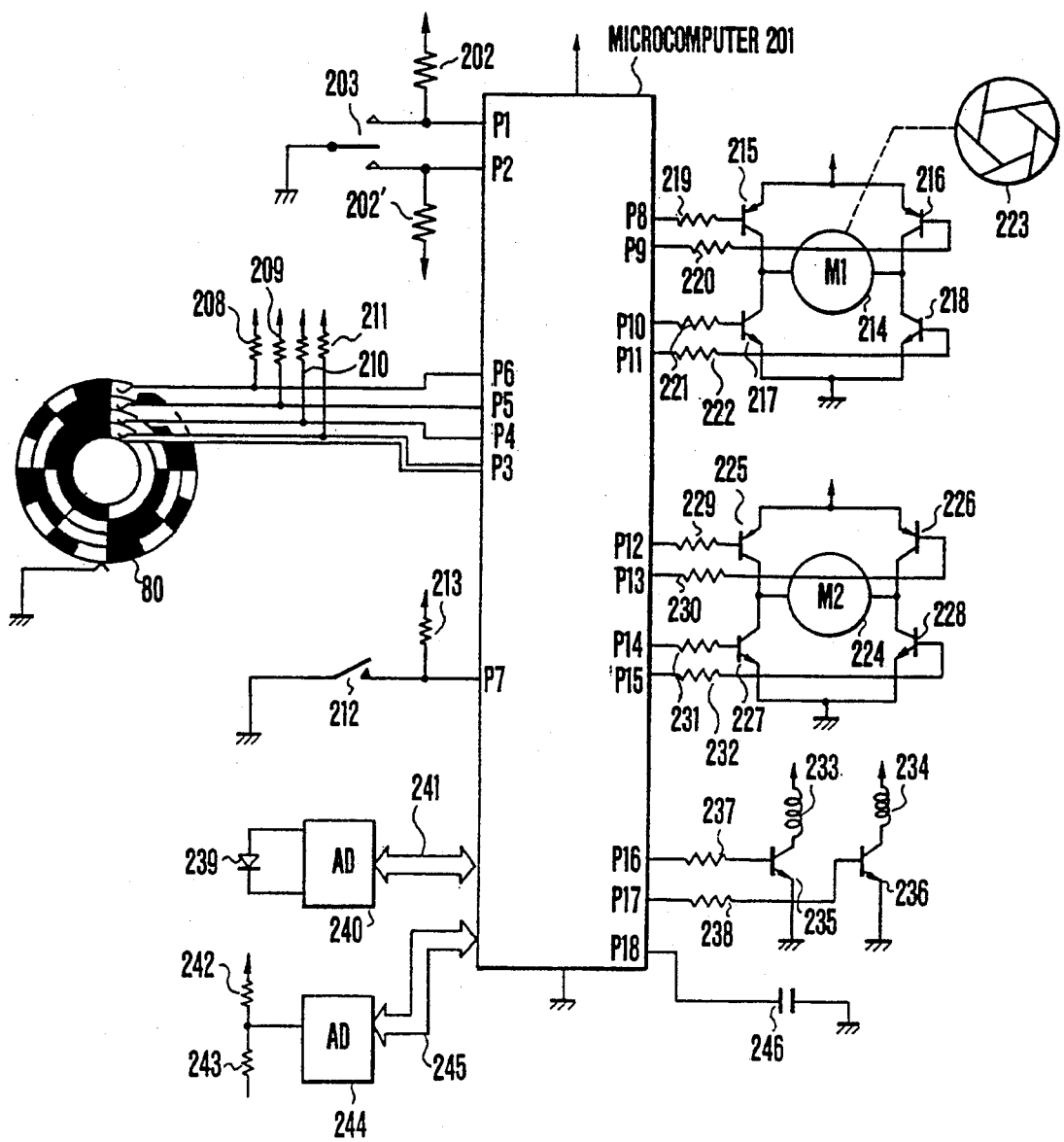
FIG. 33 is a block diagram of a control system for a camera.

In FIG. 33, a microcomputer is designated by reference numeral 201, pullup resistors by reference numerals 202 and 202, and a mode selecting switch by reference numeral 203. The mode selecting switch 203 consists of the above-described ground contact piece 120, the first contact piece 101 and the second contact piece 130. Since this switch 203 is of a double-throw type, it can detect three states.

A signal from the switch 203 is coupled to the input port P1 and an input port P2 of the microcomputer 201. When first and second switches are on, a low-level signal is inputted to the microcomputer 201, while when they are off, a high-level signal is inputted to the same. The microcomputer 201 reads the states of the signals provided at the input ports P1 and P2, so that it determines which of the first to third exposure modes has been selected by a camera user.

FIG. 34 shows the states of signals which are inputted to the respective input ports P3, P4, P5 and P6 when individual priority values are selected in each of the shutter-speed priority mode, the aperture-value priority mode and the variable program mode. In FIG. 34, "0" indicates a low-level input signal and "1" indicates a high-level input signal.

Referring to FIG. 34, if low-level signal inputs are provided at all the input ports P3, P4, P5 and P6, the voltage of a power source (not shown) is checked whichever of the shutter-speed priority mode, the aperture-value priority mode and the variable program mode is active, and an alarm sound corresponding to the voltage is issued.

Referring again to FIG. 34, if the state of inputs at the input ports P3, P4, P5 and P6 is "0, 0, 0, 1", a self-timer operation mode is selected whichever of the shutter-speed priority mode, the aperture-value priority mode and the variable program mode is active.

If the state of inputs at the input ports P3, P4, P5 and P6 is "0, 0, 1, 0", the state of inhibiting a release operation is selected whichever of the shutter speed priority mode, the aperture-value priority mode and the variable program mode is active. In this state, even if a release button is depressed, no release operation is performed.

Figure 35:
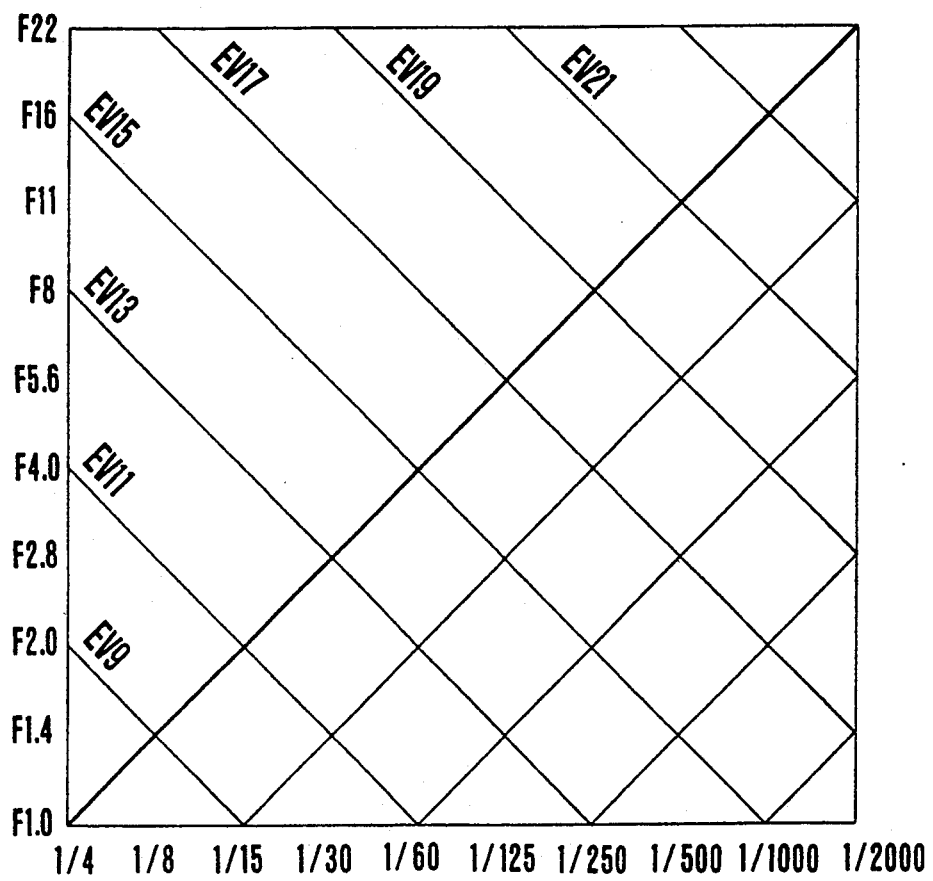
FIG. 35 is a chart for determining an exposure value in a programmed automatic exposure mode.

If the state of inputs at the input ports P3, P4, P5 and P6 is "0, 0, 1, 1", neither a shutter-speed priority operation nor an aperture-value priority operation is performed whichever of the shutter-speed priority mode and the aperture-value priority mode is selected. The system in turn switches to a programmed automatic exposure mode in which the shutter speed and the aperture value simultaneously vary with variations of luminance to provide correct exposure. FIG. 35 shows an example of the relationship between shutter speeds and aperture values in the programmed automatic exposure mode.

If the programmed automatic exposure mode is not selected, that is, if either the shutter-speed priority mode or the aperture-value priority mode is selected, a priority set value corresponding to a selected mode is obtained in accordance with the table of FIG. 34.

For example, if the state of inputs at the input ports P3, P4, P5 and P6 is "0, 1, 0, 0" when the shutter-speed priority mode is active, a shutter speed of 1/2000 seconds is set as a priority shutter speed. If the state of inputs at the input ports P3, P4, P5 and P6 is "1, 0, 1, 1" when the aperture-value priority mode is active, F 2.8 is set as a priority aperture value.

The variable program mode which is the third exposure mode is arranged so that, no matter how the state of inputs at the input ports P3, P4, P5 and P6 may be, the shutter speed and the aperture value simultaneously vary with variations of luminance to determine a correct exposure value. In addition, shutter speeds and aperture values for the high-speed programs T1 to T5 or the low-speed programs W1 to W6 are determined on the basis of the state of inputs at the input ports P3, P4, P5 and P6 (refer to FIG. 34) in accordance with the program chart shown in FIG. 36.

The operation of the control circuit having the above-described arrangement will be described below with reference to FIG. 37, which is an operational flow chart of the microcomputer 201.

Figure 37:
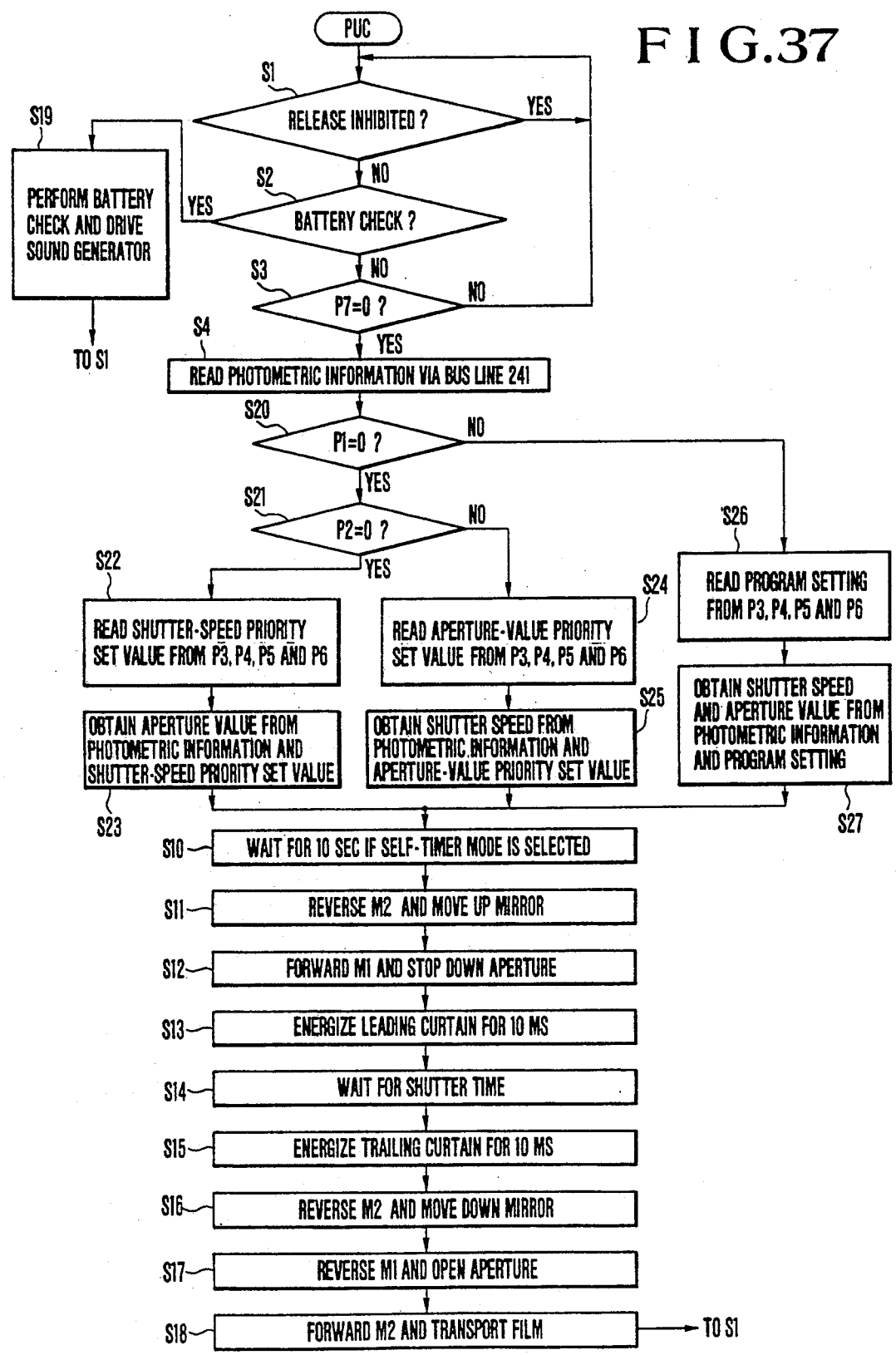
FIG. 37 is a flow chart showing the operation of the circuit of FIG. 33.

When electricity is supplied to the camera, the microcomputer 201 initiates an operation starting with Step S1 in the flow chart of FIG. 37.

In an explanation of this flow chart, reference will be made to steps which differ from those of the flow chart of FIG. 9 which has been explained in connection with the first embodiment.

[Step S20] The microcomputer 201 reads from the port P1 the state of the switch 203 which determines whether the information setting device is set for the shutter-speed priority mode, the aperture-value priority mode or the variable program mode. If the input signal at the port P1 is at a high level, this indicates that the information setting device is set for the variable program mode. Therefore, the process proceeds to Step S26 to execute arithmetic processing for the variable program mode. If the input signal at the port P1 is at a low level, the process proceeds to Step S21 to read the input signal provided at the port P2.

[Step S21] The microcomputer 201 reads from the port P2 the state of the switch 203 which determines whether the information setting device is set for the shutter-speed priority mode, the aperture-value priority mode or the variable program mode. If the input signal at the port P2 is at a low level, this indicates that the information setting device is set for the shutter-speed priority mode. Therefore, the process proceeds to Step S22 to execute arithmetic processing for the shutter-speed priority mode. If the input signal at the port P2 is at a high level, this indicates that the information setting device is set for the aperture-value priority mode. Therefore, the process proceeds to Step S24.

[Step S22] The microcomputer 201 finds a shutter-speed priority value on the basis of the input signals at the input ports P3, P4, P5 and P6 in accordance with the table of FIG. 34.

[Step S23] The microcomputer 201 finds an aperture value for correct exposure through arithmetic operations on the basis of the input photometric information and shutter-speed priority value. If the programmed automatic exposure mode is active, a particular shutter speed and aperture value are determined in accordance with the program chart shown in FIG. 35. Thereafter, the process proceeds to Step S10.

[Step S24] As the information setting device is set for the aperture-value priority mode, the microcomputer 201 finds an aperture priority value on the basis of the input signals at the input ports P3, P4, P5 and P6 in accordance with the table of FIG. 34.

[Step S25] The microcomputer 201 finds an aperture value for correct exposure through arithmetic operations on the basis of the input photometric information and aperture priority value. If the programmed automatic exposure mode is active, a particular shutter speed and aperture value are determined in accordance with the program chart shown in FIG. 35. Thereafter, the process proceeds to Step S10.

[Step S26] As the information setting device is set for the variable program mode, the microcomputer 201 finds a particular set programmed mode on the basis of the input signals at the input ports P3, P4, P5 and P6 in accordance with the table of FIG. 34.

Figure 36:
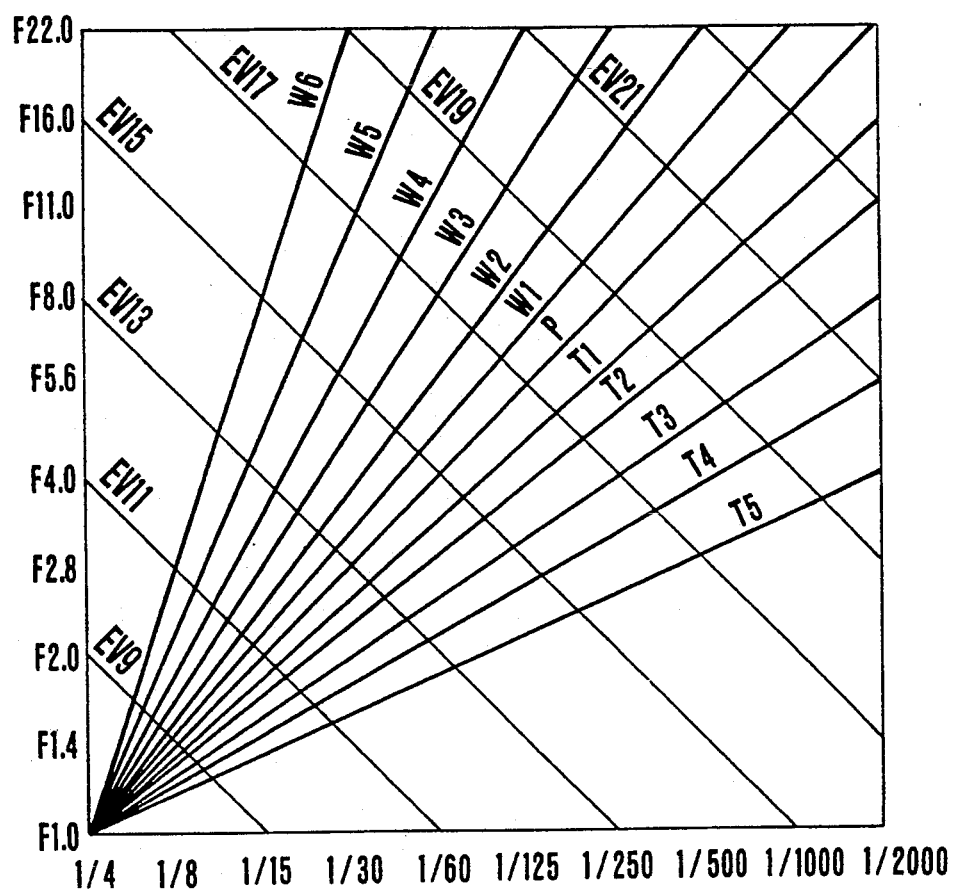
FIG. 36 is a chart for determining an exposure value in the third exposure mode.

[Step S27] The microcomputer 201 determines a shutter speed and an aperture value for correct exposure on the basis of the input photometric information and set program in accordance with the program chart shown in FIG. 36. Thereafter, the program proceeds to Step S10.

As described above, in the device according to the fourth embodiment, all information on each mode is displayed on one face of the indication plate 30 attached to the dial body 20. Accordingly, if a photographer selects the first exposure mode, he can identify all information on that mode at a glance. If the photographer selects the second exposure mode, he can likewise identify all the information on that mode at a glance by reversing the indication plate 30. In addition, since indications on the third exposure mode are formed on the dial body 20, if the photographer uses the camera with the indication plate 30 removed from the dial body 20, he can execute the third exposure mode and identify all the information on that mode at a glance.

In other words, with the information setting device according to the fourth embodiment, it is possible to select three kinds of photographic modes by utilizing indications which are substantially identical to those of a single-mode information setting device. In addition, since a structure is not adopted in which information indications are identified through a window of a mask, a cover or the like, all the information on one mode can be identified.

Embodiment 5

A fifth embodiment will be described below.

Prior to an explanation of the fifth embodiment, a programmed automatic exposure (AE) will be explained with reference to FIGS. 39(a) to 39(h).

FIGS. 39(a) to 39(h) show representative program charts of various kinds of program modes. In each of these figures, the vertical axis indicates aperture values and corresponding index values, while the horizontal axis indicates shutter speeds and corresponding index values.

Figure 39A:
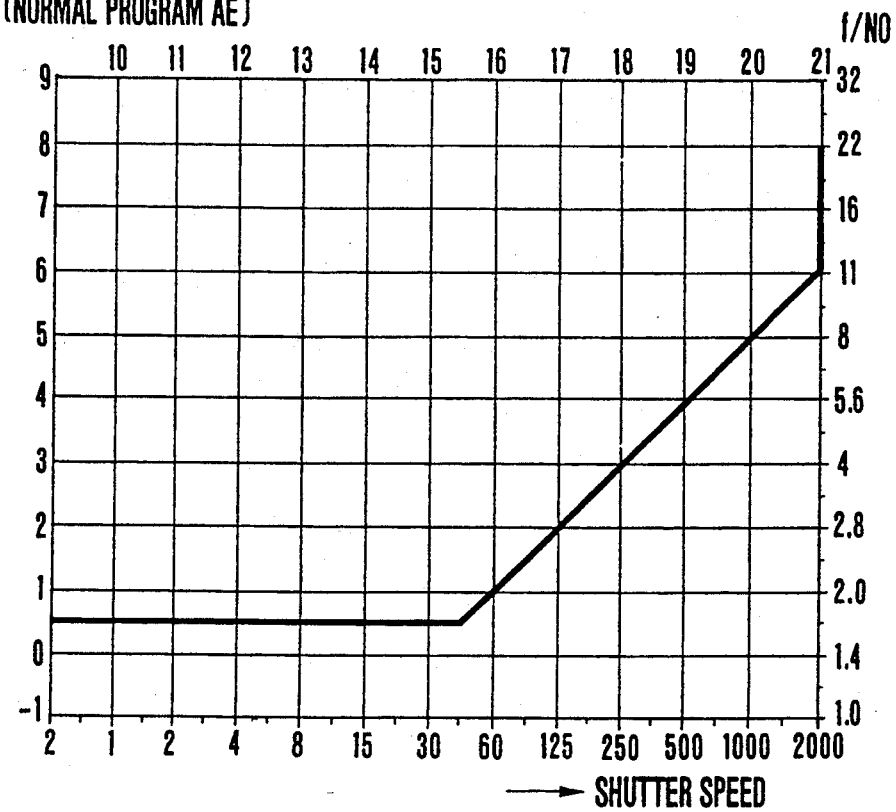
FIGS. 39(a) to 39(h) are program charts.

The chart P-1 shown in FIG. 39(a) indicates normal program AE in which, if a subject is of low luminance, the aperture value is shifted toward a minimum corresponding to a fully open aperture and, if a limit beyond which no substantial camera shake may occur is reached, the aperture value is shifted toward a maximum corresponding to a stopped-down aperture.

Figure 39B:
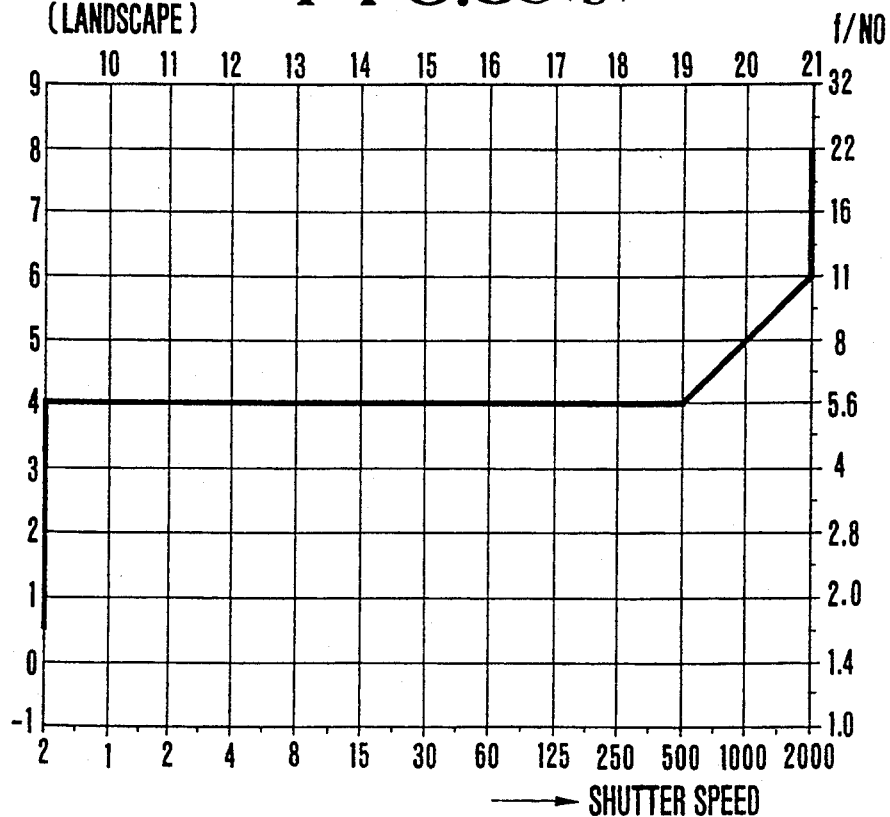

The chart P-2 shown in FIG. 39(b) indicates a landscape mode, which is a modified version of the P-1 chart of FIG. 39(a). In the landscape mode, the aperture is stopped down to a considerable extent so that a landscape can be fully focused.

Figure 39C:
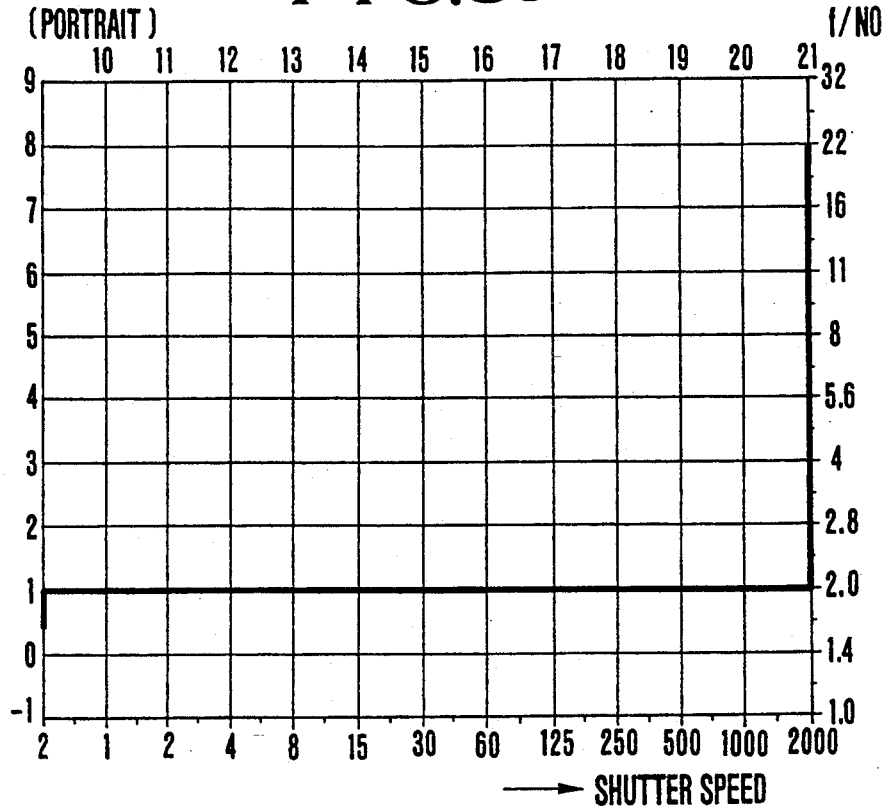

The chart P-3 shown in FIG. 39(c) indicates a portrait mode in which, to weight focusing of a subject, the aperture is set at a fully open aperture value so that depth of field can be made shallow.

Figure 39D:
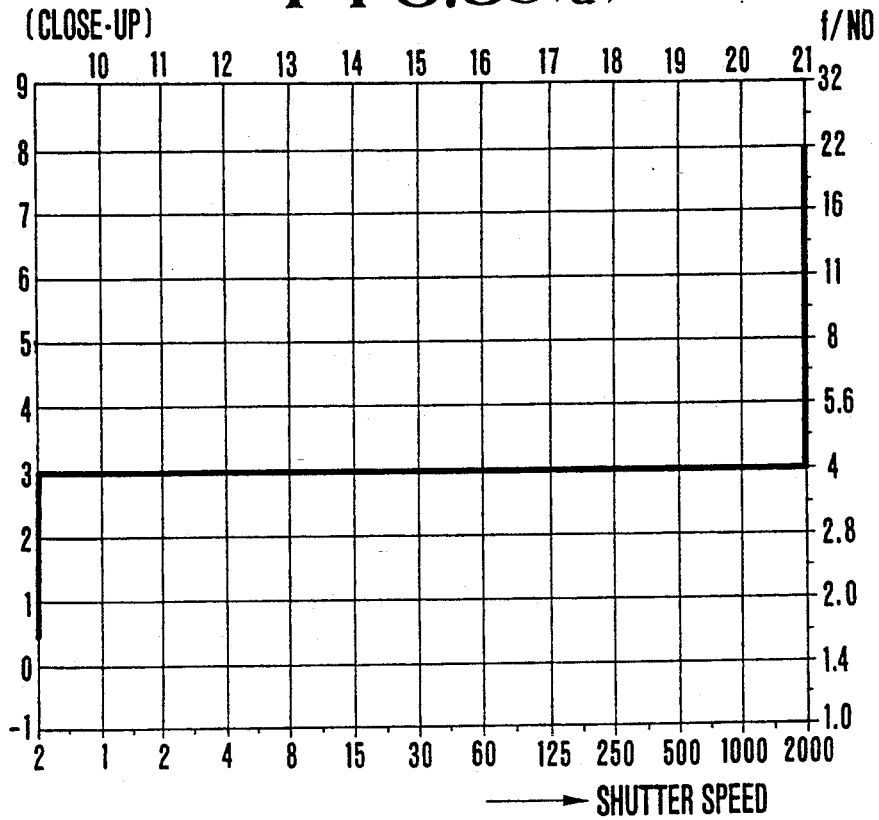

The chart P-4 shown in FIG. 39(d) indicates a close-up mode. Although it is similar to the chart P-3 of the portrait mode, the depth of field is made wide to some extent to facilitate focusing.

Figure 39E:
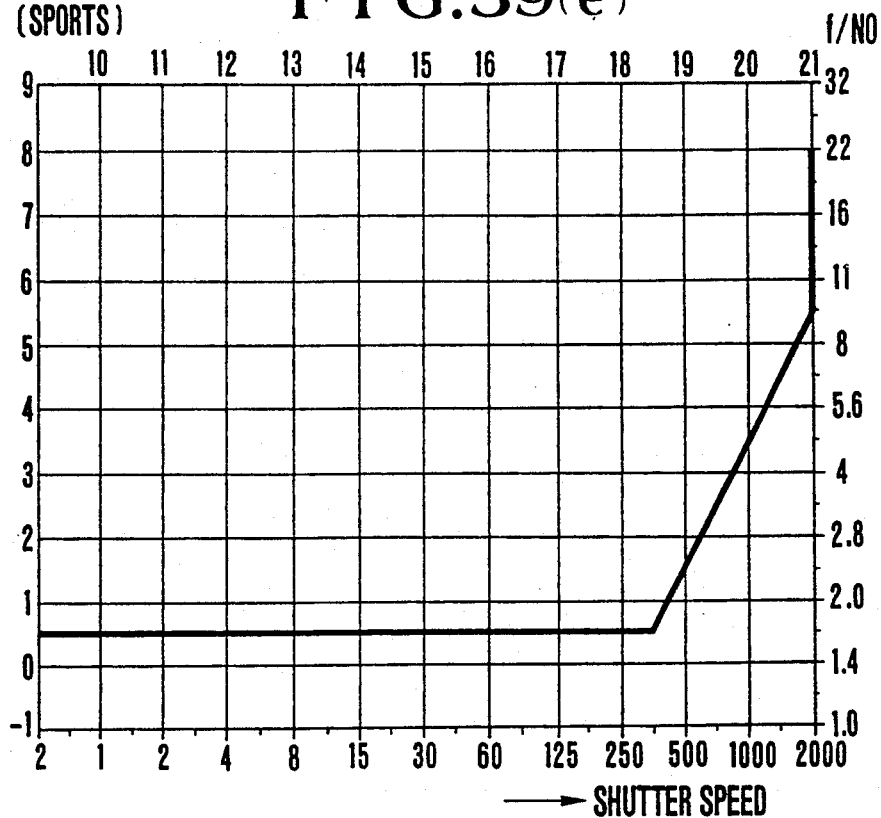

The chart P-5 shown in FIG. 39(e) indicates a sports mode in which, to follow a fast moving subject and take a photograph in which all subjects including the primary main subject are imaged in a stationary state, the aperture is set at a value as close as possible to a fully open aperture so that the highest possible shutter speed can be obtained.

Figure 39F:
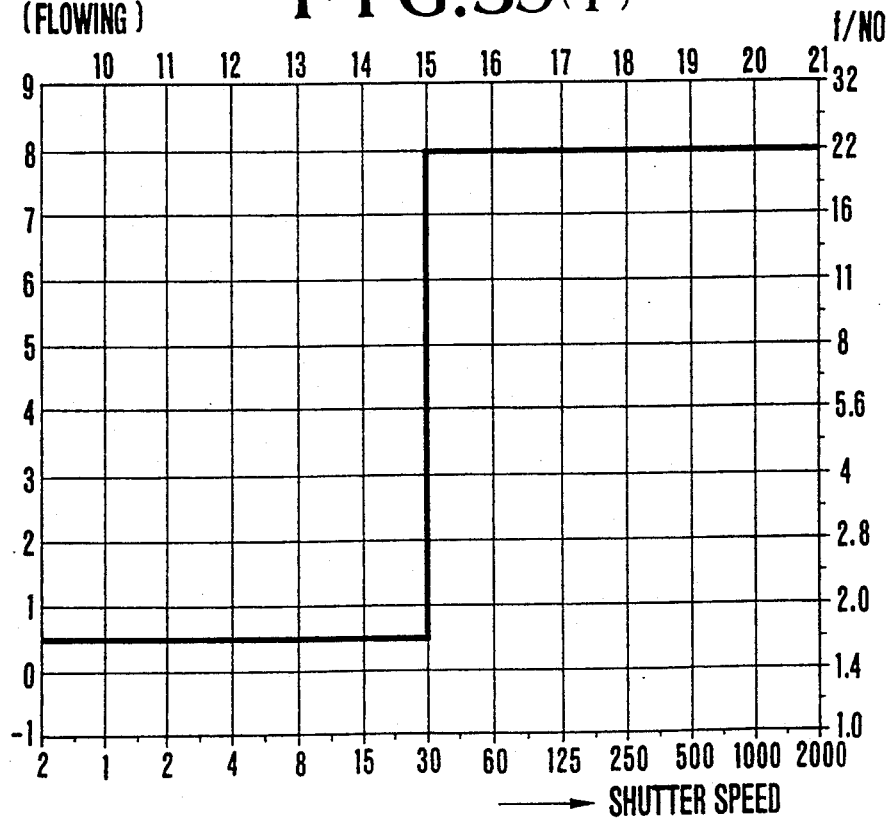

The chart P-6 shown in FIG. 39(f) indicates a flowing mode in which a primary subject is followed in the shutter-speed priority mode within the range of low shutter speeds so that the primary subject can be brought into focus against a flowing background.

Figure 39G:
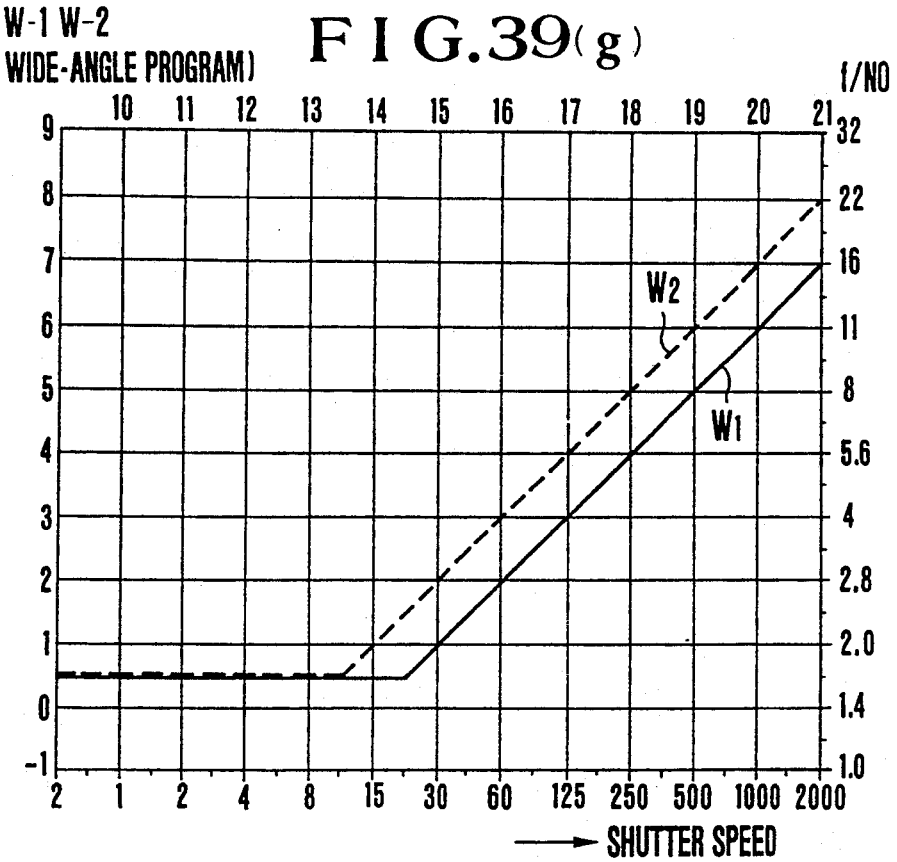

The chart (W-1 and W-2) shown in FIG. 39(g) indicates a wide-angle program in which the aperture is stopped as down as possible with respect to the normal program.

Figure 39H:
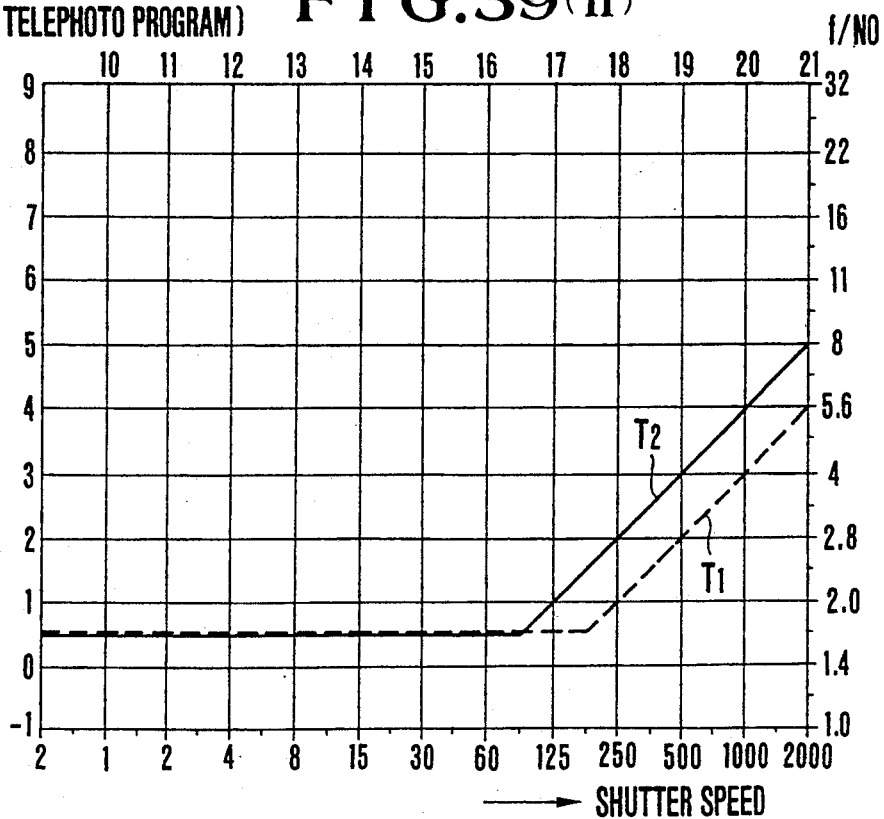

The chart (T-1 and T-2) shown in FIG. 39(h) indicates a telephoto program in which the shutter speed is made as high as possible with respect to the normal program.

FIGS. 38(a) to 38(f) show six kinds of indication patterns which represent various combinations of the above-described programs. As illustrated, photographic modes are indicated on a dial 702 by using numbers, capital letters or icons.

Figure 38A:
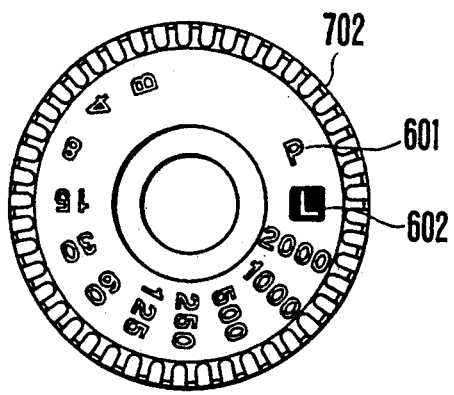
FIGS. 38(a) to 38(f) are schematic views showing indication examples of different photographic modes according to a fifth embodiment.

The indication pattern shown in FIG. 38(a) includes a group of indications of the shutter-speed priority mode, a P indication 601 using the capital letter "P" which indicates the normal program mode, and an L indication 602 using the capital letter "L" which indicates a lock position representative of the state of the camera being locked. The P indication 601 and the group of indications of the shutter-speed priority mode are displayed, respectively, on opposite sides of the L indication 602. If a photographer rotates the dial 702, he can freely stop, with a click at a setting position, the indication position of the dial 702 which corresponds to a desired one from among shutter-speed indications such as "2000", "1000", ..., "8", "4", "B", the P indication 601 and the L indication 602. (In each of FIGS. 38(a) to 38(f), the L indication 602 is shown as located at the setting position by way of example). The normal program serves as a one-shot mode in which, when an in-focus state is reached, the focus position is locked by, for example, an autofocus mechanism in accordance with, for example, the chart shown in FIG. 39(a). The normal program also serves as an AE-lock mode in which photometric control as well is locked when an in-focus state is reached.

The shutter-speed priority mode serves as a servo autofocus mode which keeps adjusting the focus on a subject while performing photometric control in real time.

Figure 38D:
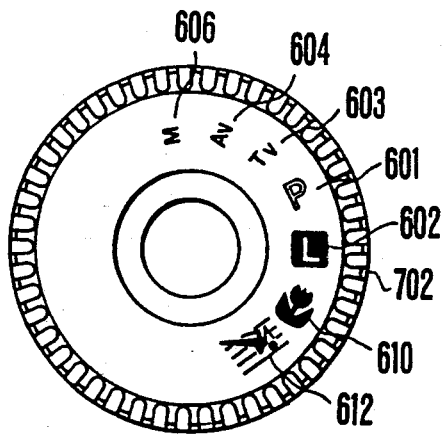
Figure 38B:
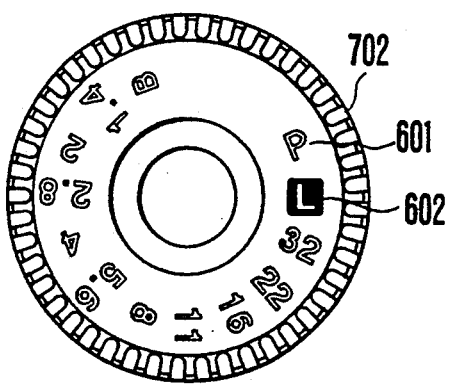

The indication pattern shown in FIG. 38(b) differs from that of FIG. 38(a) in that aperture-value indications such as "32", "22", ..., "2", "1.4", "B" are displayed in place of the indications of the shutter-speed priority mode.

Figure 38E:
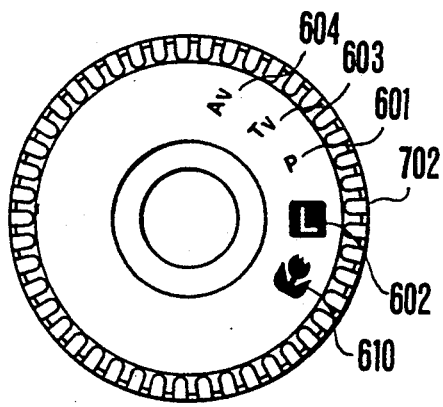
Figure 38C:
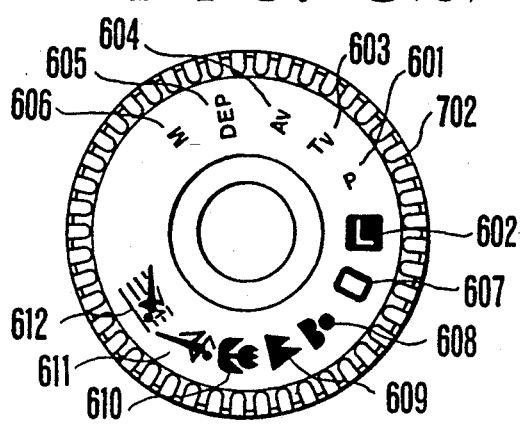

The indication pattern shown in FIG. 38(c) includes the L indication 602, one group of mode indications using capital letters displayed on one side of the L indication 602, and the other group of mode indications using icons which symbolize photographic intents or subjects.

From among the mode indications using capital letters in the indication pattern, a "Tv" indication 603 indicates a shutter-speed priority AE mode, an "Av" indication 604 indicates an aperture-value priority AE mode, a "DEP" indication 605 indicates a depth priority AE mode, and an "M" indication 606 indicates a manual-operation priority mode.

From among the mode indications using icons, a "square figure" 607 represents the normal program mode, a "bust icon" 608 represents the portrait mode, a "mountain icon" 609 represents the landscape mode, a "flower icon" 610 represents the close-up mode, a "running-person icon" 611 represents a sports mode, and an icon 612—"a person running against a flowing background"—represents a flowing mode.

The mode indications 607 to 612 consisting of the above-described icons allow easy mode selection utilizing image icons, so that even a beginner can readily understand the contents of each mode to enjoy sophisticated photography.

The indication pattern shown in FIG. 38(d) includes part of the mode indications using the capital letters of FIG. 38(c), that is, the mode indications 601, 603, 604 and 606 excluding the "DEP" indication 605 indicative of the depth priority AE mode. From among the above-described image icons for mode selection, the close-up mode icon 610 and the flowing mode icon 612 which are prepared as special photography modes are displayed on the other side of the L indication 602 indicative of the lock position.

The indication pattern shown in FIG. 38(e) includes part of the mode indications using the capital letters of FIG. 38(c), that is, the mode indications 601, 603 and 604 excluding the manual-mode indication 606. Provided on the other side of the L indication 602 indicative of the lock position, is the close-up mode icon 610 only.

While each of the modes Av, Tv and P effects photometry of the entire image field, the close-up mode effects photometry of a primary subject which occupies a limited part of the image field, thereby determining an AE value on the basis of the photometric value of the primary subject.

Figure 38F:
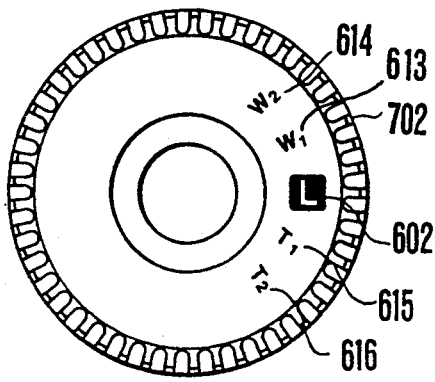

The indication pattern shown in FIG. 38(f) includes the L indication 602 indicative of the lock position, two kinds of telephoto (high-speed shutter) mode indications 615 and 616, "T₁" and "T₂", displayed on one side of the L indication 602, and two kinds of wide-angle (low-speed shutter) mode indications 613 and 614, "W₁" and "W₂", displayed on the other side of the L indication 602.

Figure 43:
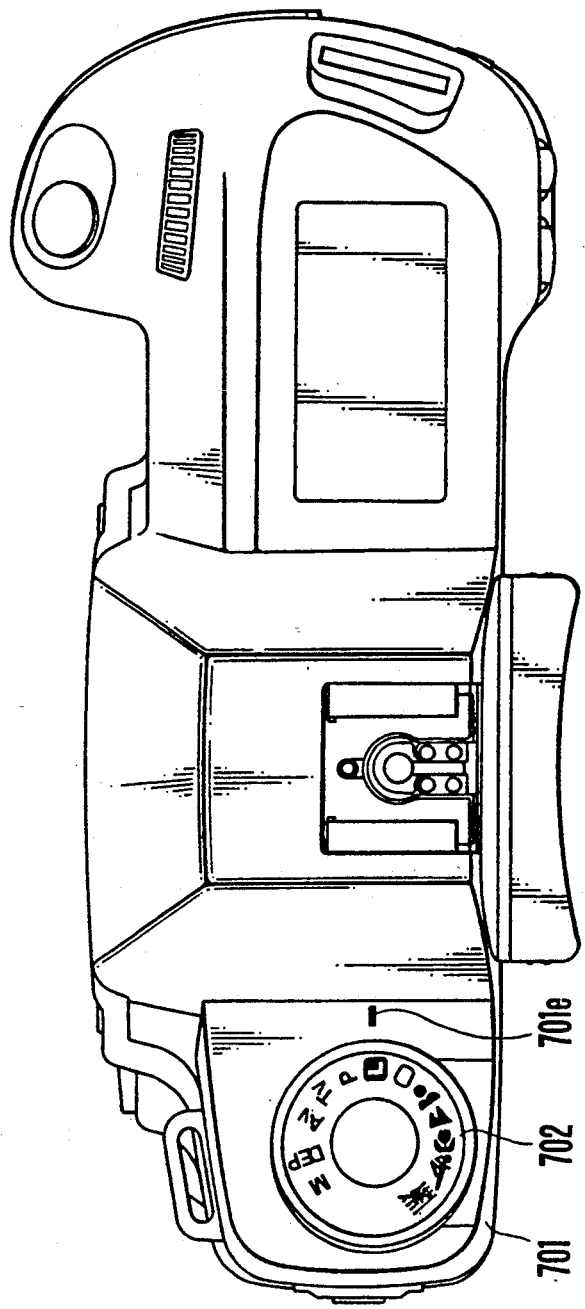
FIG. 43 is a schematic top plan view showing a camera.

FIG. 43 is a top plan view schematically showing a camera to which the dial 702 shown in FIG. 38(c) is attached. The dial 702 is rotatably attached to a top cover 701 of the camera body, and the mode of the camera is specified by aligning a desired dial mode indication with a mark 701e. Each time any one of the mode indications is brought into or out of alignment with the mark 701e, a click force is produced.

Figure 44:
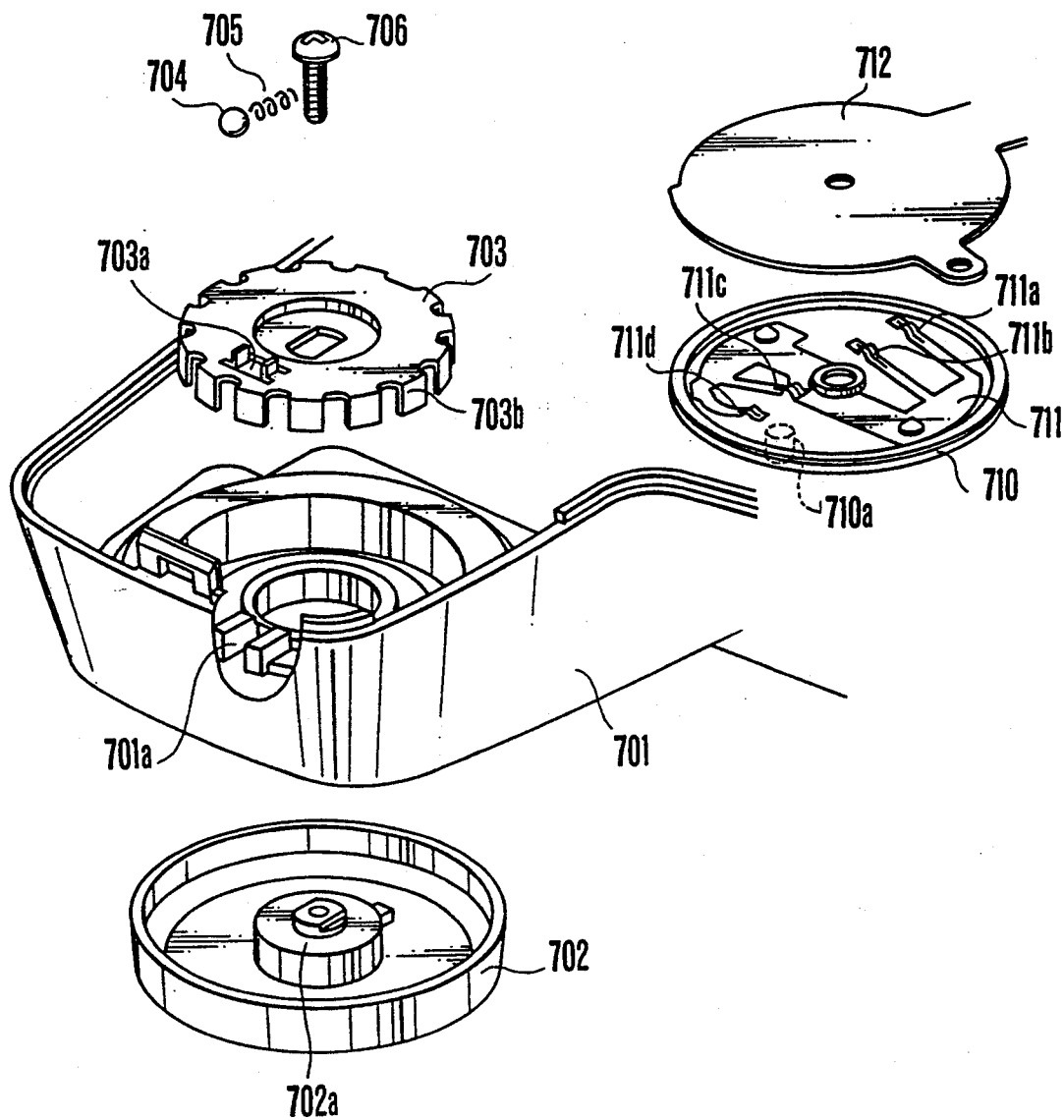
FIG. 44 is an exploded perspective view showing a dial and its associated members.
Figure 45:
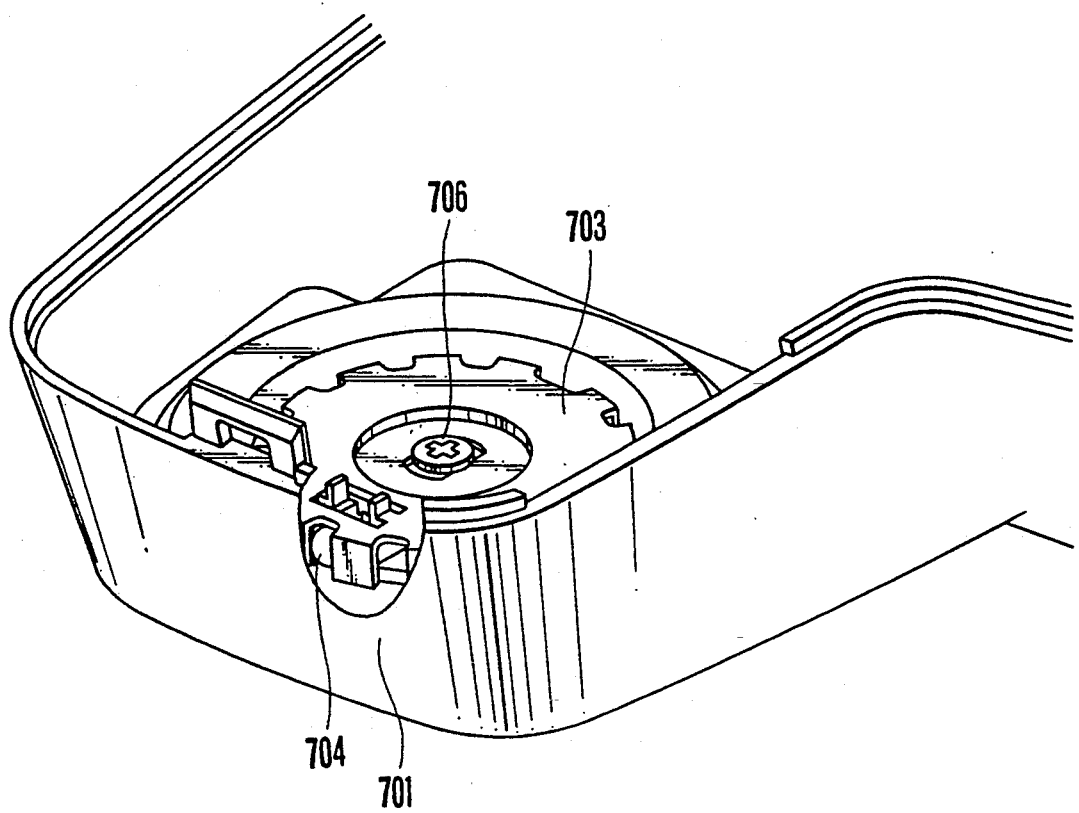
FIG. 45 is a perspective view showing the state wherein the dial is secured.

The mechanism of the dial 702 is shown in FIGS. 44 and 45, each of which is a partial perspective view showing the camera body upside down.

The dial 702 is attached to the top cover 701 from the outside. A click disk 703, which has a plurality of click cutouts 703b formed around the outer periphery, is non-rotatably fitted onto a dial shaft 702a and is fixed thereto by a screw 706 as shown in FIG. 45. A click ball 704 and a click spring 705 are inserted into a guide portion 701a of the top cover 701 through an opening 703a of the click disk 703, with the click ball 704 positioned outwardly of the guide portion 701a. The click ball 704 is thus pressed against the inner peripheral face of the click disk 703 by the spring force of the click spring 705. The click cutouts 703b of the click disk 703 are formed at locations corresponding to those of the respective mode indications displayed on the dial 702. The click ball 704 is radially forced by the click spring 705 to drop into any one of the click cutouts 703b, thereby producing a click force.

Figure 46:
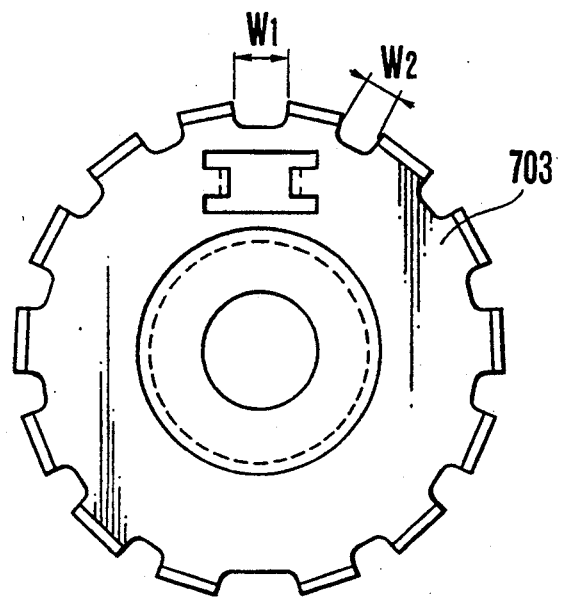
FIG. 46 is a schematic plan view showing a click disk.
Figure 47:
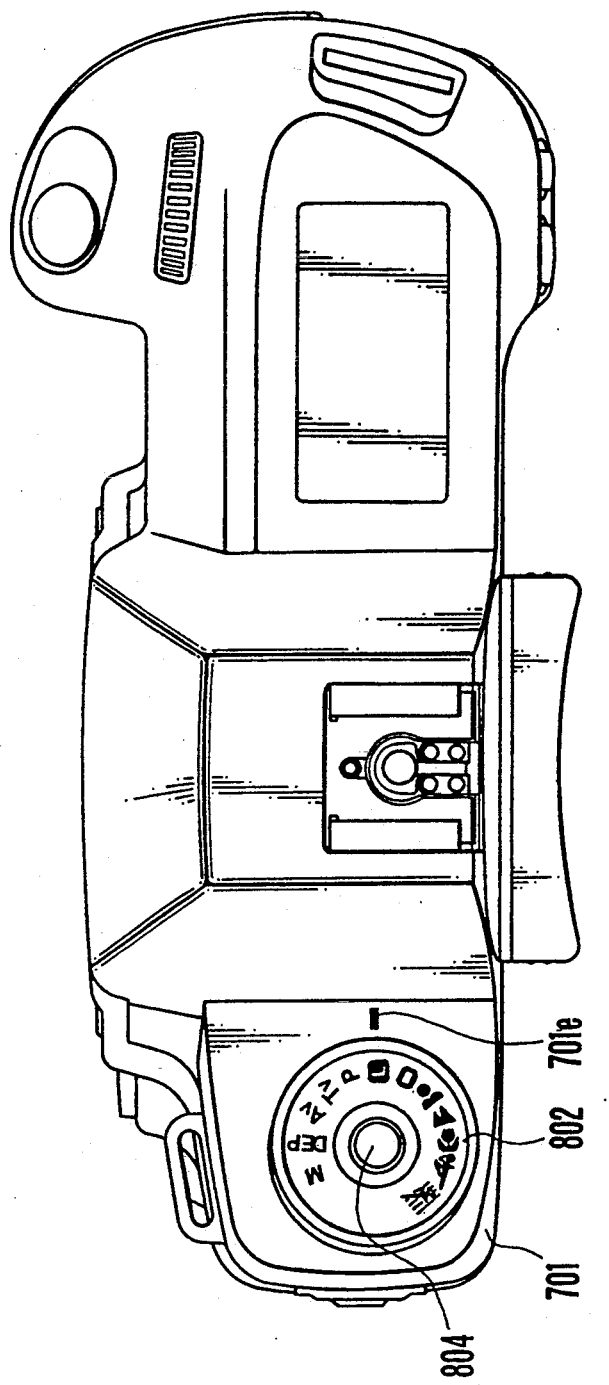
FIG. 47 is a schematic top plan view showing a camera according to a sixth embodiment.
Figure 48:
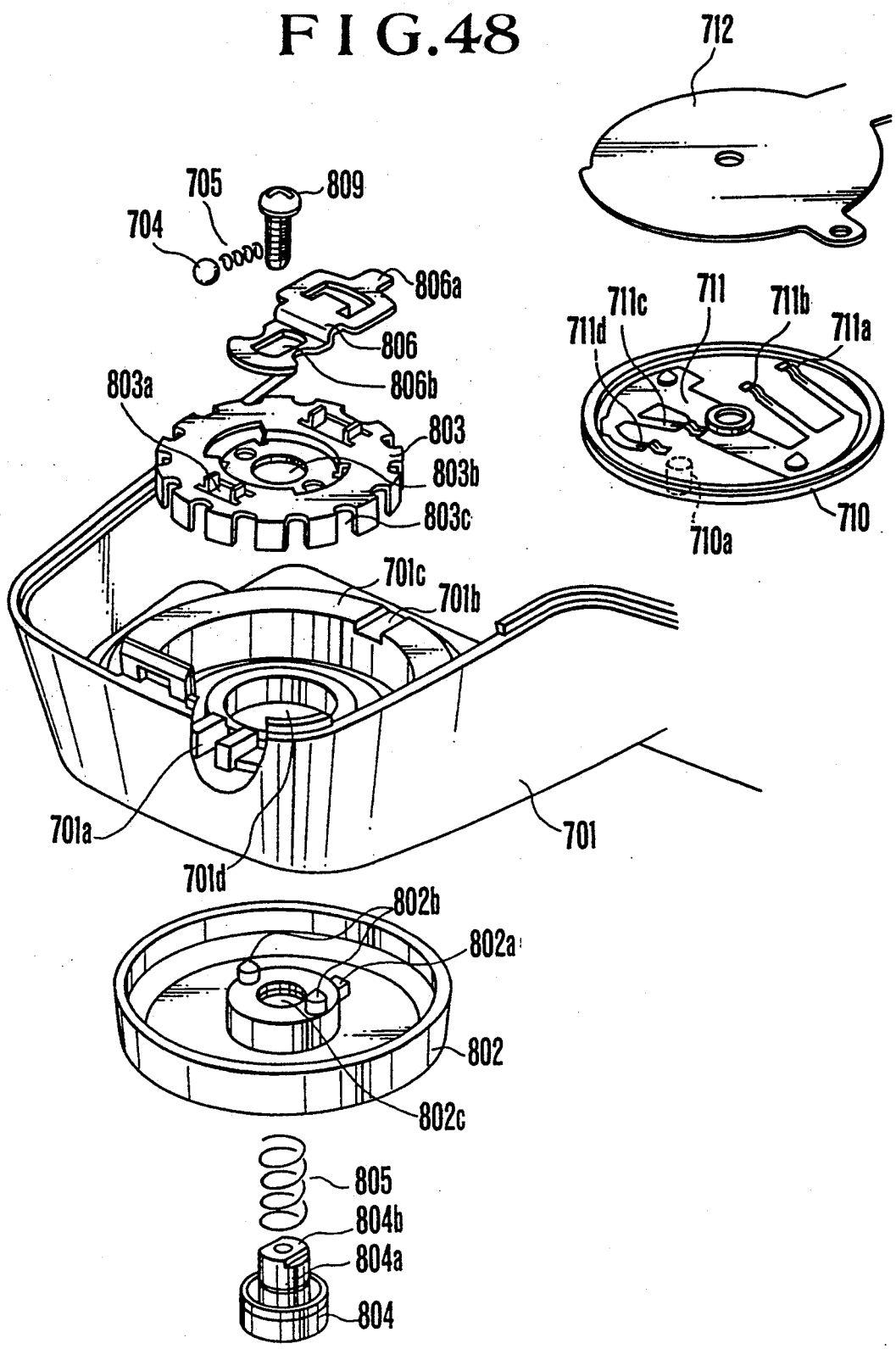
FIG. 48 is an exploded perspective view showing a dial and its associated members.

As shown in FIG. 46, the strength of the click force can be changed by varying the drop amount of the click ball 704 by making the cutout width W₁ of a particular click cutout 703b wider or narrower than the cutout width W₂ of each of the other click cutouts 703b. As the cutout width W₁ is wider than the cutout width W₂, the click force becomes stronger; otherwise, it becomes weaker. In the fifth embodiment, only a click cutout corresponding to the lock position is made wide and the other click cutouts are made narrow, whereby the engagement and disengagement of the dial at the lock position are made tight.

More specifically, although a substantially equal click force can be produced at each mode position for either group of photographic modes, a strong click force is produced at the lock position located between both groups of photographic modes. Accordingly, this strong click force makes a photographer aware that the dial has reached the switch position between the groups of photographic modes of different kinds.

The mode setting position of the dial 702 is detected by a position detecting mechanism consisting of a dial disk piece 710 which is rotated with the dial 702 and a flexible circuit board 712 fixed to the camera body in opposition to the dial disk piece 710. A projection 710a formed on the reverse face of the dial disk piece 710 is fitted into the opening 703a of the click disk 703, whereby the rotation of the dial disk piece 710 is restricted.

Figure 40:
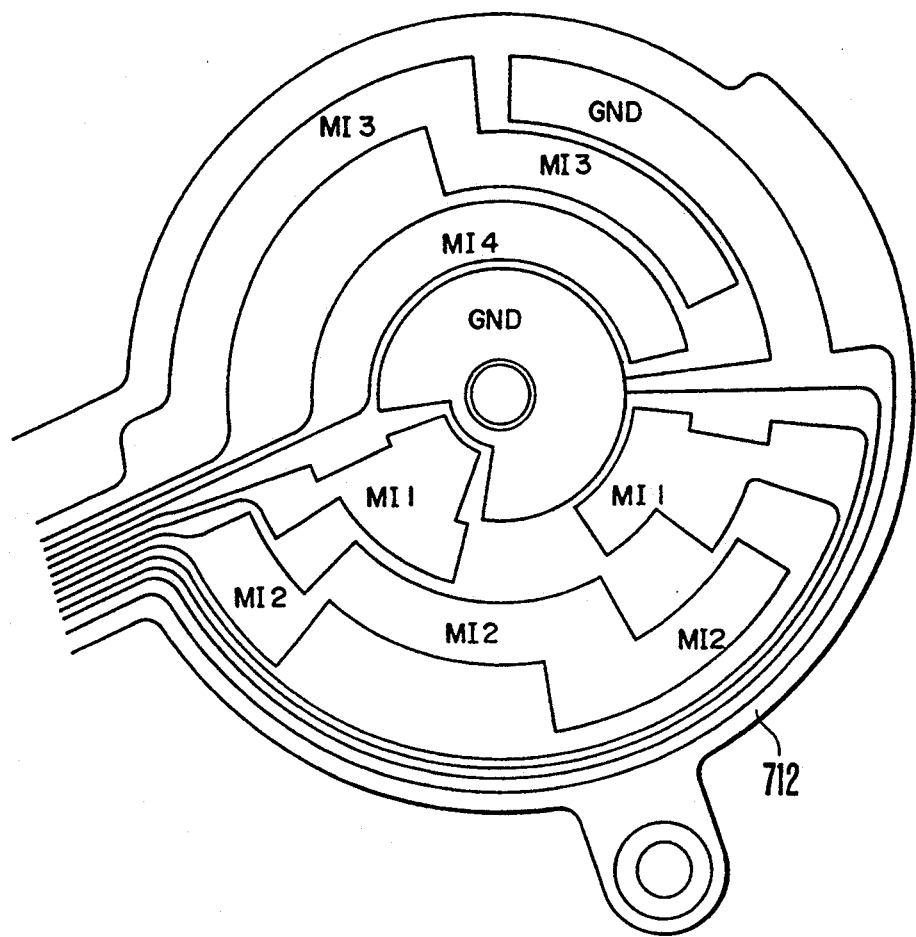
FIG. 40 is a schematic plan view showing the pattern of a flexible circuit board.

The dial disk piece 710 has a dial contact piece 711, and contact portions 711a to 711d extend from the dial contact piece 711. As shown in FIG. 40, an electrode pattern, which includes one pair of electrodes MI1, electrodes MI2, MI3, MI4 and a ground (GND) electrode, is formed on the face of the flexible circuit board 712 which opposes the dial disk piece 710. The contact portions 711a to 711d are disposed to come into contact with the electrode pattern.

Figure 41:
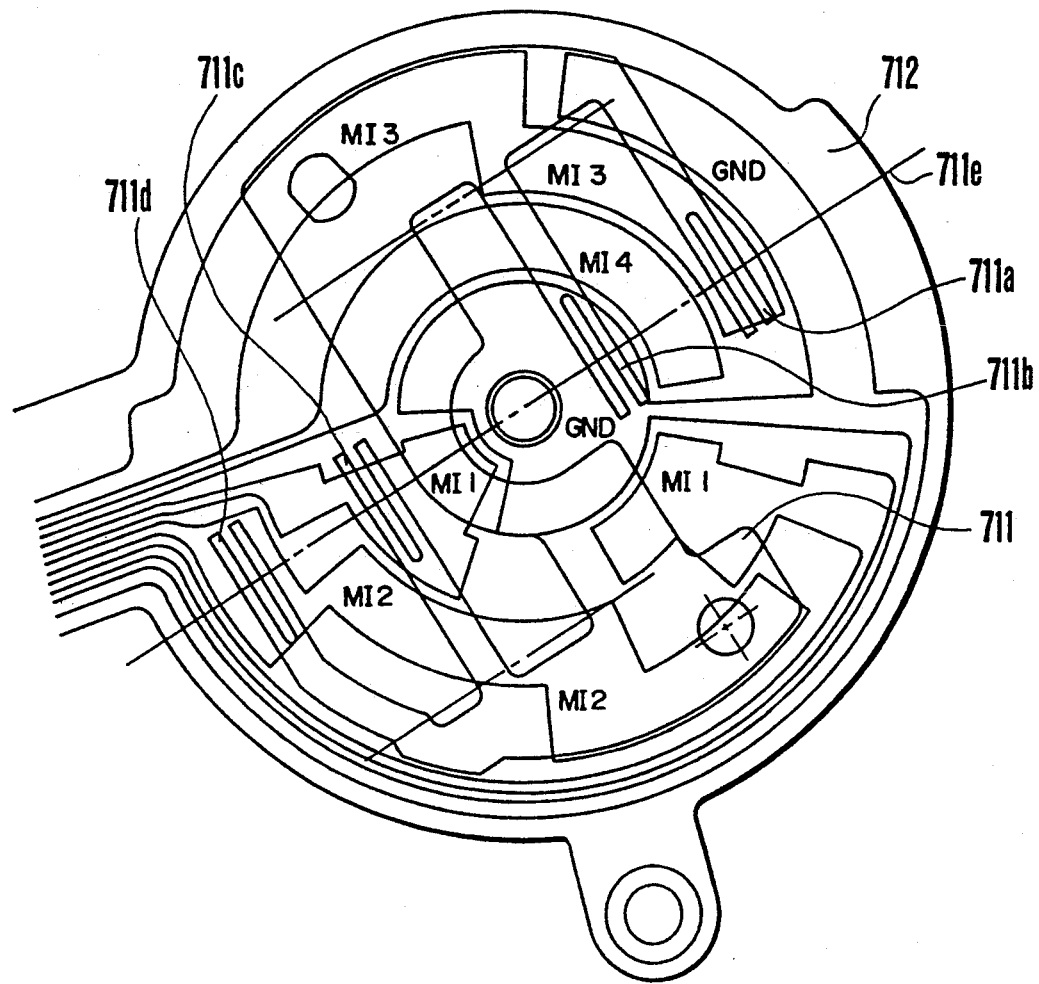
FIG. 41 is a schematic plan view showing the state wherein a dial disk piece is in contact with the flexible circuit board.

FIG. 41 shows the state of setting in the manual mode when the dial 702 is in use. The contact pieces 711a to 711d of the dial disk piece 710 are in contact with the electrode pattern of the flexible circuit board 712 along a straight chain line 711e. If the dial contact piece 711 is not in contact, the electrode patterns MI1, MI2, MI3 and MI4 are in a pullup state and connected to an input port of an IC which constitutes a control system for a camera (not shown). In FIG. 41, the contact pieces 711a to 711d of the dial contact piece 711 are in contact with the electrode pattern at four positions. Since the contact piece 711b is in contact with the ground electrode, the dial contact piece 711 is grounded. The contact pieces 711a, 711c and 711d are respectively in contact with the electrodes MI3, MI1 and MI2, so that the contact pieces 711a, 711c and 711d are pulled down.

FIG. 42 is a table showing the relationships between dial modes and the states of the electrode pattern of the flexible printed circuit board 712. The illustrated input states are detected by the control IC.

In FIG. 42, each kind of photographic mode setting is represented by 4 bits. In the case of a lock mode, the camera is set to an inoperative state and a position indicative of the lock mode serves as an initial position at which the camera is made inoperative. This lock-mode position serves a function which is substantially equal to the above-described click force at the lock position which is made stronger than the click forces obtained in both photographic modes. Accordingly, even if the cutout widths of all the click cutouts 703a of the click disk 703 are made substantially equal so that the strength of the click force at every click cutout becomes substantially uniform, a user can readily understand that a dial position which keeps the camera inoperative forms the boundary between the two different groups of indications of photographic modes.

Embodiment 6

FIGS. 47, 48, 49(a) and 49(b) diagrammatically show a sixth embodiment of the present invention. The feature of the sixth embodiment is that a lock mechanism for locking the rotation of the dial 702 at a lock position is added to the arrangement of the above-described embodiment.

A dial 802 has a surface provided with indications similar to those used in the fifth embodiment. Projections 802b are formed on one end of a dial shaft having an axial hole 802c, and are respectively fitted into and welded to small holes 803d of a click disk 803, so that the dial 802 and the click disk 803 can rotate integrally. As in the fifth embodiment, click cutouts 803c are formed in the click disk 803 around the periphery thereof and the click ball 704 and the click spring 705 are inserted into the guide portion 701a of the top cover 701 through an opening 803a so as to produce a click.

A lock button 804 is inserted through the axial hole 802c formed in the center of the dial 802, with a spring 805 held between the lock button 804 and the dial 802. An end portion 804b having two opposite steps is formed on a shaft 804a of the lock button 804, and is fitted into an opening 806b of a lock lever 806 through a central hole 803b of the click disk 803. The lock lever 806 is fixed to the lock button 804 by a screw 809.

Figure 49A:
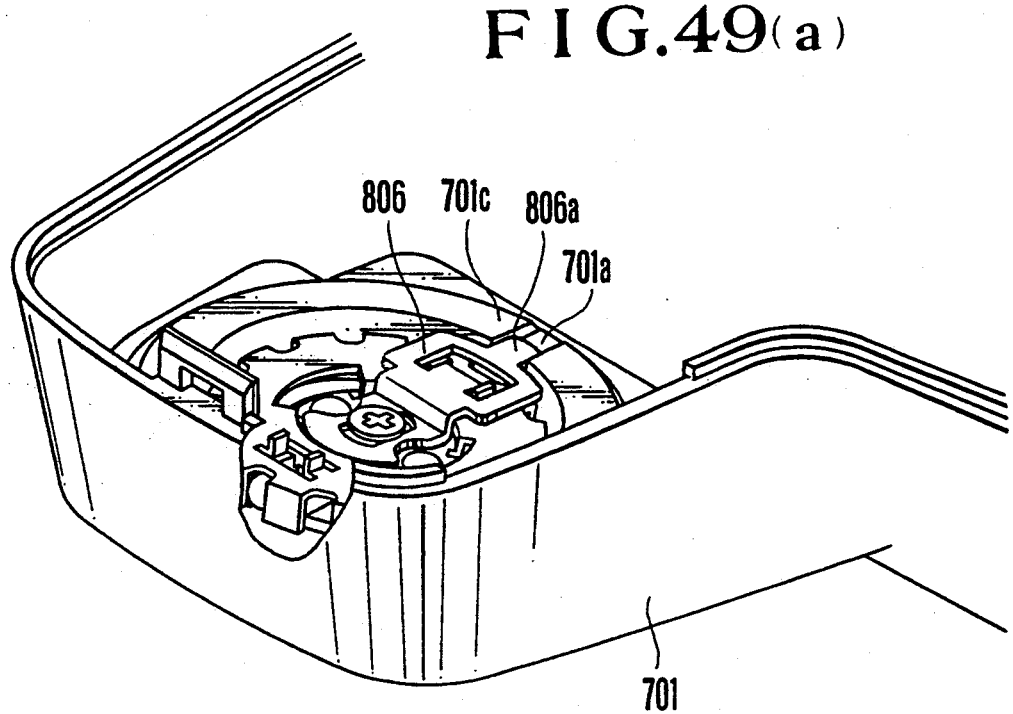
FIGS. 49(a) and 49(b) are perspective views respectively showing the locked and non-locked states of the dial.
Figure 49B:
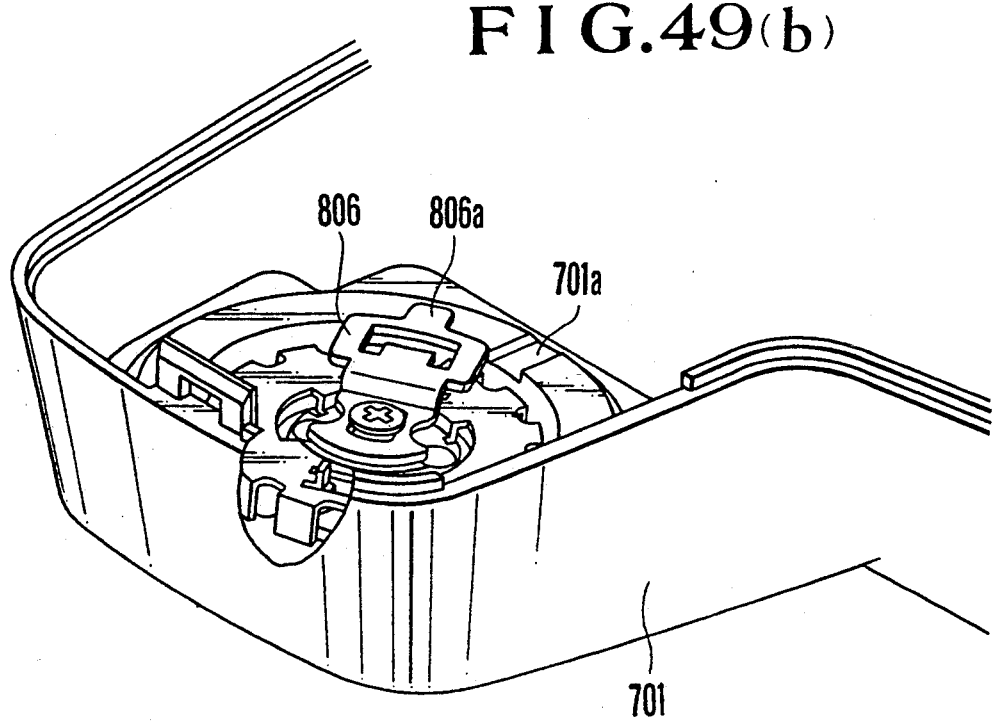

An arcuately extending projection 701c is formed on the top cover 701 of the camera body so as to surround the click disk 803, and an engagement recess 701b for engagement with a lock projection 806a of the lock lever 806 is formed in a part of the projection 701c. If the dial 802 is rotated toward a lock position, the lock projection 806a of the lock lever 806 fits into the engagement recess 701b at the lock position, as shown in FIG. 49(a), so that the rotation of the dial 802 is disabled. When the lock button 804 is depressed against the spring force of the spring 805, the lock lever 806 is forced down to release the engagement between the lock projection 806a and the engagement recess 701b, whereby the rotation of the dial 802 is enabled as shown in FIG. 49(b).

The structures of the dial disk piece 710 and the flexible circuit board 712 and the manner in which they are secured to each other, are substantially the same as those used in the above-described embodiment, and an explanation thereof is omitted.

In the sixth embodiment, the lock position can perform not only the function of disabling rotation of the dial but also the function of informing the photographer that the dial is positioned at the boundary between two different groups of indications of photographic modes, as in the case of the above-described fifth embodiment.

As is apparent from the foregoing, according to each of the fifth and sixth embodiments, instead of randomly displaying a plurality of kinds of setting information on an information input member such as a dial, setting information is classified into two groups on the basis of the contents, nature or the like of each information, and the groups of setting information are distinctively displayed. Accordingly, since desired setting information may be searched for in either one of two indication regions of the information input member, easy mode selection can be achieved.

In addition, the information input member is arranged to assist a photographer in identifying the boundary between the two indication regions, even a beginner can easily identify these indication regions. Further, the photographic mode is switched at a distinct position, for example, where a strong click is produced, where the camera is made inoperative, or where the input information such member such as a dial, is mechanically locked. Accordingly, even if the photographer does not memorize information on all the photographic modes, for example, only if he is aware that information indications on a general photographic mode and those on a special photographic mode are separately displayed, he can easily understand the necessity of mode switching and enjoy photography by fully utilizing each photographic mode having multiple functions. Further, the photographer can easily find that mode switching has been effected even while looking through a viewfinder or taking photography in a dark place.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent arrangements and functions.

What is claimed is:

1. A camera having an information setting device, comprising:
   (a) an information member having first camera information displayed on an upper surface thereof and second camera information displayed on an undersurface thereof;
   (b) a holding member capable of holding said information member with a selective one of either of said surfaces in viewable disposition; and
   (c) detecting means for detecting which of said surfaces is in said viewable disposition when said information member is held by said holding member.

2. The invention claimed in claim 1, further comprising second detecting means for detecting movement of said holding member.

3. The invention claimed in claim 2, wherein a plurality of first camera setting information data is displayed on said upper surface of said information member, said second detecting means detecting the movement of said holding member so that the state of setting of said plurality of first camera setting information data can be identified.

4. The invention claimed in claim 3, wherein a plurality of second camera setting information data is displayed on said undersurface of said information member, said plurality of first camera setting information data and said plurality of second camera setting information data being arranged in respective successions.

5. The invention claimed in claim 1, further comprising camera exposure controlling means for controlling exposure in accordance with a detection result provided by said detecting means.

6. The invention claimed in claim 1, wherein said detecting means includes a mechanical switch mechanism.

7. The invention claimed in claim 1, wherein said detecting means includes an optical detecting mechanism.

8. The invention claimed in claim 6, wherein each of said surfaces of said information member is provided with a portion for detection by said detecting means, said portion for detection being subject to a positional variation depending on whether said upper surface or said undersurface is in said viewable disposition when said information member is held by said holding member, said switch mechanism identifying the information member surface in said viewable disposition on the basis of said positional variation.

9. The invention claimed in 7, wherein each said surface of said information member is provided with a portion for detection, said portions for detection being selected to have mutually different reflectances, said detecting means identifying the surface held in said viewable disposition by said holding member on the basis of a result obtained by identifying a difference between said reflectances by means of said optical detecting mechanism.

10. An information input device for a camera, comprising:
   (a) an information member having first camera information displayed on an upper surface thereof and second camera information displayed on an undersurface thereof;
   (b) a holding member capable of holding said information member with a selective one of either of said surfaces in viewable disposition; and
   (c) detecting means for detecting which of said surfaces is in said viewable disposition when said information member is held by said holding member.

11. A device according to claim 10, further comprising second detecting means for detecting a movement of said holding member.

12. A device according to claim 11, wherein a plurality of first camera setting information data are displayed on said upper surface of said information member, said second detecting means detecting the movement of said holding member so that the state of setting of said plurality of first camera setting information data can be identified.

13. A device according to claim 12, wherein a plurality of second camera setting information data are displayed on said undersurface of said information member, said plurality of first camera setting information data and said plurality of second camera setting information data being arranged in respective successions.

14. A camera having an information setting device, comprising:
   (a) an information member having first camera information displayed on an upper surface thereof and second camera information displayed on an undersurface thereof; and
   (b) a holding member capable of holding said information member with a selective one of either of said surfaces in viewable disposition, said holding member releasably holding said information member for operational movement thereof to effect either of the viewable dispositions thereof.

15. The invention claimed in claim 14, further comprising detecting means for detecting which of said information member surfaces is in said viewable disposition when said information member is held by said holding member.

16. The invention claimed in claim 15, further comprising second detecting means for detecting movement of said holding member.

17. A invention claimed in claim 16, wherein a plurality of first camera setting information data is displayed on said upper surface of said information member, said second detecting means detecting the movement of said holding member so that the state of setting of said plurality of first camera setting information data can be identified.

18. The invention claimed in claim 17, wherein a plurality of second camera setting information data is displayed on said undersurface of said information member, said plurality of first camera setting information data and said plurality of second camera setting information data being arranged in respective successions.

19. The invention claimed in claim 15, further comprising camera exposure controlling means for controlling exposure in accordance with a detection result provided by said detecting means.

20. The invention claimed in claim 16, wherein said holding member is a rotary dial which is adapted to be disposed for rotation with respect to a camera body and for setting photographic information.

21. The invention claimed in claim 14, wherein said information member has a disk-like configuration which is progressively reduced in thickness from the center to the outer circumference thereof.

22. The invention claimed in claim 14, wherein a middle portion of said holding member which opposes said information member includes a recess.

23. An information input device for a camera, comprising:
(a) an information member having first camera information displayed on an upper surface thereof and second camera information displayed on an undersurface thereof; and
(b) a holding member capable of holding said information member with a selective one of either of said surfaces in viewable disposition, said holding member releasably holding said information member for operational movement thereof to effect either of the viewable dispositions thereof.

24. A device according to claim 23, further comprising detecting means for detecting which of said information member surfaces is in said viewable disposition when said information member is held by said holding member.

25. A device according to claim 24, further comprising second detecting means for detecting movement of said holding member.

26. A device according to claim 25, wherein a plurality of first camera setting information data is displayed on said upper surface of said information member, said second detecting means detecting the movement of said holding member so that the state of setting of said plurality of first camera setting information data can be identified.

27. A device according to claim 26, wherein a plurality of second camera setting information data is displayed on said undersurface of said information member, said plurality of first camera setting information data and said plurality of second camera setting information data being arranged in respective successions.

28. A device according to claim 25, wherein said holding member is a rotary dial which is adapted to be disposed for rotation with respect to a camera body and for setting photographic information.

29. A device according to claim 23, wherein said information member has a disk-like configuration which is progressively reduced in thickness from the center to the outer circumference thereof.

30. A camera having an information setting device, comprising:
(a) an information member having first camera information displayed on an upper surface thereof and second camera information displayed on an undersurface thereof;
(b) a rotary dial capable of holding said information member with a selective one of either of said surfaces in viewable disposition, said rotary dial having a holding portion with a projection or recess therein for positioning said information member; and
(c) detecting means for detecting rotation of said rotary dial, said detecting means detecting at least said projection or recess.

31. The invention claimed in claim 30, further comprising second detecting means for detecting the rotational position of said rotary dial, said second detecting means detecting whether at least said projection or recess is located at a specific position.

32. The invention claimed in claim 31, wherein said rotary dial has a common information indication displayed on both said surfaces thereof at a position corresponding to said projection or recess.

33. An information input device for a camera, comprising:
(a) an information member having first camera information displayed on an upper surface thereof and second camera information displayed on an undersurface thereof;
(b) a rotary dial capable of holding said information member with a selective one of either of said surfaces in viewable disposition, said rotary dial having a holding portion with a projection or recess therein for positioning said information member; and
(c) detecting means for detecting rotation of said rotary dial, said detecting means detecting at least said projection or recess.

34. A device according to claim 33, further comprising second detecting means for detecting the rotational position of said rotary dial, said second detecting means detecting whether at least said projection or recess is located at a specific position.

35. A device according to claim 34, wherein said rotary dial has a common information indication displayed on both said surfaces thereof at a position corresponding to said projection or recess.

36. A camera having an information setting device, comprising:
(a) an information member having first camera information displayed on one face thereof and second camera information displayed on a second face thereof;
(b) a holding member capable of holding said information member with either of said faces in viewable disposition; and
(c) detecting means for identifying three states of relationship or lack of relationship between said information member and said holding member including a first state wherein said holding member does not hold said information member, a second state wherein said holding member holds said information member with said one face in said viewable disposition, and a third state wherein said holding member holds said information member with said second face in said viewable disposition.

37. The invention claimed in claim 36, further comprising second detecting means for detecting movement of said holding member.

38. The invention claimed in claim 37, wherein a plurality of first camera setting information data is displayed on said one face of said information member, a plurality of second camera setting information data being displayed on said second face of said information member, and a plurality of third camera setting information data being displayed on a region of said holding member, said information member being held in said region of said holding member.

39. The invention claimed in claim 38, wherein which of said camera setting information data is applicable for photography, is determined on the basis of a detection result provided by said detecting means and said second detecting means.

40. The invention claimed in claim 36, wherein said detecting means includes a mechanical switch mechanism.

41. An information input device for a camera, comprising:
   (a) an information member having first camera information displayed on one face thereof and second camera information displayed on a second face thereof;
   (b) a holding member capable of holding said information member with either of said faces in viewable disposition; and
   (c) detecting means for identifying three states of relationship or lack of relationship between said information member and said holding member including a first state wherein said holding member does not hold said information member, a second state wherein said holding member holds said information member with said one face in said viewable disposition, and a third state wherein said holding member holds said information member with said second face in said viewable disposition.

42. A device according to claim 41, further comprising second detecting means for detecting movement of said holding member.

43. A device according to claim 42, wherein a plurality of first camera setting information data is displayed on said one face of said information member, a plurality of second camera setting information data being displayed on said second face of said information member, and a plurality of third camera setting information data being displayed on a region of said holding member, said information member being held in said region of said holding member.

44. A device according to claim 43, wherein which of said camera setting information data is applicable for photography, is determined on the basis of a detection result provided by said detecting means and said second detecting means.

* * * * *

UNITED STATES PATENT AND TRADEMARK OFFICE
CERTIFICATE OF CORRECTION

PATENT NO. : 5,283,606
DATED : February 1, 1994
INVENTOR(S) : Tatsuo Konno et al.

It is certified that error appears in the above-indentified patent and that said Letters Patent is hereby corrected as shown below:

Col. 2, line 48. Change "an" to -- a --.

Col. 5, line 49. Change "$1_1 > 1_2.$" to -- $\ell_1 > \ell_2.$ --.

Col. 5, line 56. Change "$l_2$" to -- $\ell_2$ --.

Col. 8. lines 33, 39, 53. Change "hallow" to -- hollow --.

Col. 11, line 60. After "transistors" insert -- 227 --.

Col. 16, line 44. Change "hallow" to -- hollow --.

Col. 19, line 42. Change "202 and 202," to -- 202 and 202' --.

Col. 26, line 57. Delete "such"

Col. 28, line 17. Change "A" to -- The --.

Signed and Sealed this

Sixth Day of September, 1994

BRUCE LEHMAN

Attest:

Attesting Officer    Commissioner of Patents and Trademarks